(12) United States Patent
Eguchi et al.

(10) Patent No.: US 7,809,906 B2
(45) Date of Patent: Oct. 5, 2010

(54) DEVICE FOR PERFORMANCE TUNING IN A SYSTEM

(75) Inventors: Yoshiaki Eguchi, Yokohama (JP);
Yasutomo Yamamoto, Sagamihara (JP);
Ai Satoyama, Sagamihara (JP);
Akinobu Shimada, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1449 days.

(21) Appl. No.: 10/855,356

(22) Filed: May 28, 2004

(65) Prior Publication Data

US 2005/0193167 A1 Sep. 1, 2005

(30) Foreign Application Priority Data

Feb. 26, 2004 (JP) .............................. 2004-051935

(51) Int. Cl.
*G06F 12/00* (2006.01)

(52) U.S. Cl. .................... 711/162; 711/154; 710/15; 714/47

(58) Field of Classification Search .................. 711/162
See application file for complete search history.

(56) References Cited

U.S. PATENT DOCUMENTS

| | | | |
|---|---|---|---|
| 3,771,137 A | 11/1973 | Barner et al. |
| 4,025,904 A | 5/1977 | Adney et al. |
| 5,155,845 A | 10/1992 | Beal et al. |
| 5,408,465 A | 4/1995 | Gusella et al. |
| 5,426,736 A | 6/1995 | Guineau, III |
| 5,450,584 A | 9/1995 | Sekiguchi et al. |
| 5,459,857 A | 10/1995 | Ludlam et al. |
| 5,504,882 A | 4/1996 | Chai et al. |
| 5,548,712 A | 8/1996 | Larson et al. |
| 5,680,580 A | 10/1997 | Beardsley et al. |

(Continued)

FOREIGN PATENT DOCUMENTS

EP 1130514 9/2001

(Continued)

OTHER PUBLICATIONS

Sarkar, P. et al, "Internet Protocol storage area networks", IBM Systems Journal, vol. 42, No. 2, 2003, pp. 218-231.

(Continued)

*Primary Examiner*—Christian P Chace
*Assistant Examiner*—Matthew Bradley
(74) *Attorney, Agent, or Firm*—Mattingly & Malur, P.C.

(57) ABSTRACT

In a storage subsystem, performance tuning is performed with respect to whole logical devices including external storage subsystems that are not directly connected to host computers.

Physical storage units presented by the external storage subsystems are defined as logical devices of the storage subsystem itself, and I/O processing requests from the host computers are relayed to those logical devices. At the time of relaying, I/O processing conditions are monitored. When there exists an external storage subsystem whose load is high, then, operating conditions of ports and processors are examined. In the case where the load can be reduced by changing the configuration of those ports and processors, the configuration is changed to reduce the load. In the case where the load can not be reduced, data is migrated from a logical device having a high load to a logical device having a sufficient performance.

16 Claims, 30 Drawing Sheets

U.S. PATENT DOCUMENTS

| | | |
|---|---|---|
| 5,680,640 A | 10/1997 | Ofek et al. |
| 5,758,118 A | 5/1998 | Choy et al. |
| 5,835,954 A | 11/1998 | Duyanovich et al. |
| 5,870,537 A | 2/1999 | Kern et al. |
| 5,895,485 A | 4/1999 | Loechel et al. |
| 5,917,723 A | 6/1999 | Binford |
| 5,956,750 A | 9/1999 | Yamamoto et al. |
| 5,978,890 A | 11/1999 | Ozawa et al. |
| 6,012,123 A | 1/2000 | Pecone et al. |
| 6,098,129 A | 8/2000 | Fukuzawa et al. |
| 6,108,748 A | 8/2000 | Ofek et al. |
| 6,173,374 B1 | 1/2001 | Heil et al. |
| 6,195,730 B1 | 2/2001 | West |
| 6,219,753 B1 | 4/2001 | Richardson |
| 6,230,239 B1 | 5/2001 | Sakaki et al. |
| 6,240,486 B1 | 5/2001 | Ofek et al. |
| 6,240,494 B1 | 5/2001 | Nagasawa et al. |
| 6,247,099 B1 | 6/2001 | Skazinski et al. |
| 6,247,103 B1 | 6/2001 | Kern et al. |
| 6,356,977 B2 | 3/2002 | Ofek et al. |
| 6,446,141 B1 | 9/2002 | Nolan et al. |
| 6,446,175 B1 | 9/2002 | West et al. |
| 6,457,139 B1 | 9/2002 | D'Errico et al. |
| 6,484,173 B1 | 11/2002 | O'Hare et al. |
| 6,490,659 B1 | 12/2002 | McKean et al. |
| 6,523,096 B2 | 2/2003 | Sanada et al. |
| 6,529,976 B1 | 3/2003 | Fukuzawa et al. |
| 6,553,408 B1 | 4/2003 | Merrell et al. |
| 6,598,134 B2 | 7/2003 | Ofek et al. |
| 6,640,278 B1 | 10/2003 | Nolan et al. |
| 6,640,291 B2 | 10/2003 | Fujibayashi et al. |
| 6,647,474 B2 | 11/2003 | Yanai et al. |
| 6,647,476 B2 | 11/2003 | Nagasawa et al. |
| 6,654,830 B1 | 11/2003 | Taylor et al. |
| 6,654,831 B1 | 11/2003 | Otterness et al. |
| 6,675,258 B1 | 1/2004 | Bramhall et al. |
| 6,681,303 B1 | 1/2004 | Watanabe et al. |
| 6,681,339 B2 | 1/2004 | McKean et al. |
| 6,684,310 B2 | 1/2004 | Anzai et al. |
| 6,708,232 B2 | 3/2004 | Obara |
| 6,745,281 B1 | 6/2004 | Saegusa |
| 6,799,255 B1 | 9/2004 | Blumenau et al. |
| 6,816,948 B2 | 11/2004 | Kitamura et al. |
| 6,826,778 B2 | 11/2004 | Bopardikar et al. |
| 6,851,020 B2 | 2/2005 | Matsumoto et al. |
| 6,876,656 B2 | 4/2005 | Brewer et al. |
| 6,883,064 B2 | 4/2005 | Yoshida et al. |
| 6,922,761 B2 | 7/2005 | O'Connell et al. |
| 2001/0050915 A1 | 12/2001 | O'Hare et al. |
| 2001/0052018 A1 | 12/2001 | Yokokura |
| 2002/0003022 A1 | 1/2002 | Csida et al. |
| 2002/0004857 A1 | 1/2002 | Arakawa et al. |
| 2002/0019908 A1 | 2/2002 | Reuter et al. |
| 2002/0019920 A1 | 2/2002 | Reuter et al. |
| 2002/0019922 A1 | 2/2002 | Reuter et al. |
| 2002/0019923 A1 | 2/2002 | Reuter et al. |
| 2002/0026558 A1 | 2/2002 | Reuter et al. |
| 2002/0029326 A1 | 3/2002 | Reuter et al. |
| 2002/0065864 A1 | 5/2002 | Hartsell et al. |
| 2002/0087544 A1 | 7/2002 | Selkirk et al. |
| 2002/0103889 A1 | 8/2002 | Markson et al. |
| 2002/0112113 A1 | 8/2002 | Karpoff et al. |
| 2002/0124137 A1 | 9/2002 | Ulrich et al. |
| 2002/0133735 A1 | 9/2002 | McKean et al. |
| 2002/0156887 A1 | 10/2002 | Hashimoto |
| 2002/0156984 A1 | 10/2002 | Padovano |
| 2002/0156987 A1 | 10/2002 | Gajjar et al. |
| 2002/0178335 A1 | 11/2002 | Selkirk et al. |
| 2002/0188592 A1 | 12/2002 | Leonhardt et al. |
| 2002/0194523 A1 | 12/2002 | Ulrich et al. |
| 2003/0002503 A1 | 1/2003 | Brewer et al. |
| 2003/0037071 A1 | 2/2003 | Harris et al. |
| 2003/0051109 A1 | 3/2003 | Cochran |
| 2003/0056038 A1 | 3/2003 | Cochran |
| 2003/0058880 A1 | 3/2003 | Sarkinen et al. |
| 2003/0079019 A1 | 4/2003 | Lolayekar et al. |
| 2003/0093567 A1 | 5/2003 | Lolayekar et al. |
| 2003/0093619 A1 | 5/2003 | Sugino et al. |
| 2003/0097607 A1 | 5/2003 | Bessire |
| 2003/0101228 A1 | 5/2003 | Busser et al. |
| 2003/0115432 A1 | 6/2003 | Biessener et al. |
| 2003/0126327 A1 | 7/2003 | Pesola et al. |
| 2003/0142628 A1 | 7/2003 | Alonso et al. |
| 2003/0145168 A1 | 7/2003 | LeCrone et al. |
| 2003/0145169 A1 | 7/2003 | Nagasawa et al. |
| 2003/0158999 A1 | 8/2003 | Hauck et al. |
| 2003/0167419 A1 | 9/2003 | Yanai et al. |
| 2003/0182525 A1 | 9/2003 | O'Connell et al. |
| 2003/0191904 A1 | 10/2003 | Iwami et al. |
| 2003/0200387 A1 | 10/2003 | Urabe et al. |
| 2003/0204597 A1 | 10/2003 | Arakawa et al. |
| 2003/0212854 A1 | 11/2003 | Kitamura et al. |
| 2003/0212860 A1 | 11/2003 | Jiang et al. |
| 2003/0221063 A1 | 11/2003 | Eguchi et al. |
| 2003/0221077 A1 | 11/2003 | Ohno et al. |
| 2003/0236745 A1 | 12/2003 | Hartsell et al. |
| 2004/0003022 A1 | 1/2004 | Garrison et al. |
| 2004/0049553 A1 | 3/2004 | Iwamura et al. |
| 2004/0049564 A1 | 3/2004 | Ng et al. |
| 2004/0054850 A1 | 3/2004 | Fisk |
| 2004/0064610 A1 | 4/2004 | Fukuzawa et al. |
| 2004/0064641 A1 | 4/2004 | Kodama |
| 2004/0088417 A1 | 5/2004 | Bober et al. |
| 2004/0111485 A1 | 6/2004 | Mimatsu et al. |
| 2004/0123180 A1 | 6/2004 | Soejima et al. |
| 2004/0139237 A1 | 7/2004 | Rangan et al. |
| 2004/0143832 A1 | 7/2004 | Yamamoto et al. |
| 2004/0148443 A1 | 7/2004 | Achiwa |
| 2004/0172510 A1 | 9/2004 | Nagashima et al. |
| 2004/0193827 A1 | 9/2004 | Mogi et al. |
| 2004/0210724 A1 | 10/2004 | Koning et al. |
| 2004/0230980 A1 | 11/2004 | Koyama et al. |
| 2004/0250021 A1 | 12/2004 | Honda et al. |
| 2004/0260875 A1 | 12/2004 | Murotani et al. |
| 2004/0260966 A1 | 12/2004 | Kaiya et al. |
| 2005/0010743 A1 | 1/2005 | Tremblay et al. |
| 2005/0050271 A1 | 3/2005 | Honda et al. |
| 2005/0076154 A1 | 4/2005 | Chambliss et al. |
| 2005/0081009 A1 | 4/2005 | Williams et al. |
| 2005/0108375 A1 | 5/2005 | Hallak-Stamler |
| 2005/0125418 A1 | 6/2005 | Brewer et al. |
| 2006/0013222 A1 | 1/2006 | Rangan et al. |

FOREIGN PATENT DOCUMENTS

| | | |
|---|---|---|
| EP | 1357465 | 10/2003 |
| JP | 09-288547 | 11/1997 |
| JP | 10-154123 | 6/1998 |
| JP | 10-283272 | 10/1998 |
| JP | 11-184641 | 7/1999 |
| JP | 2000-293317 | 10/2000 |
| JP | 2001-067187 | 3/2001 |
| JP | 2001-125879 A | 5/2001 |
| JP | 2002230246 | 8/2002 |
| JP | 2003-216348 | 7/2003 |
| WO | 9709676 | 3/1997 |
| WO | 98/28686 | 7/1998 |

OTHER PUBLICATIONS

Anderson, Eric et al, "Hippodrome: running circles around storage administration", Hewlett-Packard Laboratories, 14 pp.

"A Case for Redundant Arrays of Inexpensive Disks (RAID)" by Patterson, et al. pp. 109-116.

"SANRAD Application Note: Data Migration Solution Transferring Data Between Storage Systems over Fibre-channel or SCSI connections", AAP-003-03, SANRAD 2003, pp. 1-9.

Lee, Edward K. et al, "Petal: Distributed Virtual Disks", ASPLOS VII, Oct. 1996, pp. 84-92.

"SAN Volume Controller Configuration Guide, Version 1, Release 1", IBM, $1^{st}$ Ed., Jun. 2003, pp. i-297, in particular, pp. 123-124, 185-188, and 224-227.

White Paper, "Network Attached Storage in the Data Protection Environment", Sony Electronics Inc., Feb. 2002, 23 pages.

"SCSI-3 Fault Tolerant Controller Configurations utilizing SCC & New Event Codes", Steve Sicola editor, High Availability Study Group, Doc. No X3T10 95-312r3, Rev 3.0, Feb. 28, 1996, pp. 1-14.

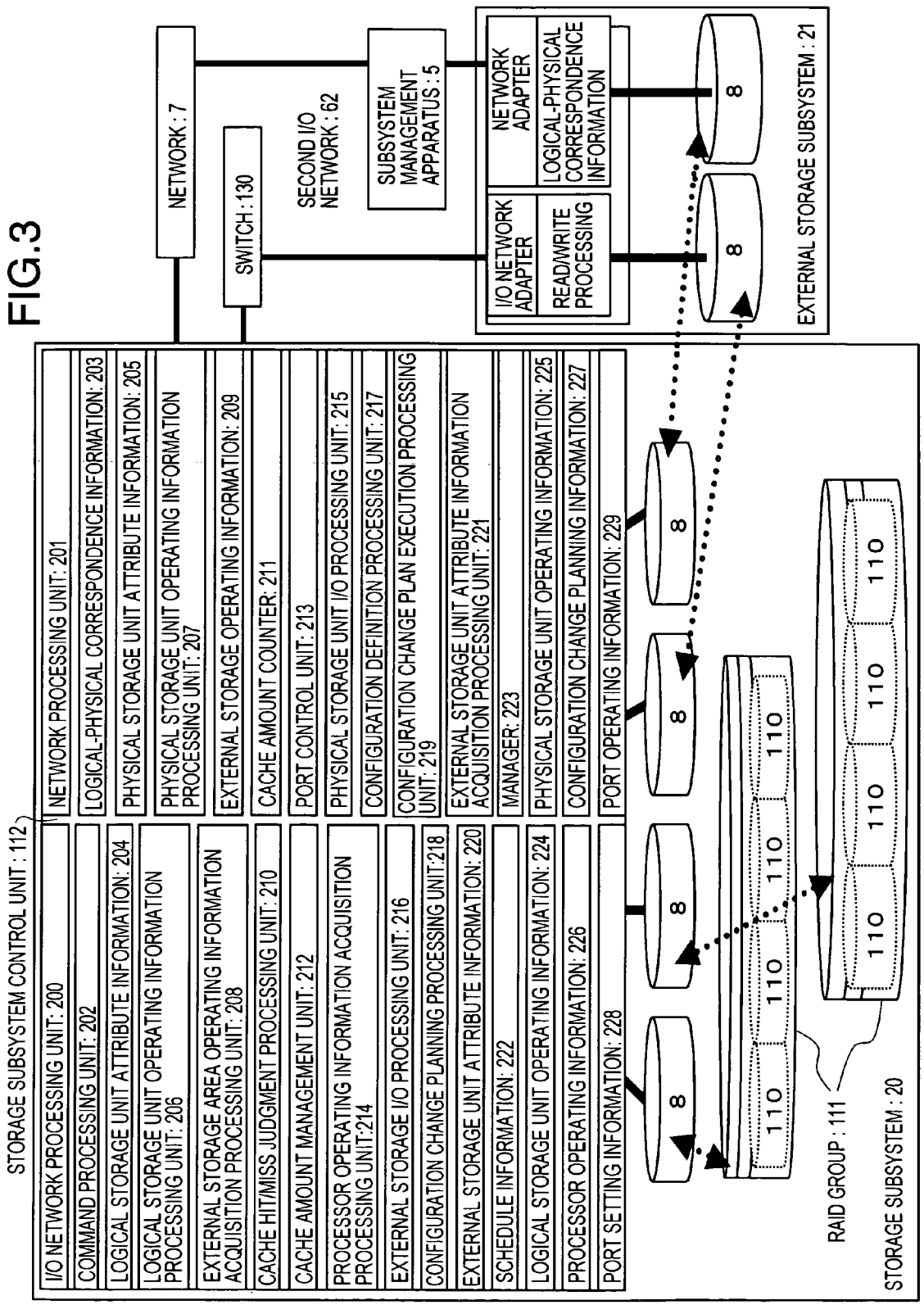

| LOGICAL ADDRESS : 600 | | | | PHYSICAL ADDRESS : 601 | | | | | | |
|---|---|---|---|---|---|---|---|---|---|---|
| | | | | | DATA : 607 | | PARITY : 608 | | EXTERNAL STORAGE : 609 | |
| LOGICAL STORAGE UNIT (LU) NUMBER 602 | LOGICAL STORAGE UNIT (LU) ADDRESS 603 | INTERNAL LOGICAL STORAGE UNIT (LDEV) NUMBER 604 | INTERNAL LOGICAL STORAGE UNIT (LDEV) ADDRESS 605 | P.G. NUMBER 606 | DISK UNIT NUMBER 610 | ADDRESS IN DISK UNIT 611 | DISK UNIT NUMBER 612 | ADDRESS IN DISK UNIT 613 | PORT NUMBER/ DISK UNIT NUMBER 614 | ADDRESS IN DISK UNIT 615 |
| 00 | 0~1023 | 0000 | 0~1023 | 0000 | 0 | 0~1023 | 3 | 0~1023 | −1 | −1 |
| 00 | 1024~2047 | 0000 | 1024~2047 | 0000 | 1 | 0~1023 | 3 | 0~1023 | −1 | −1 |
| 00 | 2048~3071 | 0000 | 2048~3071 | 0000 | 2 | 0~1023 | 3 | 0~1023 | −1 | −1 |
| 01 | 0~1023 | 0001 | 0~1023 | 0001 | 10 | 0~1023 | 11 | 0~1023 | −1 | −1 |
| 01 | 1024~2048 | 0001 | 1024~2047 | 0001 | 10 | 1024~2047 | 11 | 1024~2048 | −1 | −1 |
| ... | ... | ... | ... | ... | ... | ... | ... | ... | ... | ... |
| F3 | 0~1023 | 0F03 | 0~1023 | F001 | −1 | −1 | −1 | −1 | 012346789ABCDEF, 05 | 0~1023 |
| ... | ... | ... | ... | ... | ... | ... | ... | ... | ... | ... |

| PORT ID 1101 | LOGICAL STORAGE UNIT (LU) NUMBER 1102 | INTERNAL LOGICAL STORAGE UNIT (LDEV) NUMBER 1103 | P.G. NUMBER 1104 | INTERNAL STORAGE OR GENERAL PURPOSE STORAGE LU 1105 | EMULATION TYPE CAPACITY 1106 | PATH DEFINITION 1107 | STATUS 1108 | STORAGE UNIT PERFORMANCE 1109 |
|---|---|---|---|---|---|---|---|---|
| 00 | 00 | 0000 | 0000 | INTERNAL STORAGE | OPEN-3 2.2GB | PATH DEFINED HOST WWN | ONLINE | 0 |
| 00 | 01 | 0001 | 0000 | INTERNAL STORAGE | OPEN-3 2.2GB | PATH DEFINED HOST WWN | ONLINE | 0 |
| ... | ... | ... | ... | ... | ... | ... | ... | ... |
| 0A | F3 | 0FD3 | F001 | GENERAL PURPOSE STORAGE WWW, LUN | OPEN-V 108GB | PATH DEFINED HOST WWN | ONLINE | 3 |
| ... | ... | ... | ... | ... | ... | ... | ... | ... |
| 0F | 00 | 0101 0102 | 0008 | INTERNAL STORAGE | OPEN-3 2.2GB | PATH DEFINED HOST WWN | ONLINE | 0 |
| 0F | 01 | 0 | 0000 | INTERNAL STORAGE | OPEN-3 2.2GB | PATH DEFINED HOST WWN | ONLINE | 0 |
| ... | ... | ... | ... | ... | ... | ... | ... | ... |

| P.G. NUMBER 801 | DISK PERFORMANCE INDEX 802 | RAID LEVEL 803 | DETAILED CONFIGURATION 804 | SEQUENTIAL VOLUME 805 | READ ONLY VOLUME 806 |
|---|---|---|---|---|---|
| 0000 | COMMAND OVERHEAD SEEK TIME AVERAGE LATENCY MEDIA TRANSFER TIME | RAID 5 | 3D1P | NO | NO |
| 0001 | COMMAND OVERHEAD SEEK TIME AVERAGE LATENCY MEDIA TRANSFER TIME | RAID 1 | 2D2D | YES | NO |
| ... | ... | ... | ... | ... | ... |
| F001 | COMMAND OVERHEAD SEEK TIME AVERAGE LATENCY MEDIA TRANSFER TIME NETWORK BAND RESPONSE TIME THROUGHPUT | -1 | -1 | NO | NO |
| ... | ... | ... | ... | ... | ... |

| TIME 901 | ENTRIES / LU NUMBER UNDER PORT 902 | AVERAGE IOPS 904 | MAXIMUM IPOS 905 | AVERAGE MBPS 906 | MAXIMUM MBPS 907 | AVERAGE I/O PROCESSING TIME (μSEC) 908 | MAXIMUM I/O PROCESSING TIME (μSEC) 909 | CACHE HIT RATE 910 | SEQUENTIAL RATIO 911 | READ-WRITE RATIO 912 |
|---|---|---|---|---|---|---|---|---|---|---|
| YYYY. MM. D D. hh. mm. 00 | 00 | 20 | 35 | 5 | 40 | | | | READ ACCESS TIME/WRITE ACCESS TIME | SEQUENTIAL ACCESS TIME/ TOTAL OCCUPIED TIME |
| | 01 | ... | ... | ... | ... | ... | ... | ... | ... | ... |
| | 02 | ... | ... | ... | ... | ... | ... | ... | ... | ... |
| | ... | ... | ... | ... | ... | ... | ... | ... | ... | ... |
| YYYY MM. D D. hh. mm. 00 | 00 | ... | ... | ... | ... | ... | ... | ... | READ ACCESS TIME/WRITE ACCESS TIME | SEQUENTIAL ACCESS TIME/ TOTAL OCCUPIED TIME |
| | 01 | ... | ... | ... | ... | ... | ... | ... | ... | ... |
| | 02 | ... | ... | ... | ... | ... | ... | ... | ... | ... |
| | ... | ... | ... | ... | ... | ... | ... | ... | ... | ... |
| ... | | | | | | | | | | |

| TIME 1001 | I/O JOB TYPE / LOGICAL STORAGE UNIT NUMBER | SEQUENTIAL READ 1004 | SEQUENTIAL WRITE (DATA) 1005 | SEQUENTIAL WRITE (PARITY) 1006 | RANDOM READ 1007 | RANDOM WRITE (DATA) 1008 | RANDOM WRITE (PARITY) 1009 | TOTAL OCCUPIED TIME 1010 | READ-WRITE RATIO 1011 | SEQUENTIAL RATIO 1012 |
|---|---|---|---|---|---|---|---|---|---|---|
| YYYY. MM. DD. hh. mm. 00 | 0000 | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | READ ACCESS TIME/WRITE ACCESS TIME | SEQUENTIAL ACCESS TIME/TOTAL OCCUPIED TIME |
| | 0001 | ... | ... | ... | ... | ... | ... | ... | ... | ... |
| | 0002 | ... | ... | ... | ... | ... | ... | ... | ... | ... |
| | ... | ... | ... | ... | ... | ... | ... | ... | ... | ... |
| YYYY. MM. DD. hh. mm'. 00 | 0000 | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | READ ACCESS TIME/WRITE ACCESS TIME | SEQUENTIAL ACCESS TIME/TOTAL OCCUPIED TIME |
| | 0001 | ... | | | ... | ... | ... | ... | ... | ... |
| | 0002 | ... | | | ... | ... | ... | ... | ... | ... |
| | ... | ... | | | ... | ... | ... | ... | ... | ... |

| TIME | P.G. NUMBER \ I/O JOB TYPE | SEQUENTIAL READ 1304 | SEQUENTIAL WRITE (DATA) 1305 | SEQUENTIAL WRITE (PARITY) 1306 | RANDOM READ 1307 | RANDOM WRITE (DATA) 1308 | RANDOM WRITE (PARITY) 1309 | TOTAL OCCUPIED TIME 1310 | READ-WRITE RATIO 1311 | SEQUENTIAL RATIO 1312 |
|---|---|---|---|---|---|---|---|---|---|---|
| YYYY. MM. DD. hh. mm. 00 | 0000 | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | READ ACCESS TIME/WRITE ACCESS TIME | SEQUENTIAL ACCESS TIME/TOTAL OCCUPIED TIME |
| | 0001 | ... | ... | ... | ... | ... | ... | ... | ... | ... |
| | ... | ... | ... | ... | ... | ... | ... | ... | ... | ... |
| | F001 | ... | ... | ... | ... | ... | ... | ... | ... | ... |
| YYYY. MM. DD. hh. mm. 00 | 0000 | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | READ ACCESS TIME/WRITE ACCESS TIME | SEQUENTIAL ACCESS TIME/TOTAL OCCUPIED TIME |
| | 0001 | ... | ... | ... | ... | ... | ... | ... | ... | ... |
| | ... | ... | ... | ... | ... | ... | ... | ... | ... | ... |
| | 0002 | ... | ... | ... | ... | ... | ... | ... | ... | ... |
| ... | | | | | | | | | | |

| TIME 1801 | INITIATOR PORT NUMBER 1901 | GENERAL PURPOSE STORAGE SUBSYSTEM WWN 1902 | GENERAL PURPOSE STORAGE LUN 1903 | IOPS 1904 | MBPS 1905 | RESPONSE 1906 | LINK STATUS 1907 |
|---|---|---|---|---|---|---|---|
| YYYY.MM.DD.hh.mm.00 | 10 | | | | | | |
| | 11 | | | | | | |
| | ... | | | | | | |
| YYYY.MM.DD.hh.mm.00 | 10 | | | | | | |
| | 11 | | | | | | |
| | ... | | | | | | |
| ... | ... | ... | ... | ... | ... | ... | ... |

| TIME / LOGICAL STORAGE UNIT NUMBER | | CLEAN COUNTER 1804 | DIRTY COUNTER 1805 | FREE COUNTER 1806 |
|---|---|---|---|---|
| YYYY. MM. DD. hh. mm. 00 | 0000 | | | .... |
| | 0001 | | | .... |
| | .... | .... | .... | .... |
| | TOTAL | | | |
| YYYY. MM. DD. hh. mm'. 00 | 0000 | | | .... |
| | 0001 | | | .... |
| | .... | .... | .... | .... |
| | TOTAL | | | |
| .... | .... | .... | .... | .... |

| TIME | ENTRIES / PORT # 1202 | AVERAGE IOPS 1204 | MAXIMUM IOPS 1205 | AVERAGE MBPS 1206 | MAXIMUM MBPS 1207 | AVERAGE I/O PROCESSING TIME 1208 | MAXIMUM I/O PROCESSING TIME 1209 | SEQUENTIAL RATIO 1210 | READ-WRITE RATIO 1211 |
|---|---|---|---|---|---|---|---|---|---|
| YYYY. MM. D D. hh. mm. 00 | 00 | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | READ ACCESS TIME/WRITE ACCESS TIME | SEQUENTIAL ACCESS TIME/TOTAL OCCUPIED TIME |
| | 01 | | | | | | | | |
| | 02 | ... | ... | ... | ... | ... | ... | ... | ... |
| YYYY. MM. D D. hh. mm. 00 | 00 | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | DISK ACCESS OCCUPIED TIME | READ ACCESS TIME/WRITE ACCESS TIME | SEQUENTIAL ACCESS TIME/TOTAL OCCUPIED TIME |
| | 01 | | | | | | | | |
| | 02 | ... | ... | ... | ... | ... | ... | ... | ... |
| ... | | | | | | | | | |

| PORT NUMBER 1400 | STATUS 1401 | CONNECTED WWN 1402 | MAXIMUM IOPS 1403 | MAXIMUM MBPS 1404 | MINIMUM IOPS 1405 | MINIMUM MBPS 1406 | TARGET IOPS 1407 | TARGET MBPS 1408 | BAND 1409 | PROTOCOL 1410 |
|---|---|---|---|---|---|---|---|---|---|---|
| 00 | TARGET | HOST WWN | 100 | 50 | 10 | 10 | 100 | 50 | 2G | FC |
| | | ... | ... | ... | ... | ... | ... | ... | | |
| 01 | TARGET | HOST WWN | 100 | 50 | 10 | 10 | 50 | 25 | 2G | FC |
| | | ... | ... | ... | ... | ... | ... | ... | | |
| 02 | TARGET | HOST WWN | 100 | 50 | 10 | 10 | 100 | 50 | 2G | iSCSI |
| | | ... | ... | ... | ... | ... | ... | ... | | |
| ... | ... | ... | ... | ... | ... | ... | ... | ... | ... | ... |
| 10 | INITIATOR | GENERAL PURPOSE STORAGE WWN | 100 | 50 | 10 | 10 | 25 | 25 | 2G | FC |
| | | ... | ... | ... | ... | ... | ... | ... | | |
| 11 | INITIATOR | GENERAL PURPOSE STORAGE WWN | 100 | 50 | 10 | 10 | 50 | 50 | 2G | FC |
| | | ... | ... | ... | ... | ... | ... | ... | | |
| ... | ... | ... | ... | ... | ... | ... | ... | ... | ... | ... |

226

| PROCESSOR NUMBER 1451 | STATUS 1452 | OPERATING RATIO 1453 |
|---|---|---|
| 00 | TARGET | ... |
| 01 | TARGET | ... |
| 02 | TARGET | ... |
| ... | ... | ... |
| 10 | INITIATOR | ... |
| 11 | INITIATOR | ... |
| ... | ... | ... |

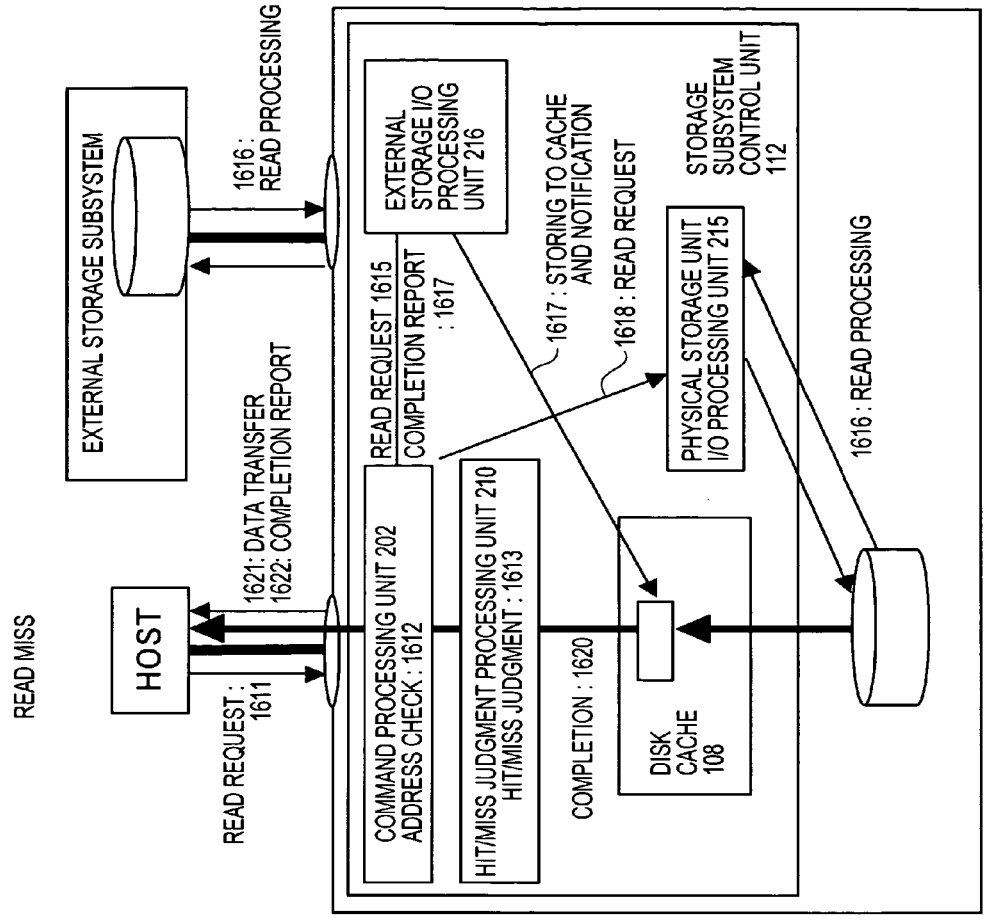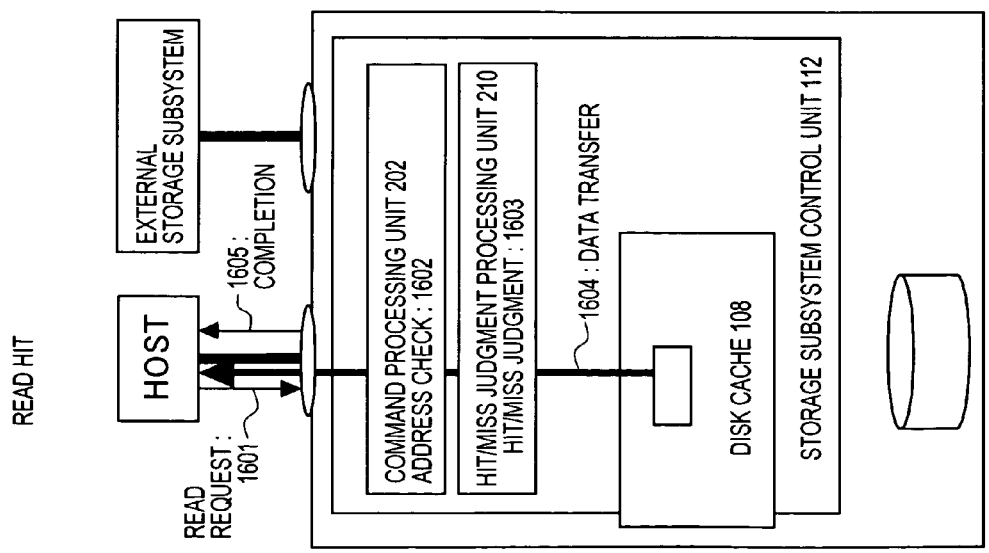

( Port = W, LUN = N )

| ID | DUMMY DATA SIZE (BYTE) | TARGET (IOPS) | LOCALITY (%) | READ-WRITE RATIO | MEASURED (IOPS) | MEASURED (MBPS) | RESPONSE |
|---|---|---|---|---|---|---|---|
| 0 | 512 | 2000 | 0 | 100 | ... | ... | ... |
| 1 | 1024 | 2000 | 0 | 100 | ... | ... | ... |
|   | 2048 | 2000 | 0 | 100 | ... | ... | ... |
|   | 4096 | 2000 | 0 | 100 | ... | ... | ... |
|   | ... | ... | ... | ... | ... | ... | ... |
|   | ... | ... | ... | ... | ... | ... | ... |

| DUMMY DATA SIZE (BYTE) | TARGET (IOPS) | LOCALITY (%) | READ-WRITE RATIO | MEASURED (IOPS) | MEASURED (MBPS) | RESPONSE |
|---|---|---|---|---|---|---|
| 512 | 2000 | 100 | 100 | ... | ... | ... |
| 1024 | 2000 | 100 | 100 | ... | ... | ... |
| 2048 | 2000 | 100 | 100 | ... | ... | ... |
| 4096 | 2000 | 100 | 100 | ... | ... | ... |
| ... | ... | ... | ... | ... | ... | ... |
| ... | ... | ... | ... | ... | ... | ... |

| FILE NAME | FILE ID | FILE SIZE | FILE TYPE | CREATION TIME | LAST ACCESS TIME | LAST UPDATE TIME | ACCESS FREQUENCY | IMPORTANCE |
|---|---|---|---|---|---|---|---|---|
| | | | | | | | | |
| | | | | | | | | |

2411　2412　2413　2414　2415　2516　2417　2418　2419

DEVICE FOR PERFORMANCE TUNING IN A SYSTEM

BACKGROUND OF THE INVENTION

The present invention relates to a technique of performance tuning of the whole storage subsystem having storage subsystems that are not directly connected to host computers.

As a result of the recent spread of Internet and adaptation to development of broadband, an amount of information treated by a computer system increases year by year, and importance of information continues to increase. Accordingly, in a computer system, it is requested more and more strongly that a storage used for accumulating information read and written by a host computer (particularly a storage subsystem connected outside the host computer) should have high reliability, for example, in protection of the stored data, in addition to large capacity and high performance.

A disk array system is one method of satisfying these requests together, in a storage subsystem.

In a disk array system, data is distributed and stored into a plurality of physical storage units arranged in an array, realizing data redundancy. Namely, high capacity is obtained by providing a plurality of physical storage units, high performance by operating the physical storage units in parallel, and high reliability by data redundancy.

Disk array systems are classified into five classes, the level 1 through the level 5, depending on configurations for realizing redundancy (For example, D. A. Patterson, G. Gibson and R. H. Kats, "A Case for Redundant Arrays of Inexpensive Disks" (in Proc. ACM SIGMOD, pp. 109 to 116, June 1988) (hereinafter, referred to as Non-Patent Document 1)). There are disk array systems arranged such that data is simply divided and stored into a plurality of physical storage units, without being given redundancy. Such disk array system is called the level 0. In the following, a set of a plurality of physical storage units realizing a certain level described above is referred to as a parity group. Further, a configuration for realizing redundancy is referred to as the RAID configuration.

Costs of constructing a disk-array system and performance and characteristics of the constructed disk array system depend on the level of the disk array system. Thus, frequently, in constructing a disk array system, a plurality of arrays (i.e., sets of disk unit) of different levels is used mixedly, depending on the intended purpose of the disk array system.

Since performance of a disk array system is increased by operating a plurality of physical storage units in parallel, it is required to perform performance tuning, namely, to efficiently distribute data into a plurality of parity groups depending on details of processing to perform.

Physical storage units constituting a parity group are different in their costs depending on their performance and capacities. Thus, sometimes, parity groups are each constructed by combining physical storage units having performance and capacities different from other parity groups. In the case of such a disk array system in which different parity groups have different physical storage units, performance tuning is still more important.

As a technique of realizing performance tuning of a disk array system, may be mentioned, for example, a technique in which a disk array system monitors frequency of access from a host computer to stored data and locates data having higher access frequency onto a physical storage unit of a higher speed (See, for example, Japanese Patent Laid-Open Publication No. 2000-293317 (hereinafter, referred to as Patent Document 1)).

Further, there exists a technique in which, based on a tendency that processing performed in a computer system and I/O accompanying the processing are performed according to a schedule made by a user and thus show daily, monthly and yearly periodicity, a disk array system accumulates using states of each physical storage unit and reallocates data in consideration of a previously-determined processing schedule (See, for example, Japanese Patent Laid-Open Publication No. 2001-67187 (hereinafter, referred to as Patent Document 2)).

As described above, in a disk array system data is distributed into physical storage units such that the data has been allocated having redundancy. In order that a host computer does not need to be conscious of actual storage locations of data in the physical storage units, logical addresses used for the host computer to access the physical storage units are held separately from actual physical addresses of the physical storage units, and information indicating correspondence between the logical addresses and the physical addresses is held.

Accordingly, in the above-described techniques, when data is reallocated, a disk array system changes the correspondence between logical addresses and physical addresses before the reallocation into the correspondence after the reallocation. As a result, even after the data reallocation, a host computer can use the same logical address to access the physical storage units. Such data migration within physical storage units, which does not affect access from a host computer thereafter, is called host transparent migration.

On the other hand, as a technique of increasing the number of storage units that can be accessed from a host computer, to cope with increasing amount of information, there is a technique of enabling a host-computer to access storage units to which the host computer can not directly input and output owing to, for example, interface mismatching (See, for example, Japanese Patent Laid-Open Publication No. 10-283272 (hereinafter, referred to as Patent Document 3)).

According to the technique disclosed in Patent Document 3, a disk array system to which a host computer can directly input and output sends I/O requests and the like from the host computer to a disk array system to which the host computer can not directly input and output.

SUMMARY OF THE INVENTION

It is possible to use the technique disclosed in Patent Document 3 to expand data storage areas used by a host computer up to a disk array system (an external system) to which the host computer can not directly input and output.

However, in the case where an external system is added, there do not exist a function of monitoring the using state, the load state and the like of the external system from a disk array system to which a host computer can directly input and output, and a function of reallocating data. As a result, under the present conditions, the monitoring results can not be used to perform performance tuning including the external system.

Hereinafter, a storage subsystem that is not an object of input/output processing of a host computer (i.e., a storage subsystem that is not directly connected to the host computer) is referred to as an external storage subsystem. Then, considering the above-described situation, an object of the present invention is to make it possible to perform performance tuning including a plurality of external storage subsystems, in a storage subsystem that is connected with those external storage subsystems and has a function of relaying I/O requests from the host computer to the external storage subsystems.

To attain the above object, a storage subsystem according to the present invention monitors operating conditions of external storage subsystems connected to the storage subsystem itself, and carries out performance tuning based on the monitoring result.

In detail, the storage subsystem according to the present invention is a storage subsystem that is connected with one or more computers and presents a plurality of storage units as logical devices to said computers, comprising: a mapping means which defines a plurality of storage units presented by an external storage subsystem having said plurality of storage units, as said logical devices of said storage subsystem itself; an I/O processing means which relays I/O processing requests from said computers to logical devices (external devices) defined from the storage units presented by the external storage subsystem, among said logical devices of the storage subsystem itself; an operating information acquisition means which monitors said I/O processing means, to acquire operating information of said external devices; a configuration change planning means which makes an optimum data allocation plan in a range of said logical devices (including said external devices) of the storage subsystem itself, based on the operating information acquired by said operating information acquisition means; and a data reallocation means which reallocates data in the logical devices (including said external devices) of the storage subsystem itself, according to the plan made by said configuration change planning means.

According to the present invention, in a storage subsystem connected with a plurality of external storage subsystems that are not input/output processing objects of host computers, it is possible to carry out performance tuning of the whole storage subsystem including the connected external storage subsystems.

BRIEF DESCRIPTION OF THE DRAWINGS

FIG. 3 is a diagram for explaining functions of a storage subsystem control unit 112 of the first embodiment;

FIG. 4 is a diagram showing an example of logical-physical correspondence information of the first embodiment;

FIG. 5 is a diagram showing an example of logical storage unit operating information of the first embodiment;

FIG. 6 is a diagram showing an example of physical storage unit attribute information of the first embodiment;

FIG. 7 is a diagram showing an example of the logical storage unit operating information of the first embodiment;

FIG. 8 is a diagram showing an example of logical storage unit attribute information of the first embodiment;

FIG. 9 is a diagram showing an example of physical storage unit operating information of the first embodiment;

FIG. 10 is a diagram for explaining external storage operating information of the first embodiment;

FIG. 11 is a diagram for explaining a cache amount counter of the first embodiment;

FIG. 12 is a diagram for explaining an example of port operating information of the first embodiment;

FIG. 13 is a diagram showing an example of port setting information of the first embodiment;

FIG. 18A is a diagram for explaining processing to be performed at the time of occurrence of a read request to the external storage subsystem of the first embodiment;

FIG. 18B is a diagram for explaining processing to be performed at the time of occurrence of a read request to the external storage subsystem of the first embodiment;

FIG. 28 is a diagram for explaining an example of a performance measurement result using dummy data sent in the second embodiment;

FIG. 31 is a diagram showing an example of file management information of the third embodiment.

DESCRIPTION OF THE PREFERRED EMBODIMENTS

Figure 1:
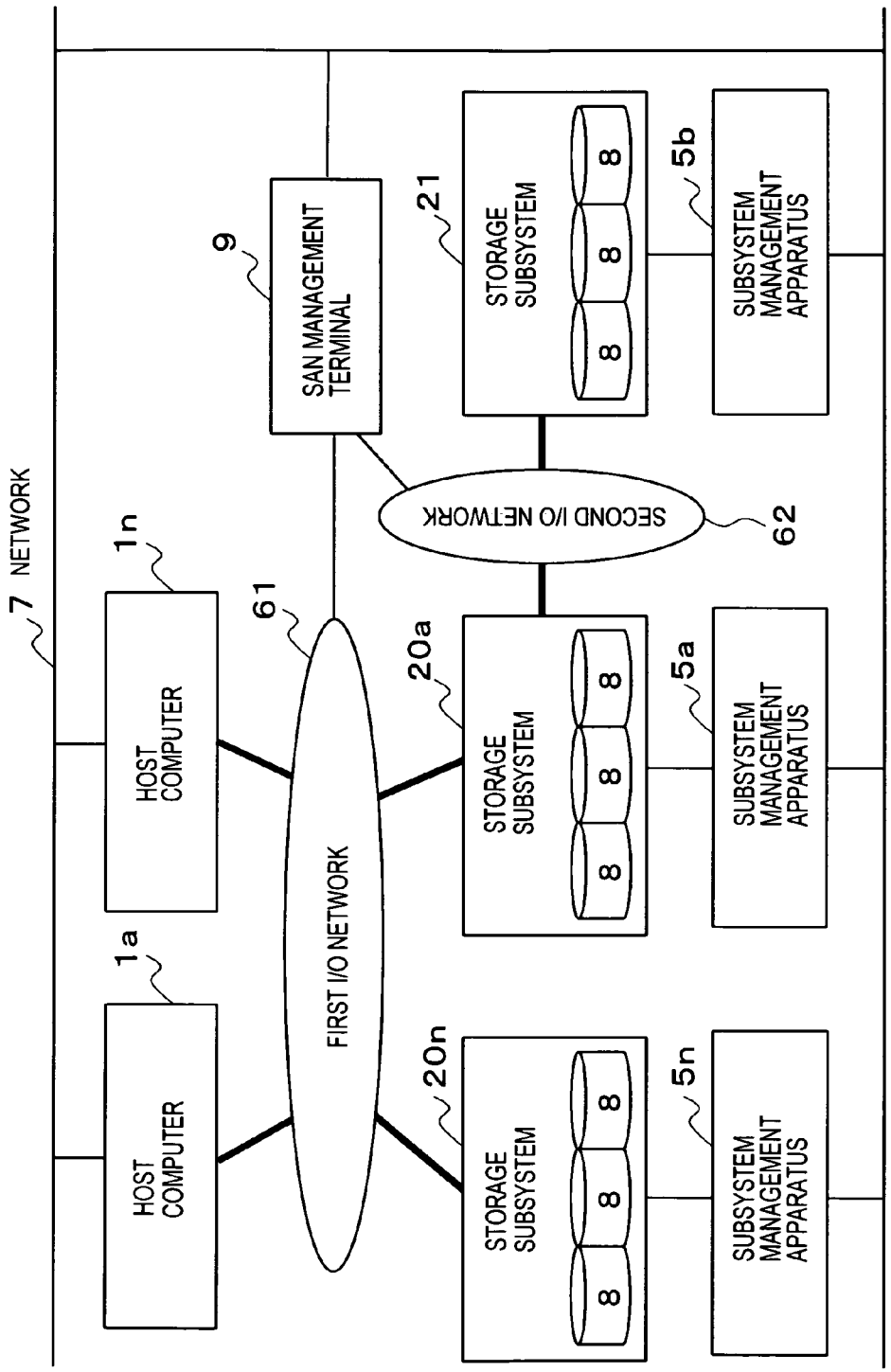
FIG. 1 is a block diagram showing an entire computer system of a first embodiment of the present invention.

Now, embodiments of the present invention will be described referring to the drawings, although these embodiments do not limit the present invention.

First Embodiment

[Entire Configuration]

FIG. 1 is a diagram for explaining an example of a configuration of a computer system according to a first embodiment of the present invention.

As shown in the figure, the computer system comprises: one or more host computers 1a ... 1n (the number of host computers does not matter, and the host computers are representatively referred to as a host computer 1); storage subsystems 20a ... 20n (the number of the storage subsystems does not matter, and the storage subsystems are representatively referred to as a storage subsystem 20); subsystem management apparatuses 5 used for performing maintenance and administration of the storage subsystems 20; a first I/O network 61 used for I/O processing of the host computers 1 and the storage subsystems 20; a network 7 connecting the host computers 1, the storage subsystems 20 and the subsystem management apparatuses 5; a SAN management terminal 9 performing configuration management of a storage area network comprising the host computers 1, I/O networks and the storage subsystems 20a ... 20n; storage subsystem 21 (the number of these storage subsystems does not matter, and these storage subsystems are referred to as external storage subsystems in distinction from the storage subsystems 20 to which the host computers 1 perform direct input/output processing, and representatively referred to as an external storage subsystem 21); and a second I/O network 62 connecting the storage subsystems 20 and the external storage subsystems 21.

Each of the host computers 1 is a computer such as a personal computer (PC), a workstation (WS), a mainframe (MF), or the like. On the host computer 1, run an operating system (hereinafter, referred to as an OS) adapted for the kind of that computer, application programs (AP) that can run on the OS and are suitable for various kinds of business or uses, such as a database management system (DBMS), and the like. Although, for the sake of simplicity, the present invention describes two host computers 1, any number of host computers may exist.

Each of the storage subsystems 20 and the external storage subsystems 21 is a storage system of a disk array configuration having a plurality of physical storage units put in an array, and provides logical storage units 8 as data input/output areas to the host computers 1. Further, in the present embodiment, in addition to the host computers 1, the storage subsystem 20a has a function of issuing I/O requests to the external storage subsystems 21.

The external storage subsystems 21 are connected not to the first I/O network 61 used by the host computers for input/output processing, but to the second I/O network 62 used by the storage subsystems 20 for input/output processing. Accordingly, the external storage subsystems 21 do not receive an I/O processing request directly from the host computer 1, but receive an I/O processing request through the second I/O network 62 from the storage subsystem 20 that has received the I/O processing request from the host computer 1 through the first I/O network 61.

The subsystem management apparatuses 5a and 5b acquires failure information, maintenance information, configuration information, performance information and the like of the storage subsystems 20 and the external storage subsystems 21 from the storage subsystems 20 and the external storage subsystems 21 respectively, and hold the acquired information. Further, the subsystem management apparatuses 5a and 5b provides user interfaces for management of the storage subsystems 20 and the external storage subsystems 21.

Here, "management" in the present embodiment means, for example, monitoring of a failure and performance, definition of a configuration, installation of a program running on a storage subsystem, and the like. When, for example, logical storage units 8 are to be set into the storage subsystem 20 or the external storage subsystem 21, a storage area for backup of data is to be set, or a pair of storage areas is to be set which duplicates data, then, the subsystem management apparatus 5a or 5b receives an instruction from a user, and sends a setting instruction or setting information to the storage subsystem 20 or the external storage subsystem 21.

The first I/O network 61 is used for the host computer 1 to perform I/O processing of various commands and data toward the storage subsystem 20. The second I/O network 62 is used for the storage subsystem 20 to perform I/O processing of various commands and data toward the external storage subsystem 21.

A command and data related to an I/O processing request from the host computer 1 to the storage subsystem 20 is transmitted through the first I/O network 61. And, a command and data related to an I/O processing request from the host computer 1 to the external storage subsystem 21 is transmitted to the storage subsystem 20 through the first I/O network 61, and then, transmitted from the storage subsystem 20 to the external storage subsystem 21 through the second I/O network 62.

The first I/O network 61 and the second I/O network 62 use optical cable or copper wire. And, as a communication protocol used in the first I/O network 61 and the second I/O network 62, may be mentioned Ethernet (a registered trademark), FDDI, the fiber channel (FC), SCSI, Infiniband, TCP/IP, iSCSI, or the like.

The network 7 is used, for example, for transmitting management information on a failure, maintenance, configuration, performance and the like of the storage subsystems 20 and 21 from the storage subsystems 20 and 21 to the subsystem management apparatuses 5, for transmitting setting information from the subsystem management apparatuses 5 to the storage subsystems 20 and 21, and for transmitting the above-mentioned management information on a failure, maintenance, configuration, performance and the like from the subsystem management apparatuses 5 to the SAN management terminal 9 or the host computers 1. Cable material and a communication protocol used for the network 7 may be either same as or different from the cable material and the communication protocol used for the first I/O network 61 and the second I/O network 62.

It is sufficient that the second I/O network 62 and the first I/O network 61 are separated from each other from the viewpoint of network processing logic. In other words, the second I/O network 62 and the first I/O network 61 may be physically separated, or may be connected to a common I/O network switch while being logically separated in their transmission lines. For example, both paths may be connected to an FC switch through the fiber channel and the zoning technique may be used in the FC switch so that the FC switch realizes logically-different networks. In that case, those networks are arranged such that the logical storage units 8 whose paths are defined to be under ports of the external storage subsystems 21 connected only to the second I/O network 62 can not be detected by the host computers 1 and can not become direct I/O objects.

[Configuration of the Storage Subsystems 20 and the External Storage Subsystems 21]

Figure 2:
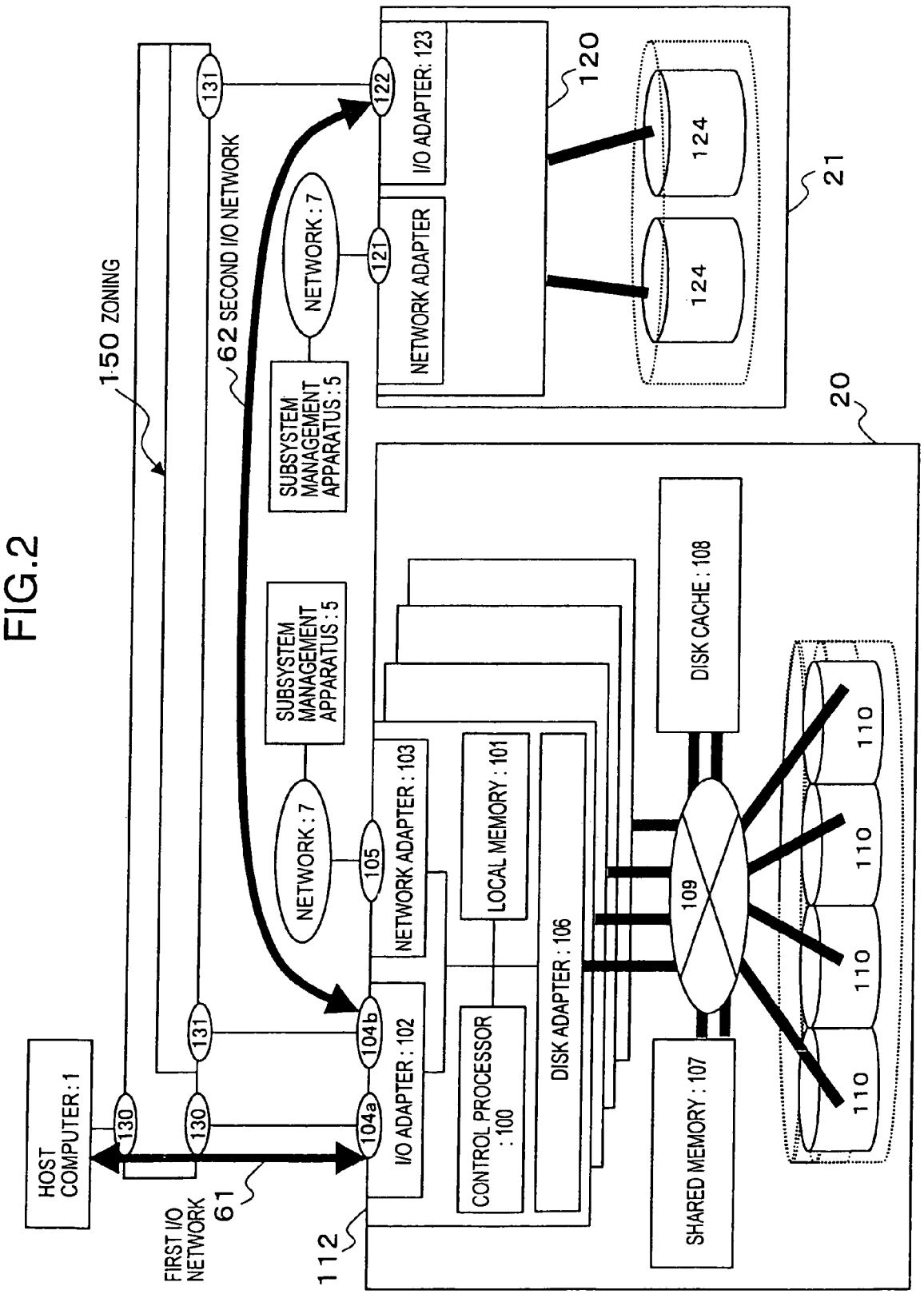
FIG. 2 is a diagram for explaining a functional configuration and a connection state of a storage subsystem and an external storage subsystem of the first embodiment.

FIG. 2 is a diagram for explaining hardware configurations of the storage subsystem 20 and the external storage subsystem 21 and a connection state between them. Here, description is given taking the example where I/O network switches 130 are used on the first I/O network 61 and the second I/O network 62.

As shown in FIG. 1, the storage subsystem 20 is connected to the host computers 1 through the first I/O network 61, and the external storage subsystem 21 is connected to the storage subsystem 20 through the second I/O network 62.

The storage subsystem 20 comprises at least one storage subsystem control unit 112, a shared memory 107, a disk cache 108, physical storage units 110 constituting logical storage units 8, and an internal network 109 connecting the storage subsystem control unit 112, the shared memory 107, the disk cache 108 and the storage units 110.

The storage subsystem control unit 112 comprises: an I/O adapter 102 having at least one port 104a for the first I/O network and at least one port 104b for the second I/O network; a network adapter 103 having a port 105 for the network 7; a control processor 100; a local memory 101; and a disk adapter 106. The I/O adapter 102, the network adapter 103, the control processor 100, the local memory 101 and the disk adapter 106 are connected with one another through an internal bus.

A port 104a is a target port that is connected to the host computers 1 through the first I/O network 61 through the I/O network switches 130, and receives I/O processing requests from the host computers 1.

The port 104b is an initiator port that is connected to the external storage subsystem 21 through the second I/O network 62 through the I/O network switches 131, and sends I/O processing requests to the external storage subsystem 21.

The port 105 is connected to the subsystem management apparatus 5a through the network 7, and as described above, used for receiving request instructions and information from the subsystem management apparatus 5a and for sending information at need. For example, the port 105 is used for sending configuration information, failure information and performance information of the storage subsystem 20 to the subsystem management apparatus 5a.

An I/O processing request from the host computer 1 to the external storage subsystem 21 is received at the port 104a through the first I/O network 61, and sent to the external storage subsystem 21 through the port 104b and the second I/O network 62.

Here, the ports 104a and 104b may be provided not as physically separated ports, but as one port having both functions of an initiator port and a target port.

The control processor 100 executes programs which controls the storage subsystem 20. In the present embodiment, a plurality of control processors 100 are provided, and their statuses are set according to control objects of the programs to execute. As described below, the statuses are set so as to define a control processor for processing I/O from the host computer 1 as a target processor and a control processor processing I/O for processing I/O from and to the external storage subsystem as an initiator processor.

The shared memory 107 and the local memory 101 store programs and data required for operating the storage subsystem 20.

The disk adapter 106 connects the storage subsystem control unit 112 and the internal network 109, and provides an interface with the physical storage units 110 which performs input/output processing.

The external storage subsystem 21 is fundamentally similar to the storage subsystem 20 in their configurations. For example, the external storage subsystem 21 comprises: a storage subsystem control unit 120 which controls the whole external storage subsystem 21; an I/O adapter 123 connecting a port 122 and an internal bus within the storage subsystem control unit 120; a port 121 for the network 7; and physical storage units 124 constituting logical storage units 8.

Further, the port 122 is connected through the second I/O network 62 through the I/O network switches to the port 104b in the I/O adapter 102 of the storage subsystem 20.

[Functional Configuration of the Storage Subsystem 20]

Next, functions of the storage subsystem 20 will be described. These functions are realized when the control processor 100 executes the programs stored in the shared memory 107 and the local memory 101. Further, data and the like used for realizing these functions will be described also.

FIG. 3 is a diagram for explaining functions of the storage subsystem control unit 112.

The storage subsystem control unit 112 comprises: an I/O network processing unit 200; a network processing unit 201; a command processing unit 202; a logical storage unit operating information processing unit 206; a physical storage unit operating information processing unit 207; an external storage area operating information acquisition processing unit 208; a cache hit/miss judgment processing unit 210; a cache amount management unit 212; a port control unit 213; a processor operating information acquisition processing unit 214; a physical storage unit I/O processing unit 215; an external storage I/O processing unit 216; a configuration definition processing unit 217; a configuration change planning processing unit 218; a configuration change plan execution processing unit 219; an external storage unit attribute information acquisition processing unit 221; and a manager 223. These are stored in the form of programs in the local memory 101.

Data processed by these processing units or data required for processing is stored as logical-physical correspondence information 203, logical storage unit attribute information 204, physical storage unit attribute information 205, external storage operating information 209, a cache amount counter 211, external storage unit attribute information 220, schedule information 222, logical storage unit operating information 224, physical storage unit operating information 225, processor operating information 226, configuration change planning information 227, port setting information 228, or port operating information 229, in the local memory 101 or the shared memory 107 of the storage subsystem control unit 112.

Further, on the local memory 101, there is a timer program (not shown) having time information of the storage subsystem. Sometimes, the storage subsystem may have a plurality of storage subsystem control units 112. In that case, one representative storage subsystem control unit 112 is set in advance through the subsystem management apparatus 5. And, the time information held by the timer program of the representative storage subsystem control unit 112 set in advance is stored as common time information in the shared memory 107. The storage subsystem control units 112 other than the representative storage subsystem control unit 112 refer to the time information stored in the shared memory 107. Owing to this arrangement, all the storage subsystem control units 112 can have common time information.

Now, details of the above-described processing units and the information held by the storage subsystem control unit 112 will be described.

[I/O Network Processing Unit 200]

The I/O network processing unit 200 controls the ports 104a and 104b and the I/O adapter 102. According to an instruction received from a storage administrator through the subsystem management apparatus 5, the I/O network processing unit 200 sets the ports 104a and 104b each at one of three statuses, i.e., an initiator port, a target port and a mixed mode.

[Network Processing Unit 201]

The network processing unit 201 controls the network port 105 and the network adapter 103.

[Configuration Definition Processing Unit 217]

The configuration definition processing unit 217 defines correspondence between the logical storage units 8 and the physical storage units 110 or 124, and stores the correspondence as the logical-physical correspondence information 203 into the shared memory 107.

Generally in a computer system, in order to detect logical storage units of storage subsystems connected to the host computer 1, the host computer 1 sends Inquiry command (in the case of SCSI, for example) to detect devices, immediately after activation of the host computer 1.

Similarly, in the present embodiment, immediately after activation of the host computer 1, the host computer 1 detects the target port 104a of the storage subsystem 20 and logical storage units 8 for which input/output processing can be performed through the target port 104a. Then, the configuration definition processing unit 217 sets the correspondence between the logical storage units 8 and the physical storage units 110 when the logical storage units 8 are defined according to a user's instruction. The correspondence between the logical storage units 8 and the physical storage units 110 is stored as the logical-physical correspondence information 203 into the shared memory 107.

Further, immediately after starting up of the system, or according to an administrator's instruction, the configuration definition processing unit 217 sends a predetermined command to the external storage subsystem 21, to define the logical storage units 8 of the external storage subsystem 21 as logical storage units 8 of the storage subsystem 20. Then, definition information is stored as the logical-physical correspondence information into the shared memory 107.

In the present embodiment, through the initiator port 104b, the configuration definition processing unit 217 detects the target port 122 of the external storage subsystem 21 and the logical storage units 8 for which input/output processing can be performed through the target port 122. The subsystem management apparatus 5a receives an instruction from the administrator of the storage subsystem 20 to the effect that the detected logical storage units 8 are set as logical storage units 8 of the storage subsystem 20. Then, the subsystem management apparatus 5a sends the received instruction to the storage subsystem 20. Receiving the instruction, the configuration definition processing unit 217 of the storage subsystem 20 defines the detected logical storage units 8 as logical storage units 8 of the storage subsystem 20.

Here, it is possible to arrange such that, when the storage subsystem 20 detects the logical storage units 8 for which input/output processing can be performed in the external storage subsystem 21, the configuration definition processing unit 217 automatically defines the detected logical storage units 8 as logical storage units 8 of the storage subsystem 20.

Further, definition of logical storage units 8 is not limited to immediately after activation of the host computer 1. It is possible that, during operation of the system, the configuration definition processing unit 217 receives an instruction from the storage subsystem administrator to define logical storage units 8.

[Logical-Physical Correspondence Information 203]

Next, will be described the logical-physical correspondence information 203 that the configuration definition processing unit 217 stores into the shared memory 107. As described above, the logical-physical correspondence information 203 is generated and updated by the configuration definition processing unit 217. Further, as described below, optimization is performed in performance tuning processing, and also the configuration change plan execution processing unit 219 updates the logical-physical correspondence information 203 when there is a change in the correspondence between the logical storage units 8 and the physical storage units 110 and 124.

The logical-physical correspondence information 203 stores information indicating correspondence between logical addresses used by the host computer 1 in order to access the storage units 110 of the storage subsystem 20 and physical addresses of the storage units 110 and 124 of the storage subsystem 20 and external storage subsystem 21.

FIG. 4 shows an example of the logical-physical correspondence information 203. As shown in the figure, the logical-physical correspondence information 203 includes: a logical address storing part 600 which stores an addresses of a logical storage apparatus; and a physical address storing part 601 which stores an addresses of the physical storage unit 110 that actually store data. The logical-physical correspondence information 203 is generated for each port 104a.

The logical address storing part 600 comprises: a target logical storage unit number storing part 602 which stores a logical storage unit number (for example, an LU (Logical Unit) number in the case of SCSI) of a logical storage unit 8 (for example, an LU in the case of SCSI, and hereinafter, referred to as a target logical storage unit) detected by accessing the port-104a of the storage subsystem 20; a target logical storage unit address storing part 603 which stores an address in the target logical storage unit; an LDEV number storing part 604 which stores a logical storage unit number (hereinafter, referred to as an LDEV (Logical Device) number) that is given internally to cover the entire storage subsystem 20; and an LDEV address storing part 605 which stores its address (hereinafter, referred to as an LDEV address).

Seen from the host computer 1, the target logical storage unit numbers are uniquely determined for each target port 104a as an input/output object, and the host computer 1 uses those LU numbers which performs read/write of data from/to the storage subsystem 20.

A target logical storage unit is defined by associating an LDEV with a target port. A plurality of LDEVs may be combined to define one target logical storage unit. Further, an LDEV assigned to a target logical storage unit number may be different or same for each host computer 1.

Further, the physical address storing part 601 stores a physical address corresponding to a target logical storage unit number stored in the logical storage unit number storing part 602.

The physical address storing part 601 comprises: a parity group(PG) number storing part 606 which stores a parity group number; a data storing part 607 which stores information of a disk unit that stores data; a parity storing part 608 which stores information on parity; and an external storage storing part 609 which stores g data related to an external storage subsystem.

Further, the data storing part 607 comprises a disk unit number storing part 610 which stores a physical storage unit (disk unit) number and an address-in-disk-unit storing part 611 which stores an address in a disk unit. The parity storing part 608 comprises a disk unit number storing part 612 and an address-in-disk-unit storing part 613 which stores an address in a disk unit. The external storage storing part 609 comprises: a port number-disk unit number storing part 614 which stores a port number and a physical storage unit number that are used for accessing a physical storage unit in an external storage subsystem; and a logical storage address storing part 615 which stores an address in a disk unit.

The disk unit number storing part 612 and the address-in-disk-unit storing part 613 store disk units which store redundant data corresponding to a level of a parity group and its address.

The parity group number storing part 606, the disk unit number storing part 610 and the address-in-disk-unit storing part 611 store a parity group number, a disk unit number and an address for uniquely indicating a physical address corresponding to a data storage address (which is determined by the LDEV number stored in the LDEV number storing part 604 and the LDEV address stored in the LDEV address storing part 605) of a logical storage unit.

In the present embodiment, when a target logical storage unit corresponds to a storage unit address in a parity group consisting of physical storage units in the storage subsystem 20, then, the parity group number storing part 606 and the data storing part 607 store respective effective values. And, the external storage storing part 609 stores an invalid value (for example, "−1" in FIG. 4).

Further, when a physical address corresponding to a target logical storage unit number stored in the logical storage unit number storing part 602 means a logical storage unit of the external storage subsystem 21 (for example, when the logical storage unit number is an entry of F3), then, the external storage storing part 609 stores an effective values and the data storing part 607 and the parity storing part 608 store invalid values (for example, "−1" in FIG. 4).

[Command Processing Unit 202]

Next, will be described the command processing unit 202 that performs processing according to an I/O processing request received from the host computer 1. An I/O processing request is a read request, a write request or a storage subsystem status information acquisition request (for example, Inquiry command in SCSI) for acquiring configuration information, failure information or the like. The command processing unit 202 extracts a logical address of a processing object from an I/O processing request received from the host computer 1. Then, the command processing unit 202 refers to the logical-physical correspondence information 203 to read the corresponding physical address, and performs data input/output processing or notifies the host computer 1 of the status of the target logical storage unit. Details of data input/output processing (data read/write processing) will be described later.

[Logical Storage Unit Attribute Information 204]

The logical storage unit attribute information 204 holds attribute information (which is inputted in advance through the subsystem management apparatus 5 or the like) of a logical storage unit 8, such as, a size, an emulation type, reserve information, path definition information, information on the host computer 1 as an I/O object (an I/O port identifier of the host computer 1, such as a World Wide Name (WWN) in FC).

FIG. 5 shows an example of data held in the logical storage unit attribute information 204. As shown in the figure, the logical storage unit attribute information 204 is information indicating an identifier (number) of a target port that can be accessed as an input/output processing object from the host computer 1, an identifier (number) of a target logical storage unit to which input is possible through the target port, and a parity group (a physical storage unit) as a mapping destination corresponding to the address of the target logical storage unit.

The logical storage unit attribute information 204 includes: an ID storing part 1101 which stores an identifier (ID) of a target port 104a; and a target logical storage unit number storing part 1102 which stores identifier of a target logical storage unit 8.

The logical storage unit attribute information 204 further comprises: an LDEV number storing part 1103 which stores an identifier (an LDEV number) of an LDEV constituting the target logical storage unit stored in the target logical storage unit number storing part 1102; and a PG number storing part 1104 which stores an identifier of a parity group (PG) to which the mentioned LDEV belongs.

The logical storage unit attribute information 204 further comprises a storage type storing part 1105 indicating whether a logical storage unit 8 is a storage subsystem (such as the storage subsystem 20) that can be directly accessed from the host computer 1 through the first I/O network 61, or an external storage subsystem that should be accessed through the storage subsystem 20 and the second I/O network 62.

When the storage type storing part 1105 stores information indicating the external storage subsystem 21, then, the storage type storing part 1105 stores also an address (for example, WWN in FC, LUN, and the like) required for accessing the external storage subsystem 21 in question.

In addition, the logical storage unit attribute information 204 further comprises: an emulation type-capacity storing part 1106 which stores information on an emulation type and a capacity; a path definition information storing part 1107; a status information storing part 1108 which stores status information of the logical storage unit; and a storage unit performance storing part 1109.

Here, the emulation type is emulation information of the logical storage unit, indicating, for example, whether the logical storage unit is one for certain kind of mainframe, or a logical storage unit that is an access object for an open-architecture type host computer, or a logical storage unit that can be accessed from both type of computers. And the information on the capacity indicates the capacity of the logical storage unit.

The status of a logical storage unit is an online status in which an I/O processing request is received from the host computer 1, a reserve status in which the logical storage unit is reserved, for example, as a storing destination of a copy (snapshot data) at some point of time of some logical storage unit or as a remote copy destination for remote backup or disaster recovery, a blocked status owing to a failure in the logical storage unit, or the like.

Further, for the logical storage unit 8, the path definition means defining logical storage unit numbers of logical storage units existing under an I/O port of the storage subsystem, associating those logical storage unit numbers with the I/O port, in order that the host computer 1 can access the logical storage unit 8 as an input/output object by designating a pair of a target port number and a logical storage unit number.

[Parity Group (Physical Storage Unit) Attribute Information 205]

Next, will be described attribute information of physical storage units (such as hard disks) constituting each parity group within the storage subsystem 20 or the external storage subsystem 21.

The physical storage unit attribute information 205 is set in advance by the administrator of the storage subsystem 20 through the subsystem management apparatus 5 or the like, and stored in the shared memory 107 or the local memory 101. The attribute information stored as the physical storage unit attribute information 205 includes, for example, a type, a reaction velocity and a rotational speed, sustaining performance, a rotational delay time, a command overhead, RAID configuration information, and the like of physical storage units 110. The RAID configuration information is information that is set when a configuration of parity groups is defined, and thus, instead of the RAID configuration information, the information on the configuration of the parity groups may be used.

FIG. 6 shows an example of data stored in the physical storage unit attribute information 205. As shown in the figure, the physical storage unit attribute information 205 includes: a parity group number storing part 801 which stores a parity group number of a parity group to which physical storage units belong; a disk performance index storing part 802 which stores performance index information of a disk belongs to the parity group; a RAID level storing part 803 which stores a RAID configuration of the parity group; a detailed configuration storing part 804 which stores details of the RAID configuration; a sequential volume storing part 805 which stores operational attribute information of the parity group; and attribute information 806 indicating a read/write characteristic.

The disk performance index storing part 802 holds information such as a command overhead, a seek time, an average latency and a media transfer time of disks used in the parity group. Further, the information stored in the sequential volume storing part 805 is used when the below-mentioned performance tuning is performed. For example, a parity group that is considered to be suitable from the viewpoint of the RAID configuration and a disk stripe size is defined as a sequential volume. And, in the subsystem, the logical device (LDEV) having a higher sequential access ratio is moved to the parity group in question. And, data of an LDEV having a higher random access ratio is not moved to or is excluded from the parity group defined as a sequential volume.

The below-mentioned performance tuning is performed by the configuration change planning processing unit 218 when it is required from the viewpoint of performance.

For example, with respect to the parity group having the parity group number "0000" stored in the first line of the figure, it is seen from the RAID level storing part 803 and the detailed configuration storing part 804 that its RAID configuration is RAID5 and 3D1P (i.e., a configuration in which four disks constitute the RAID configuration (RAID5), and three disks store data and the remaining one disk stores parity data).

The attribute information 806 stores attribute information indicating whether it is a volume that receives only read processing and rejects write/update processing.

[Logical Storage Unit Operating Information Processing Unit 206 and Logical Storage Unit Operating Information 224]

With respect to I/O processing to the logical storage units 8 in the storage subsystem 20, the logical storage unit operating information processing unit 206 acquires operating information related to input and output, and holds the acquired information as the logical storage unit operating information 224 in the shared memory 107 or the local memory 101.

Taking a certain time (for example, a second, a minute, or ten minutes) as a unit, and for each of the LDEV constituting the logical storage units 8 or for each of the logical storage units 8, the logical storage unit operating information processing unit 206 counts the time required for the total I/O processing to the mentioned logical storage unit of the storage subsystem 20 per unit of time, to calculate an average I/O processing time per unit of time and to acquire at any time the maximum I/O processing time within one unit of time. Further, the logical storage unit operating information processing unit 206 calculates the total numbers of I/Os to the logical storage unit in question in one unit of time, an average I/O counts per unit of time, the maximum I/O counts in one unit of time, an average data transfer amount per unit of time, the maximum data transfer amount per unit of time, and the like.

Further, for each of the LDEVs constituting the logical storage units 8 or for each of the logical storage units 8, the logical storage unit operating information processing unit 206 calculates a cache hit rate per unit of time, based on the value of the cache amount counter, which is counted by the cache hit/miss judgment processing unit. Further, the logical storage unit operating information processing unit 206 monitors a read access time, a write access time, a sequential access time, the total occupied time and the like, to calculate a sequential ratio, a read-write ratio, an average disk occupancy rate, the maximum disk occupancy rate, and the like.

In the present embodiment, the above-mentioned acquired information and calculated information are held as the logical storage unit operating information 224 in the shared memory 107 or the local memory 101.

FIGS. 7 and 8 show examples of the logical storage unit operating information 224a and 224b respectively for each LU number and each LDEV number, measured, acquired and calculated with respect to the logical storage units 8 by the logical storage unit operating information processing unit 206.

FIG. 7 is a diagram for explaining an example of data stored in the logical storage unit operating information 224a which stores the operating information of an LU given with a path definition associated with the port 104a. The column 901 of the logical storage unit operating information 224a records acquisition times at intervals of a sampling time. The column 902 records the logical storage unit numbers of the logical storage units 8 under the port 104a at each sampling time; the column 904 an average I/O counts per second (IOPS) of the logical storage unit concerned at the time concerned; the column 905 the maximum I/O counts per second (IOPS) in the time concerned; the column 906 an average data transfer amount per second (MBPS) of the logical storage unit concerned in the time concerned; the column 907 the maximum data transfer amount per second (MBPS) in the time concerned; the column 908 an average IO processing time (μs) per second of the logical storage unit concerned in the time concerned; the column 909 the maximum IO processing time (μs) per second in the time concerned; the column 910 the cache hit rate; the column 911 sequential ratio; and the column 912 the read-write ratio.

FIG. 8 is a diagram for explaining an example of data stored in the logical storage unit operating information 224b which stores the operating information of an LDEV. As shown in the figure, the logical storage unit operating information 224b includes sequential read 1004, sequential write (data) 1005, sequential write (parity) 1006, random read 1007, random write 1008, random write (data) 1009, the total occupied time 1010, a read-write ratio 1011, and a sequential ratio 1012.

Here, each of the sequential read 1004, the sequential write (data) 1005, the sequential write (parity) 1006, the random read 1007, the random write (data) 1009 and the total occupied time 1010 stores a time occupied by disk access for the processing concerned, at each predetermined time for each LDEV. Further, the read-write ratio 1011 stores a ratio of a read access time to a write access time at each predetermined time for each LDEV. The sequential ratio 1012 stores a ratio of a sequential access time to the total occupied time at each predetermined time for each LDEV.

[Physical Storage Unit Operating Information Processing Unit 207 and Physical Storage Unit Operating Information 225]

The physical storage unit operating information processing unit 207 acquires operating information (physical operating information due to I/O processing to the physical storage units 110, and holds the acquired information as the physical storage unit operating information 225.

Taking a certain time as a unit, and for each physical storage unit 110, the physical storage unit operation information processing unit 207 acquires information such as an average I/O processing time, the maximum I/O processing time, an average I/O counts, the maximum I/O counts, an average data transfer amount, the maximum data transfer amount, a cache hit rate, a sequential ratio, a read-write ratio, an average disk occupancy rate, the maximum disk occupancy rate, and the like. The physical storage unit operation information processing unit 207 holds the acquired information as the physical storage unit operating information 225 in the shared memory 107 or the local memory 101. Thus, the physical storage unit operating information 225 stores results of measurement of times required for I/O processing of the host computer 1 to a storage unit.

FIG. 9 shows an example of the physical storage unit operating information 225.

As shown in the figure, the physical storage unit operating information 225 includes sequential read 1304, sequential write (data) 1305, sequential write (parity) 1306, random read 1307, random write (data) 1308, random write (parity) 1309, the total occupied time 1310, a read-write ratio 1311, and a sequential ratio 1312.

Here, each of the sequential read 1304, the sequential write (data) 1305, the sequential write (parity) 1306, the random read 1307, the random write (data) 1308, the random write (parity) 1309 and the total occupied time 1310 stores a time occupied by disk access for the processing concerned at a predetermined time for each parity group. The read-write ratio 1311 stores a ratio of a read access time to a write access time at each predetermined time for each parity group. And, the sequential ratio 1312 stores a ratio of a sequential access time to the total occupied time at each predetermined time for each parity group.

Either the logical storage unit operating information processing unit 206 and the logical storage unit operating information 224 or the physical storage unit operating information processing unit 207 and the physical storage unit operating information 225 can generate the other information based on the data stored in the logical-physical correspondence information 203. Thus, it is sufficient to hold either of them.

[External Storage Area Operating Information Acquisition Processing Unit 208 and External Storage Operating Information]

The external storage area operating information acquisition processing unit 208 acquires operating information of the external storage, and holds the acquired information as the external storage operating information 209 in the shared memory 107 or the local memory 101.

The external storage area operating information acquisition processing unit 208 measures and acquires, as operating information, response to and throughput of I/O processing requests from the storage subsystem 20 to the logical storage units 8 provided by the external storage subsystem 21, and holds the acquired information as the external storage operating information 209.

FIG. 10 is a diagram for explaining the external storage operating information 209.

As shown in the figure, the external storage operating information 209 includes a time 1801, an initiator port number 1901, a general purpose storage subsystem WWN 1902, a general purpose storage LUN 1903, IOPS 1904, MBPS 1905, a response 1906 and a link status 1907.

[Cache Hit/Miss Judgment Processing Unit 210 and Cache Amount Counter 211]

The cache hit/miss judgment processing unit 210 is invoked by the command processing unit 202 and judges whether data at the object address of a command processed by the command processing unit 202 exists on the disk cache 108. FIG. 11 is a diagram for explaining the cache amount counter 211.

When data at the object address of a command to process exists on the disk cache 108, then, the cache hit/miss judgment processing unit 210 notifies the command processing unit 202 of the existence of the data on the disk cache 108 and the address of the area where the data exists. At that time, hit information counters (not shown) of predetermined area information on the disk cache 108 and of the cache amount counter 211 of the logical storage unit 8 concerned are incremented by one.

In addition to the above-mentioned hit information, the cache amount counter 211 holds a data amount (hereinafter, referred to as a dirty amount) in a dirty state where data exists on the disk cache 108 but has not been written into the physical storage units 110 and a data amount (hereinafter, referred to as a clean amount) in a clean state where data exists both on the disk cache 108 and on the physical storage units 110 for each logical storage unit 8, and a dirty amount, a clean amount and a free amount (i.e., a space capacity) of the whole cache, and the total amount of cache.

[Cache Amount Management Unit 212]

The cache amount management unit 212 manages the amount of data stored in the disk cache 108.

The cache amount management unit 212 controls an interval of activating the command processing unit 202 according to the clean amount or dirty amount of the cache. In detail, the cache amount management unit 212 always refers to the counters indicating the dirty amount and the clean amount of the whole cache, in the cache amount counter 211, to control the activation interval as follows. Namely, when the sum of the dirty amount and the clean amount becomes more than or equal to a certain ratio, then, the activation interval of the command processing unit 202 is made longer than an ordinary interval, and when the sum becomes less than a certain ratio, the activation interval is returned to the ordinary activation interval.

When write processing from the host computers 1 is performed frequently, data in the dirty state is accumulated on the disk cache 108. For example, when the main power goes off and the subsystem is powered by built-in batteries, then, it is necessary to write data in the dirty state on the disk cache 108 onto a predetermined physical storage unit. In that case, when the dirty amount is larger, writing of the data takes much time, and it is more possible that the data is lost without being reflected onto the physical storage units.

In the case of employing the RAID configuration, an area which generates parities should be kept on the cache, and it is necessary to suppress the amount of write data sent from the host computers 1 to be less than or equal to a certain amount in the whole cache capacity.

Considering these conditions, the cache amount management unit 212 monitors the cache amount and controls operation of the system such that the cache amount is always less than or equal to a certain amount.

[Port Control Unit 213, Port Setting Information 228 and Port Operating Information 229]

The port control unit 213 manages a data flow rate at each port 104a or 104b of the storage subsystem 20.

The port control unit 213 measures a data transfer amount and the numbers of I/Os each time when an I/O processing request is received at an I/O port 104a or 104b for each WWN of the host computers 1, to store the measure values as the port operating information 229 into the shared memory 107 or the local memory 101.

FIG. 12 is a diagram for explaining an example of the port operating information 229. As shown in the figure, the port operating information 229 includes a time 1201, a port number 1202, an average IOPS 1204 which holds an average response time, the maximum IOPS 1205 which holds the maximum response time, an average MBPS 1206 which holds an average throughput time, the maximum MBPS 1207 which holds the maximum throughput time, an average I/O processing time 1208 which holds an average I/O processing time, the maximum I/O processing time 1209 which holds the maximum I/O processing time, a sequential ratio 1210, and a read-write ratio 1211.

Further, the port control unit 213 uses the information held as the port operating information 229 to perform I/O processing control at the ports.

Upper limit setting information of the number of I/Os (IOPS), the data transfer amount (MBPS) and the like for each WWN of the host computers 1 is inputted in advance from the storage subsystem administrator through the subsystem management apparatus 5, sent to the storage subsystem 20 through the network 7, and stored as the port setting information 228 into the memory 107 or the local memory 101.

The port setting information 228 stores the upper limits the lower limits and the target values, based on the worst values, average values, the best values and the like of the operating information related to I/O processing with the host computers 1, for each port 104a or 104b. As the operating information, may be mentioned, for example, throughput (the number of I/Os per unit of time (IOPS) and data transfer amount per unit of time (MBPS)) and response (an I/O processing response time).

To set these values through the subsystem management apparatus 5, test I/Os are sent from the storage subsystem 20 to the external storage subsystems 21, and response times to those I/Os and the like are taken into consideration. In the case of the external storage subsystem 21 that has performed I/O processing with the host computers 1, information obtained at the times of the I/O processing is used.

FIG. 13 is a diagram showing an example of the port setting information 228.

As shown in the figure, the port setting information 228 includes a port number 1400, a status 1401, a connected WWN 1402, the maximum IOPS 1403, the maximum MBPS 1404, the minimum IOPS 1405, the minimum MBPS 1406, a target IOPS 1407, a target MBPS 1408, a band 1409, and a protocol 1410.

[Processor Operating Information Acquisition Processing Unit 214 and Processor Operating Information 226]

The processor operating information acquisition processing unit 214 measures amounts of time the control processors perform various processing and records the measured values as the processor operating information 226.

Figures 14, 15:
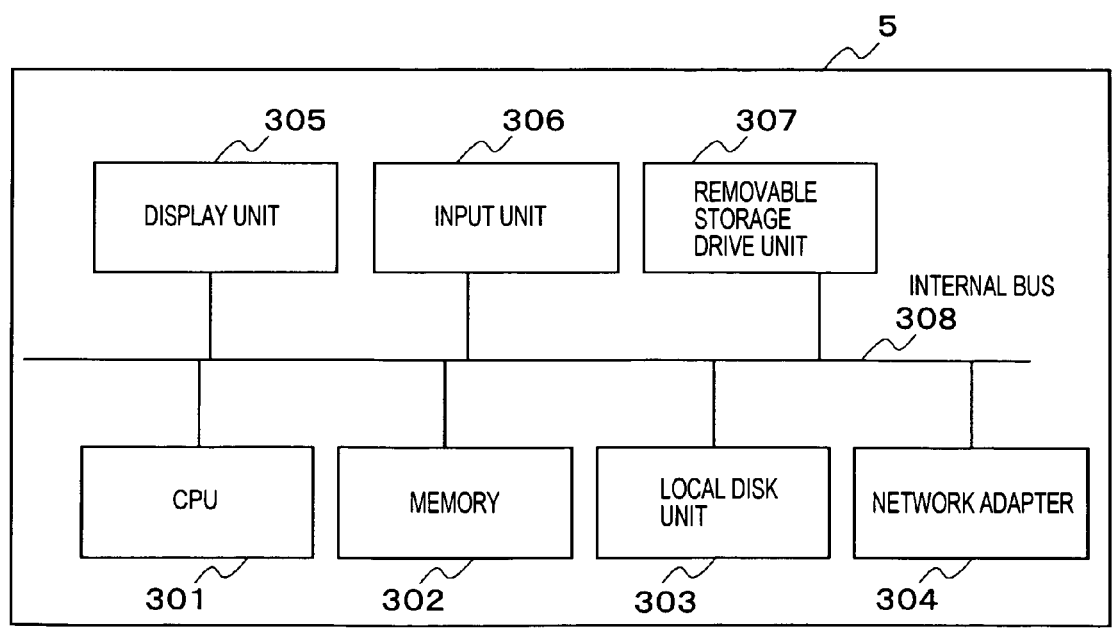
FIG. 14 is a diagram showing an example of processor operating information of the first embodiment.
FIG. 15 is a diagram showing an example of a hardware configuration of a subsystem management apparatus of the first embodiment.

FIG. 14 shows an example of the processor operating information 226. As shown in the figure, the processor operating information 226 includes a processor number 1451, a status 1452 and an operating ratio 1453. Here, the status 1452 stores information indicating whether the processor in question is a target processor for processing I/O from a host computer or an initiator processor which controls I/O processing with the external storage subsystem 21. The status of each processor is determined in advance, for example, by the administrator.

[Physical Storage Unit I/O Processing Unit 215]

The physical storage unit I/O processing unit 215 writes data from a physical storage unit 110 to the disk cache 108, or from the disk cache 108 to a physical storage unit 110, according to an I/O processing request of the host computer 1.

When there occurs a write processing request from the host computer 1, the command processing unit 202 analyzes the destination of the processing request. As a request, when the destination of the processing request is a physical storage unit 110 in the storage subsystem 20, then, the command processing unit 202 performs write processing toward the disk cache 108, and thereafter, the physical storage unit I/O processing unit 215 writes the dirty data into the physical storage unit 110 concerned according to an instruction from the command processing unit 202. Hereinafter, processing that the physical storage unit I/O processing unit 215 writes data from the disk cache 108 to a physical storage unit 110 is referred to as write-after processing.

Further, when the host computer 1 issues a read processing request, and the data source of the request does not exist on the disk cache 108 but a physical storage unit 110 in the storage subsystem 20, then, the physical storage unit I/O processing unit 215 reads from a certain address of the physical storage unit 110 in question according to an instruction of the command processing unit 202.

[External Storage I/O Processing Unit 216]

The external storage I/O processing unit 216 writes data from a physical storage unit 124 of the external storage subsystem to the disk cache 108, or from the disk cache 108 to the physical storage unit 124, according to an I/O processing request issued by the host computer 1.

When, as a result of analysis by the command processing unit 202, the destination of a write processing request is the physical storage unit 124 in the external storage subsystem 21, then, the external storage I/O processing unit 216 writes the dirty data from the disk cache 108 to the physical storage unit 124 in question at the time of write-after, according to an instruction of the command processing unit 202.

When, as a result of analysis by the command processing unit 202, the read source of a read processing request does not exist on the disk cache 108 but is the physical storage unit 124 in the external storage subsystem 21, then, the external storage I/O processing unit 216 reads from a certain address of the physical storage unit 124 in question, according to an instruction of the command processing unit 202.

[Configuration Change Planning Processing Unit 218 and Configuration Change Planning Information 227]

The configuration change planning processing unit 218 refers to the physical storage-unit operating information 225, the port operating information 229, the logical storage unit operating information 224, the processor operating information 226, the cache amount counter 211 and the like, to make a configuration change plan according to performance requirements.

The configuration change planning processing unit 218 is activated by the manager 223 at predetermined intervals. When host I/O processing performance of the storage subsystem 20 or the external storage subsystem 21 deteriorates to more than a predetermined extent from the level assumed at the beginning, the configuration change planning processing unit 218 plans data reallocation, increase or decrease of the number of initiator ports 104b, and the like, and holds the plan as the configuration change planning information 227 in the shared memory 107 or the local memory 101. Change of the configuration is required since the host I/O processing performance of the storage subsystem 20 changes with the lapse of time when the system is operated.

The planning information is carried into execution by the below-mentioned configuration change plan execution processing unit 219, or held until an instruction of cancellation is received from, for example, the storage administrator.

The I/O processing performance is judged based on the throughput or the response time, for example.

[Configuration Change Plan Execution Processing Unit 219]

The configuration change plan execution processing unit 219 performs the configuration change according to the configuration change planning information 227, when an instruction to that effect is received from the manager 223. By performing the processing, the storage subsystem 20 and the external storage subsystem 21 is improved in their performance.

[Schedule Information 222]

The schedule information 222 is information indicating a schedule for various processing related to the performance tuning, and is stored in the shared memory 107 or the local memory 101. The schedule information 222 is, for example, timing of making a configuration change plan, timing of executing that plan, and the like.

[Manager 223]

The manager 223 activates the configuration change planning processing unit 218 and the configuration change plan execution processing unit 219, according to the schedule information 222.

[External Storage Unit Attribute Information Acquisition Processing Unit 221 and External Storage Unit Attribute Information 220]

The external storage unit attribute information acquisition processing unit 221 acquires storage unit attribute information of the external storage subsystem 21 from the subsystem management apparatus 5, and stores the acquired information as the external storage unit attribute information 220 into the shared memory 107 or the local memory 101. This processing unit 221 performs the mentioned processing when it is provided with an I/F which acquires the RAID configuration of the external storage subsystem 21 and the type of HDD used in the external storage subsystem 21, from the subsystem management apparatus 5 of the external storage subsystem 21 through the network 7.

[Subsystem Management Apparatus 5]

FIG. 15 shows an example of a hardware configuration of the subsystem management apparatus 5 according to the present embodiment.

As shown in the figure, the subsystem management apparatus 5 comprises a CPU 301, a memory 302 as an electrically nonvolatile storage unit, a local disk unit 303, a network adapter 304, a display unit 305, an input unit 306, and a removable storage drive unit 307, being connected with one another through an internal bus 308.

The CPU 301 executes programs which realize the functions of the subsystem management apparatus 5.

The memory 302 stores the program to be executed by the CPU 301, information used by those programs, and the like.

The network adapter 304 is an interface with the network 7. Through the network 7, the subsystem management apparatus 5 acquires information on the system configurations of the storage subsystems 20 and 21, and sends configuration definitions (for example, a definition of the RAID configuration, definitions of the logical storage units and their path definition processing, a snapshot pair definition, and the like) received from the administrator to the storage subsystems 20 and 21.

The input unit 306 and the display unit 305 are interfaces with the administrator of the storage subsystems 20 and 21. The input unit 306 receives input of an instruction of maintenance/administration or restore processing of the storage subsystem 20 or 21, or input of information (for example, a period and thresholds of resource operating information to be referred to, the time of executing a configuration change plan, and the like) used for planning of a configuration change. The display unit 305 displays required information.

[Host Computer 1]

Figure 16:
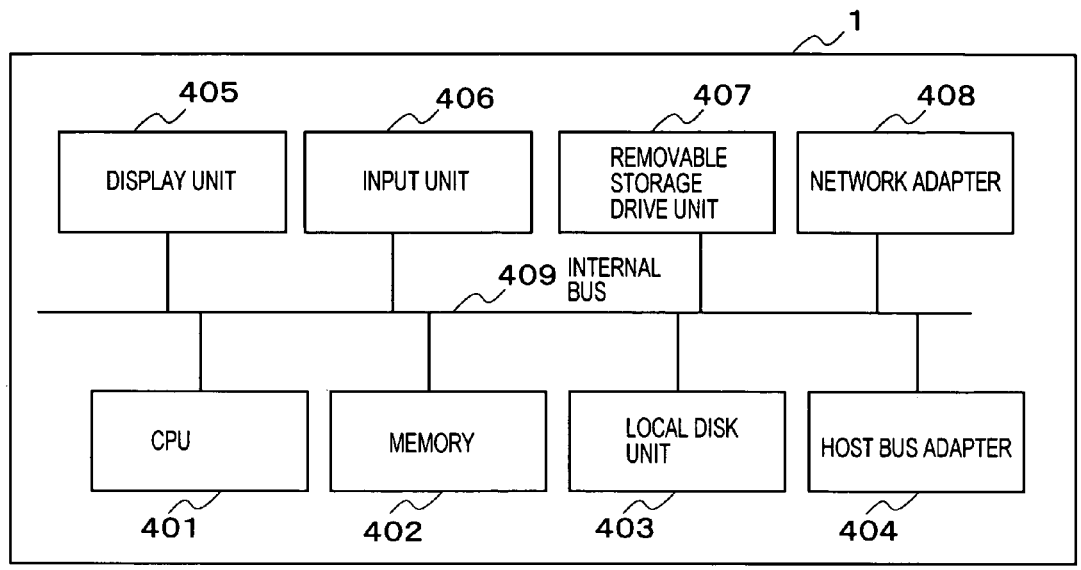
FIG. 16 is a diagram showing an example of a hardware configuration of a host computer of the first embodiment.

FIG. 16 shows an example of a hardware configuration of the host computer 1 according to the present embodiment.

As shown in the figure, the host computer 1 comprises: a CPU 401 which executes given programs; a memory 402 which stores an OS executed by the CPU 401, application programs (hereinafter, referred to as APs), data used by the APs and the like; a local disk unit 403 which stores the OS, the AP and the data used by the APs; a host bus adapter 404 which connects the first I/O network 61 with the host computer 1; a display unit 405, an input unit 406, a network adapter 408 which connects the network 7 with the host computer 1; a removable storage drive unit 407 which controls data read and the like from a portable medium such as a flexible disk; and a local I/O network 409 as an internal bus used which connects between the mentioned components and transfers the OS, the APs, data, control data and the like.

As a portable storage medium, an optical disk or a magneto-optical disk such as CD-ROM, CD-R, CD-RW, DVD or MO, a magnetic disk such as a hard disk or a flexible disk, or the like may be used.

Each processing unit described below reads a program stored on a portable storage medium through the removable storage drive unit 407, or installs a program onto the host computer 1 through an external network or the like.

Further, the host computer 1 may comprises a plurality of CPUs 401, a plurality of local disk units 403, a plurality of memories 402, a plurality of host bus adapters 404 and a plurality of network adapters 408.

[SAN Management Terminal 9]

Figure 17:
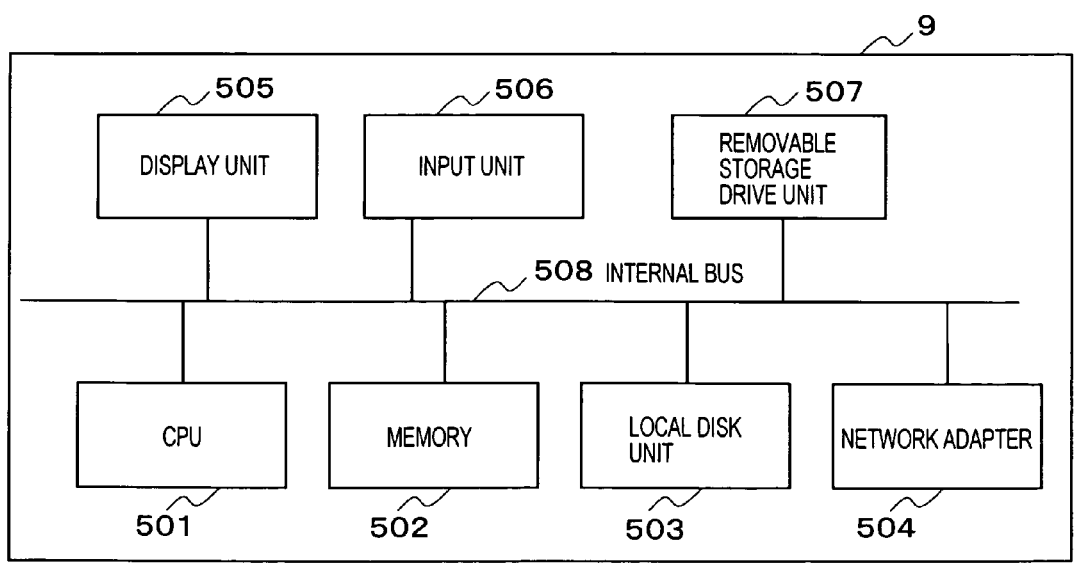
FIG. 17 is a diagram showing an example of a hardware configuration of a SAN management terminal of the first embodiment.

FIG. 17 shows an example of a hardware configuration of the SAN management terminal 9 of the present embodiment.

As shown in the figure, the SAN management terminal 9 comprises: a CPU 501; a memory 502 as an electrically nonvolatile storage unit; a local disk unit 503; a network adapter 504; an input unit 506; a display unit 505; a removable storage drive unit 507; and a transmission line 508 as an internal bus which connects the mentioned components with one another to transmit data, a control instruction, or the like.

The memory 502 stores programs to be executed by the control processor 501, information used by those programs, and the like. The control processor 501 executes those programs on the SAN management terminal 9.

The network adapter 504 is an interface with the network 7.

[I/O processing to External Storage Subsystem 21]

Next, a flow of I/O processing to the external storage subsystem 21 will be described. FIGS. 18A, 18B, 19A and 19B are diagrams for explaining a flow of I/O processing to the external storage subsystem 21.

An I/O processing request from the host computer 1 is received by the storage subsystem 20 and transferred to the external storage subsystem 21. In that case, the disk cache 108 is used even for an I/O processing request to the external storage subsystem 21.

First, referring to FIGS. 18A and 18B, will be described processing in the case where a read request occurs.

When a read processing request is received from the host computer 1, the command processing unit 202 analyzes the received request (Step 1601), and converts the address of the object read data (i.e., a target logical address of the target as an input/output object for the host computer 1) into a corresponding pair of an LDEV number and an LDEV address (Step 1602).

Next, the cache hit/miss judgment processing unit 210 judges whether the data at the above-mentioned LDEV address exists on the disk cache 108 or not (Step 1603).

In the case where it is judged that the data exists on the disk cache 108 (i.e., cache hit), the command processing unit 202 read the data from the disk cache 108, sends the data to the host computer 1, and thereafter sends a completion report to the host computer 1 (Steps 1604 and 1605).

In the case where it is judged in Step 1603 that the data does not exist on the disk cache 108 (i.e., cache miss), the command processing unit 202 accesses the logical-physical correspondence information 203 to judge whether the LDEV address determined in Step 1602 exists in the storage subsystem 20 or the external storage subsystem 21 (Step 1612).

In the case where the LDEV address exists in the storage subsystem 20, the command processing unit 202 sends the data read request together with the I/O processing object address, data length, and the like to the physical storage unit I/O processing unit 215 (Step 1618). And, the physical storage unit I/O processing unit 215 performs the I/O processing (Step 1619).

In the case where it is judged in Step 1612 that the LDEV address exists in the external storage subsystem 21, the command processing unit 202 sends the received I/O processing request to the external storage I/O processing unit 216 (Step 1615).

Receiving the I/O processing request, the external storage I/O processing unit 216 accesses the external storage subsystem 21 according to the address in the I/O processing request, to read the designated data (Step 1616). Then, the external storage I/O processing unit 216 stores the read data to the disk cache 108 (Step 1616), and sends a storing notification to the command processing unit 202 (Step 1617).

Receiving the notification, the command processing unit 202 reads the notified data from the disk cache 108, and sends the data to the host computer 1 (Step 1621). Thereafter, the command processing unit 202 sends a completion report to the host computer 1 (Step 1622).

Figure 19B:
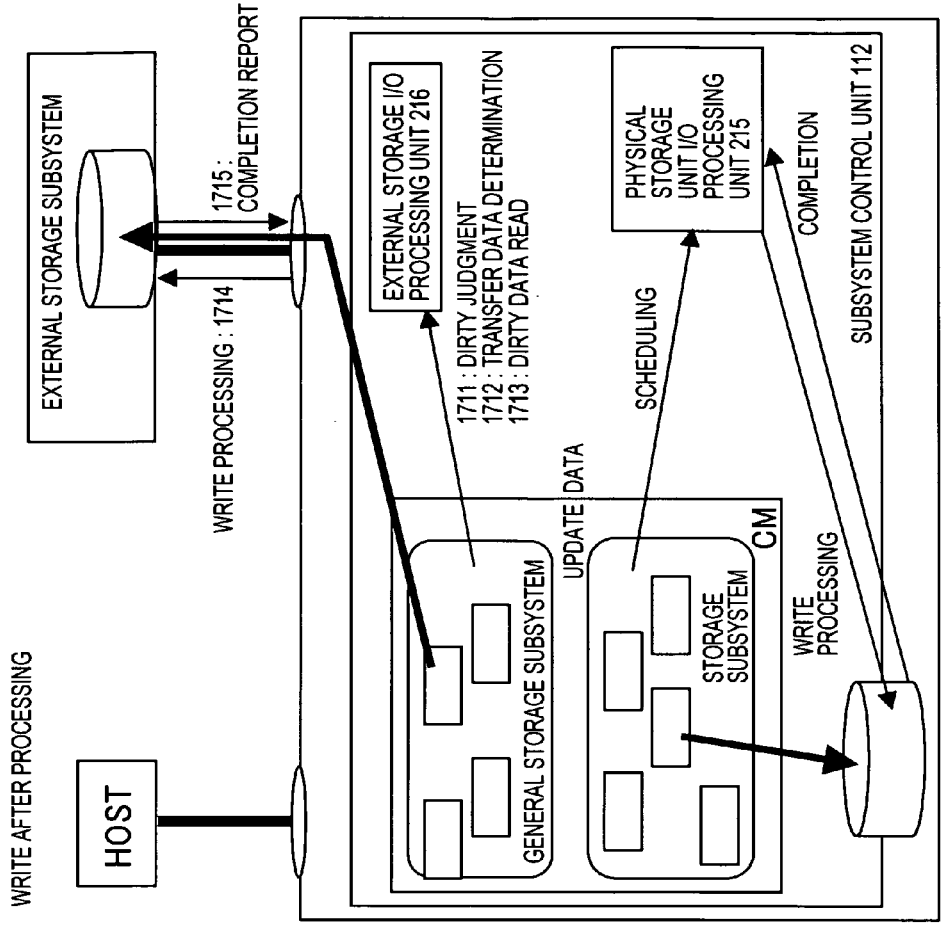
FIG. 19B is a diagram for explaining processing to be performed at the time of occurrence of a write request to the external storage subsystem of the first embodiment.
Figure 19A:
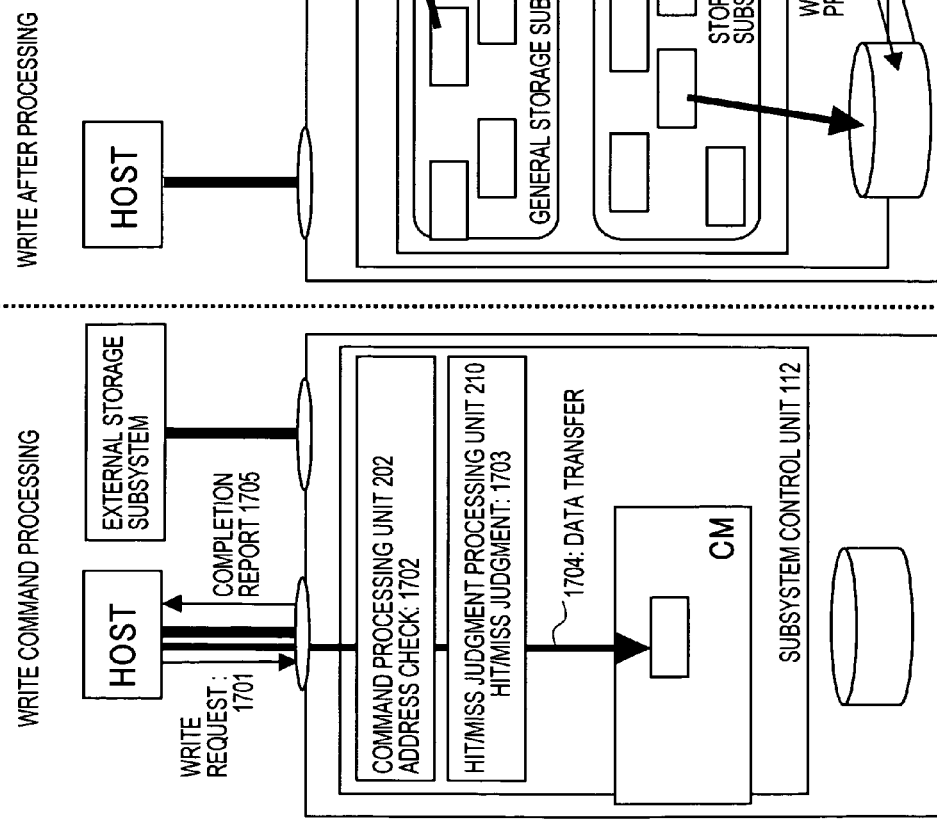
FIG. 19A is a diagram for explaining processing to be performed at the time of occurrence of a write request to the external storage subsystem of the first embodiment.

Next, referring to FIGS. 19A and 19B, will be described processing in the case where a write processing request occurs.

When a write processing request is received from the host computer 1, the command processing unit 202 analyzes the received request similarly to the case of a read processing request (Step 1701), and notifies the host computer 1 that the command processing unit 202 is ready for write processing. Then, the command processing unit 202 converts an address of the write data sent thereafter from the host computer 1 (i.e., a target logical address of the target as an input/output object for the host computer 1) into a corresponding pair-of an LDEV number and an LDEV address (Step 1702).

Then, based on the LDEV address, the cache hit/miss judgment processing unit 210 performs data hit/miss judgment on the disk cache 108 (Step 1703).

In the case of cache hit in Step 1703, the command processing unit 202 overwrites the received write data into the hit area of the disk cache 108. In the case of cache miss, the command processing unit 202 secures a new area in the disk cache 108 and stores the received write data into the secured new area (Step 1704). Then, the command processing unit 202 sends a completion report to the host computer 1 (Step 1705).

When the write data is stored onto the cache, information on the address on the cache, address information of the physical storage unit to which the write data should be stored, and the like are registered as processing request information into a dirty queue.

Next, will be described write-after processing for actually writing the data stored once in the disk cache 108 into the physical storage unit 110 or 124.

The physical storage unit I/O processing unit 215 or the external storage I/O processing unit 216 refers to the above-mentioned dirty queue. In the case where there is a queue to be processed (Step 1711), transfer data (i.e., dirty data) existing on the cache is determined (Step 1712), and the dirty data is read (Step 1713) and written into the physical storage unit 110 or 124 concerned (Step 1714). When a write completion report is received from the physical storage unit 110 or 124 concerned (Step 1715), then, the above-mentioned dirty queue is connected to the clean queue.

[Performance Deterioration]

Before describing the performance tuning processing using the above-described functions and information, will be described performance deterioration requiring performance tuning in the storage subsystems of the present embodiment.

In the case of the storage subsystem 20 directly connected to the host computer 1, performance is deteriorated owing to, for example, access interference.

Namely, the logical storage units 8 that the storage subsystem 20 provides to the host computers 1 are provided in parity groups each including a plurality of physical storage units 110. As a result, it is possible that accesses to different logical storage units 8 seen from the host computer 1 are accesses to physical storage units 110 belonging to the same parity group, causing access interference and delaying the processing.

Further, performance deterioration of the whole system including the external storage subsystems 21 occurs owing to increase of an I/O load or the like.

Now, will be described increase of an I/O load that becomes a cause of deteriorating the performance of the system as a whole in a situation that I/O processing to the external storage subsystem 21 is performed through the storage subsystem 20 as in the case of the present embodiment.

An I/O load to the external storage subsystem 21 is calculated as the product of the number of I/O processing requests to the external storage subsystem 21 and the I/O processing response time. And, as the load becomes larger, the I/O processing response time becomes longer furthermore. Various causes can be considered with respect to such delay of the I/O processing response time that accompanies increase of the load.

For example, a conflict over the port 104b is one of the causes. I/O processing to the external storage subsystem 21 is performed through the storage subsystem 20. Sometimes, even when the storage subsystem 20 has a plurality of such external storage subsystems 21, the storage subsystem 20 uses the port 104b commonly for those external storage subsystems 21 without providing a different initiator port 104b for each external storage subsystem 21. In that case, a conflict of processing over the port 104b on the side of the storage subsystem 20 causes delay in I/O processing, which in turn comes up to the surface as the delay of the I/O processing response time.

Further, a conflict over the control processor 100 can be considered. When the external storage I/O processing unit 216 of the storage subsystem 20 performs processing of an I/O processing request to the external storage subsystem 21, it may occur that the resource of the control processor 100 can not be sufficiently allocated owing to a conflict with I/O processing or the like in the storage subsystem 20. This becomes a cause of time delay in I/O processing responses.

Thus, in the case of a configuration in which external storage subsystems 21 are connected, it is possible that performance deterioration as an apparent phenomenon is caused not only by interference of accesses to physical storage units constituting the same parity group, but also by a conflict over the port 104b or the control processor 100. Accordingly, the performance tuning should take these factors into consideration.

[Flow of Performance Tuning]

Next, a flow of the performance tuning including the external storage subsystems 21 and using the above-described functions will be described in the following. In the present embodiment, first, performance tuning is performed automatically at predetermined time intervals. Namely, it is judged according to the performance schedule information 222 whether a performance improvement function that instructs automatic execution of various processing which makes a configuration change is ON or not. When the performance improvement function is ON, the processing is performed. Here, the processing is performed in the order of configuration change planning, performance tuning of the storage subsystems 20, and performance tuning of the external storage subsystems 21. When the performance tuning of the external storage subsystems 21 is performed, approval of the administrator is obtained through the management terminal.

Figure 20:
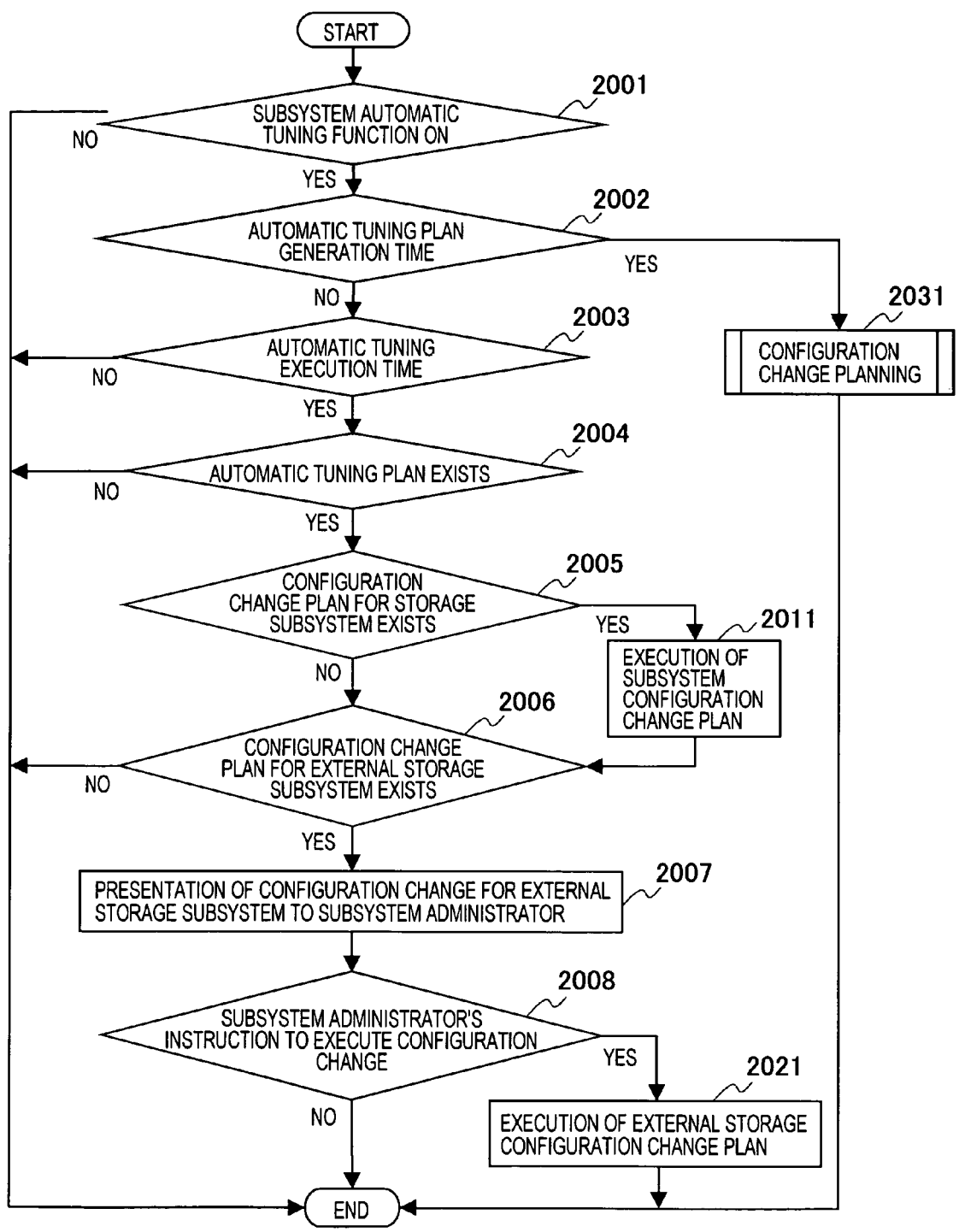
FIG. 20 shows a processing flow at the time of performance tuning of the storage subsystem of the first embodiment.

FIG. 20 shows a processing flow at the time of the performance tuning of the storage subsystem 20.

The manager 223 refers to the schedule information 222 at certain intervals, to judge whether the performance improvement function of the storage subsystem 20 is ON, i.e., in a state which performs the performance tuning (Step 2001). Here, instructions with respect to the time interval and the performance improvement function are inputted by the administrator through the subsystem management apparatus 5.

When the performance improvement function of the storage subsystem 20 is ON, the manager 223 refers to the performance schedule information 222 to judge whether it is a time which updates the configuration change planning information 227 (Step 2002).

When it is a time which updates the configuration change planning information 227, then, the manager 223 makes the configuration change planning processing unit generate the configuration change planning information 227 (Step 2031). A detailed processing flow of Step 2031 will be described later referring to FIG. 21.

When it is judged in Step 2002 that it is not a time which updates the configuration change planning information 227, then, the manager 223 refers to the schedule information 222 to judge whether it is a time which executes a configuration change plan (Step 2003).

When it is judged in Step 2008 that it is not a time which executes a configuration change plan, then, the processing is ended. When it is a time for execution, the manager 223 refers to the configuration change planning information 227, to judge whether a configuration change plan is stored or not (Step 2004).

When it is judged in Step 2004 that a configuration change plan is not stored, then, the processing is ended. When a configuration change plan is stored, the manager 223 refers to the configuration change planning information 227 to judge whether there is a configuration change plan related to the storage subsystem 20 (Step 2005).

When it is judged in Step 2005 that there is stored a change plan related to the storage subsystem 20, then, the manager 223 makes the configuration change plan execution processing unit 219 execute a configuration change according to the change plan (Step 2011), and then, the processing goes to Step 2006.

When it is judged in Step 2005 that there is not a change plan related to the storage subsystem 20, then, the manager 223 judges whether the configuration change planning information 227 stores a plan related to the external storage subsystem 21 (Step 2006).

When it is judge in Step 2006 that a configuration change plan related to the external storage subsystem 21 is not stored, the processing is ended. When a configuration change plan related to the external storage subsystem 21 is stored, then, the manager 223 displays a message on the display unit of the subsystem management apparatus 5 to the effect that there is a configuration change plan related to the external storage subsystem 21, and displays the change plan extracted from the configuration change planning information 227, to present them to the administrator (Step 2007).

When an instruction is received from the subsystem administrator to execute the above-mentioned configuration change plan displayed as recommended, then, the manager 223 makes the configuration change plan execution processing unit 219 execute the configuration change (Step 2021) and the processing is ended. When an instruction is not received, the processing is ended without executing the change plan.

When a user, who is presented with the configuration change plan through the subsystem management apparatus 5, judges the plan to be unnecessary, then, the user can also instruct the subsystem management apparatus 5 to cancel the change plan.

Next, will be described the processing of generating the configuration change planning information 227 in the above Step 2031. In the present embodiment, loads on the parity groups are monitored, and when there is some parity group having a high load, then, a configuration change is planned at need. When the parity group having a high load belongs to a storage subsystem, then, a configuration change is planned employing the technique disclosed in Patent Document 2.

When the parity group having a high load belongs to the external storage subsystem 21, then, as described above, the performance deterioration may be caused not by interference of accesses to physical storage units constituting the same parity group, but by a conflict over the initiator port 104b or the control processor 100. Accordingly, in the present embodiment, first it is judged whether the performance deterioration is caused by a conflict over the initiator port 104b or the control processor 100. When such a conflict is not a cause, then it is judged that the performance deterioration is caused by access interference, and data reallocation is considered. In the present embodiment, as data reallocation, is made a plan which migrates data from the external storage subsystem 21 to the storage subsystem 20. Further, in the present embodiment, measures against a conflict over the initiator port 104b and the control processor 100 are prepared each as one of configuration change plans in Step 2031, to obtain permission of the administrator before execution.

Here, to judge whether the cause of the performance deterioration is other than access interference, various information indicating the conditions of the external storage subsystem 21 is examined. The mentioned various information is information collected in the storage subsystem 20 such as operating information (such as throughput), a storing state of the cache, and load conditions of the initiator port and the processor.

Figure 21:
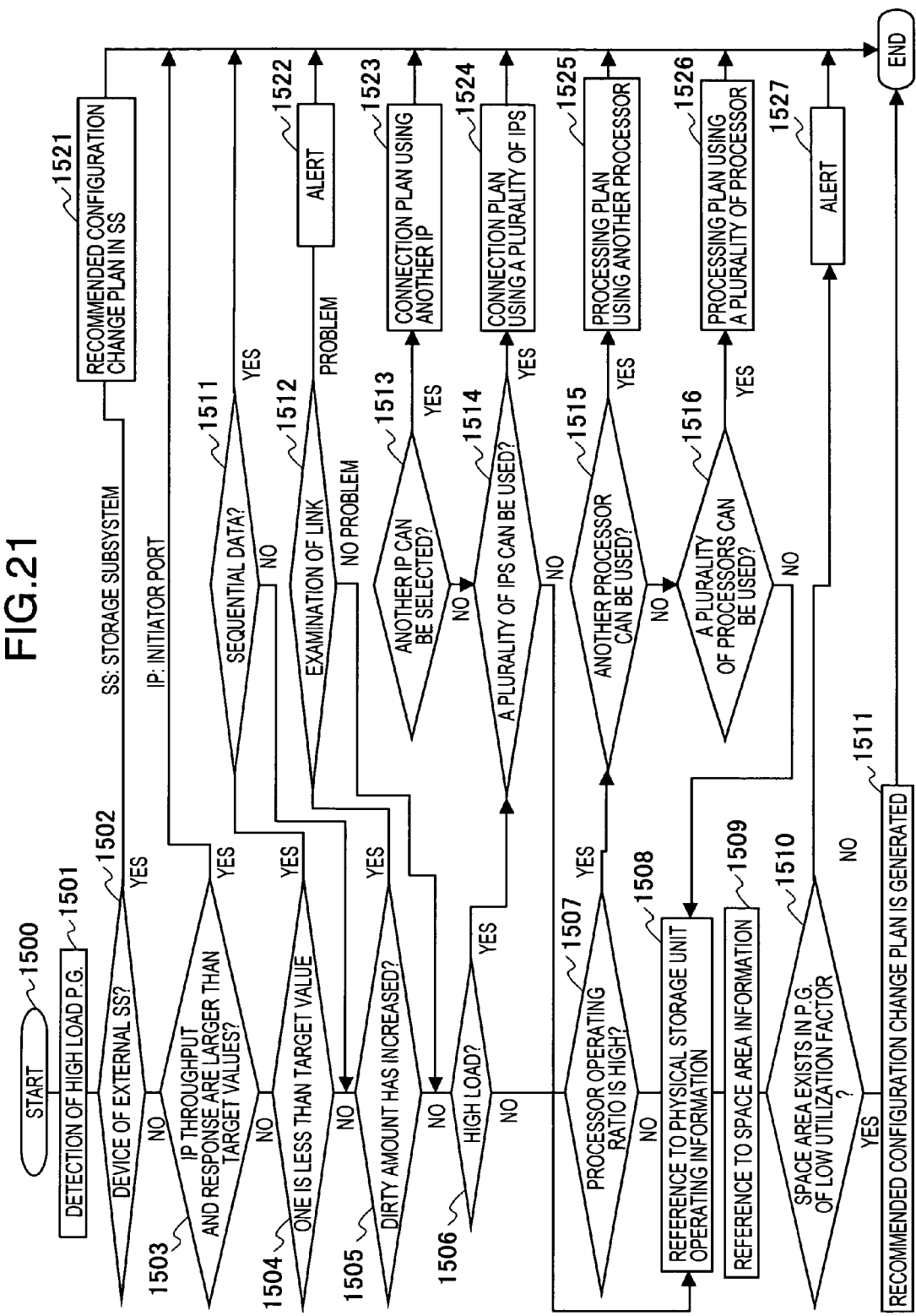
FIG. 21 shows a processing flow of a configuration change planning unit of the first embodiment.

FIG. 21 shows a processing flow of the configuration change planning processing unit 218 at the time of generating the configuration change planning information 227.

According to the schedule information 222, the configuration change planning processing unit 218 refers to the physical storage unit operating information 225 to extract a high load parity group, i.e., a parity group of which, for example, the total occupied time 1310 indicating I/O processing performance is larger than a predetermined threshold (Step 1501).

The configuration change planning processing unit 218 judges whether the parity group extracted in Step 1501 belongs to the storage subsystem 20 or the external storage subsystem 21, based on the P.G. number 1302 of the physical storage unit operating information 225 (Step 1502).

When it is judged in Step 1502 that the extracted parity group is a parity group in the storage subsystem 20, then, the configuration change planning processing unit 218 makes a configuration change plan employing, for example, the technique disclosed in Patent Document 2 (Step 1521).

When it is judged in Step 1502 that the extracted parity group is a parity group in the external storage subsystem 21, then, the configuration change planning processing unit 218 examines the response time and throughput of the initiator port 104b that performs I/O processing to the external storage subsystem 21 in question, referring to the port operating information 229 and the port setting information 228 (Step 1503).

Here, to examine the response time, the average IOPS 1204 of the port operating information 229 is compared with the target IOPS 1407 of the port setting information 228. And, to examine the throughput performance, the average MBPS 1206 of the port operating information 229 is compared with the target MBPS 1408 of the port setting information 228.

When the performance indicated by the average MBPS 1206 and the average IOPS 1204 exceeds the performance indicated by the values set as the targets in the port setting information 228, then, the configuration change planning processing unit 218 judges that there is no problem, and the processing is ended.

Here, when only the performance indicated by the value of either the average MBPS 1206 or the average IOPS 1204 is lower than the performance indicated by the value set as the target in the port setting information 228 (Step 1504), then first, the sequential ratio 1312 of the physical storage unit operating information 225 is examined to judge whether data being sent at that time is sequential data or random data. When the value of the sequential ratio 1312 is larger than or equal to a predetermined threshold, i.e., when sequential data is being sent (Step 1511), then, it is judged that there is no problem even with a larger response time or deteriorating throughput performance, and the processing is ended.

On the other hand, when both the response time and the throughput performance given in the physical storage unit operating information 225 are lower than the values given as the target performance in the port setting information 228 (Step 1504), or when either of the response time or the throughput performance is lower than the target value and the sequential ratio 1312 is less than the predetermined threshold (Step 1511), then, it is possible that a bottleneck exists on the side of the storage subsystem 20. Namely, it is possible that there is a problem in physical connection between the storage subsystem 20 and the external storage subsystem 21.

In that case, the configuration change planning processing unit 218 examines whether the dirty amount in the cache has increased with respect to the devices concerned (Step 1505). Here, referring to the cache amount counter 211, a ratio of the dirty amount to the total cache amount is calculated using the clean counter 1804, the dirty counter 1805 and the free counter 1806.

When the ratio of the dirty amount is higher than or equal to a predetermined value, then, logical storage units as causes of such a ratio are extracted. Namely, with respect to each logical storage unit, its dirty counter 1805 stored in the cache amount counter 211 is examined to extract the logical storage unit numbers having large counter values. At that time, a certain number of logical storage units may be extracted counting in descending order of counter value from the largest one. Or, logical storage units whose counter values are larger-than a predetermined threshold may be extracted.

In the case where, among the extracted logical storage units, there exists a logical storage unit of the external storage subsystem 21, then it is possible that data can not be sent since some problem has occurred in physical connection. Thus, the connecting state is examined (Step 1512). When there is a problem in the connecting state, the configuration change planning processing unit 218 displays an alert indicating a message to that effect (Step 1522), and the processing is ended.

When it is judged in Step 1505 that the dirty amount is less than the predetermined ratio, or when the dirty amount has increased owing to a logical storage unit of the storage subsystem 20, or when it is judged in Step 1512 that there is not problem in the connecting state, then, the configuration change planning processing unit 218 examines the state of load on the initiator port 104b (Step 1506).

Here, with respect to the initiator port 104b for the devices judged in Step 1501 to be the high load parity group, the configuration change planning processing unit 218 judges whether processing capability has reached the limit. Namely, the average data transfer amount 1206 and average response time 1204 of the port operating information 229 are compared respectively with the target data transfer amount 1408 and the target response time 1407 of the port setting information 228. When the average data transfer amount 1206 is less than the target data transfer amount 1408, or the average response time 1204 is larger than the target response time 1407, then, it is judged that a high load is applied on the initiator port 104*b*.

When it is judged in Step 1506 that the initiator port 104*b* is under a high load, then, the configuration change planning processing unit 218 judges whether there exists a substitute initiator port 104*b* having a surplus capability (Step 1513). In the present embodiment, the target data transfer amount 1408 of the port setting information 228 is compared with the average data transfer amount 1206 of the port operating information 229, to find an initiator port 104*b* whose average data transfer amount 1206 does not exceed the target data transfer amount 1408 even when the load of the above-mentioned initiator port 104*b* judged to have a high load is added to the average data transfer amount 1206. Such an initiator port 104*b* is extracted, being judged to be a substitute initiator port 104*b*.

Then, a configuration change plan is generated such that, in a new configuration, the substitute initiator port 104*b* is used which performs I/O processing to the external storage subsystem 21. Then, the generated configuration change plan is stored into the configuration change planning information 227 (Step 1523), and the processing is ended.

Further, when it is judged in Step 1513 that there is not a substitute initiator port 104*b*, then, it is judged whether the load of the initiator port 104*b* judged to have a high load can be distributed into a plurality of initiator ports 104*b* (Step 1514).

When it is judged that there exist a plurality of initiator port 104*b* that can share the load, distributing the load among them, then, a configuration change plan is generated such that, in a new configuration, these initiator ports 104*b* are used which performs I/O processing to the external storage subsystem 21. Then, the generated configuration change plan is stored into the configuration change planning information 227 (Step 1524), and the processing is ended.

When it is judged in Step 1514 that there are not a plurality of substitute initiator ports 104*b*, then, the processing goes to Step 1508 to consider data migration from the external storage subsystem 21 to the storage subsystem 20.

When it is judged in Step 1505 that the load of the initiator port 104*b* is below the limit, then, the configuration change planning processing unit 218 refers to the processor operating information 226 to examine the operating conditions of the control processor 100 (Step 1507).

When it is judged in Step 1507 that the processor operating ratio is higher than a predetermined threshold, then, according to procedures similar to the above-described case of the initiator port 104*b*, the configuration change planning processing unit 218 judges whether there exists a substitute control processor 100 among the processors whose status 1452 in the processor operating information 226 is "initiator" (Step 1515), or whether a plurality of control processors 100 can share the processing load (Step 1516).

When there exists a substitute control processor 100, then, the configuration change planning processing unit 218 generates a configuration change plan that uses the substitute control processor 100 which performs I/O processing to the external storage subsystem 21, and stores the generated configuration change plan into the configuration change planning information 227 (Step 1525), and the processing is ended.

Or, when there exist a plurality of control processors 100 among which the load can be distributed, then, the configuration change planning processing unit 218 generates a configuration change plan that uses those plurality of control processors 100 which performs I/O processing to the external storage subsystem 21, and stores the generated configuration change plan into the configuration change planning information 227 (Step 1526), and the processing is ended.

When it is judged in Step 1516 that there exists no substitute control processor 100, then the processing goes to Step 1508 to consider data migration from the external storage subsystem 21 to the storage subsystem 20.

Further, when it is judged in Step 1507 that the operating ratio of the processor 100 does not exceeds the predetermined threshold, then, the processing goes to Step 1508 also.

In Step 1508, the configuration change planning processing unit 218 examines the possibility of data migration from the external storage subsystem 21 to the storage subsystem 20.

To judge whether the storage subsystem 20 has a sufficient space capacity which realizes migration of data from the external storage subsystem 21, the configuration change planning processing unit 218 refers to the physical storage unit operating information 225 and space capacity management information (not shown) (Step 1509). Here, the space capacity management information is a database which manages a capacity and a utilization factor of each parity group.

When, in Step 1509, it is judged based on the physical storage unit operating information 225 and the space capacity management information that the storage subsystem 20 includes a parity group having a space capacity sufficient for migrating a capacity of the parity group (of the external storage subsystem 21) judged in Step 1501 to have a high load (Step 1510), then, the configuration change planning processing unit 218 generates a configuration change plan that migrates the parity group (of the external storage subsystem 21) judged in Step 1501 to have a high load to the parity group (of the storage subsystem 20) judges in Step 1510 to have sufficient space capacity, and registers the generated configuration change plan into the configuration change planning information 227 (Step 1511), and the processing is ended.

When it is judged in Step 1510 that there is no substitute parity group, then alert information is presented to a user to the effect that there is a problem in I/O processing to the external storage subsystem 21, by notifying the subsystem management apparatus 5 of the alert information (Step 1527), and the processing is ended.

According to the above-described processing, a configuration change plan is made and stored into the configuration change planning information 227.

Data migration from the external storage subsystem 21 to the storage subsystem 20 is effective in performance improvement particularly when data in a logical storage unit 8 of the external storage subsystem 21 is to be copied to the storage subsystem 20 that is located in a remote place for disaster recovery, and when it is desired to use a function that exists in the storage subsystem 20 but not in the storage subsystem 21, and when a band of the I/O network from the storage subsystem 20 to the external storage subsystem 21 is narrow and I/O processing to the logical storage units of the external storage subsystem 21 is frequent, for example.

Further improvement of performance can be expected when data is resident in the disk cache 108 of the storage subsystem 20.

The change of the initiator port 104*b* in Step 1523 or 1524 and the change of the control processor 100 in Step 1525 or 1526 may not be proposed as a configuration change plan, but may be carried out in those Steps at a point of time the substitute initiator port(s) 104*b* and the substitute control processor(s) 100 are determined.

In the present embodiment, the above-described performance tuning premises that the external storage unit attribute information 220 as the attribute information of the external storage subsystem 21 is held in advance.

There are cases where the performance of the physical storage units 124 of the external storage subsystem 21 can not be evaluated similarly to the physical storage units 110 in the storage subsystem 20. For example, as I/O processing performed from the storage subsystem 20 through the second I/O network 62 is not limited to I/O processing to the logical storage units 8 of the external storage subsystem 21 itself, but includes I/O processing to logical storage units 8 of another external storage subsystem. I/O performance with respect to I/Os to the logical storage units 8 of the external storage subsystem 21 in question is affected by a load on the network owing to interference between the above-mentioned processing and loads on switches. However, it is impossible to know how large these loads are. Further, sometimes, also the external storage subsystem 21 includes a disk cache 108. From the storage subsystem 20, it is impossible to know whether cache hit occurs within the external storage subsystem 21.

Thus, in the case where there exist indefinite factors and performance of disks can not be evaluated, it is favorable that a configuration change for improvement of performance involves judgment by a storage administrator of the storage subsystem 20 having a function of connecting with the external storage subsystem 21.

[Method of Device Migration Transparent to Host Computer 1]

Next, referring to figures, will be described a method of device migration that is transparent to a host.

Figure 22A:
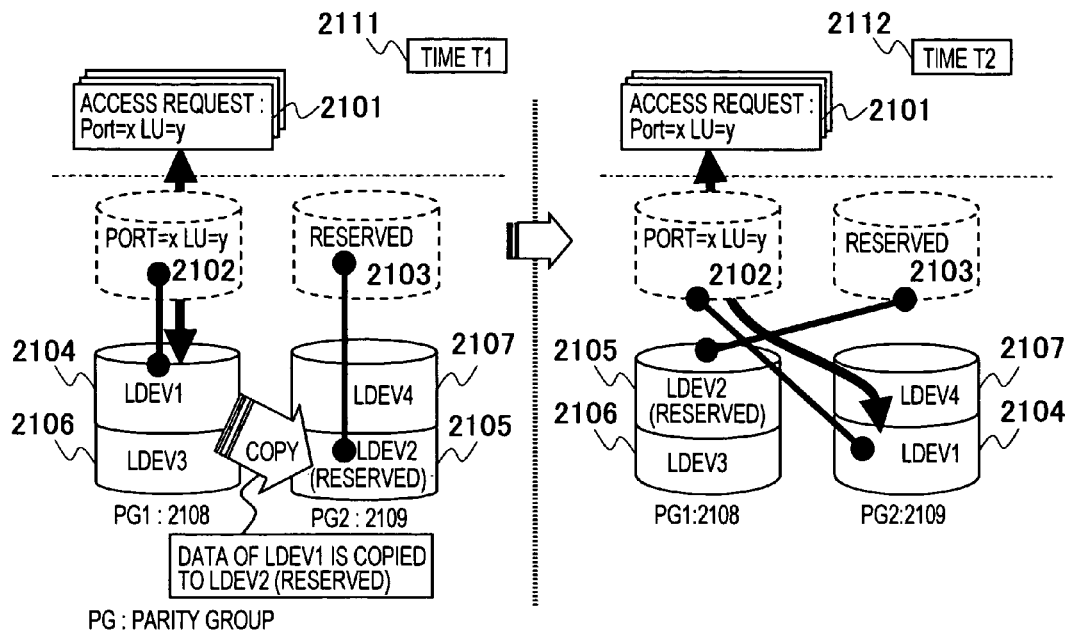
FIG. 22A is a diagram for explaining processing to be performed at the time of copying data from a first logical storage unit to a second logical storage unit of the first embodiment.
Figure 22B:
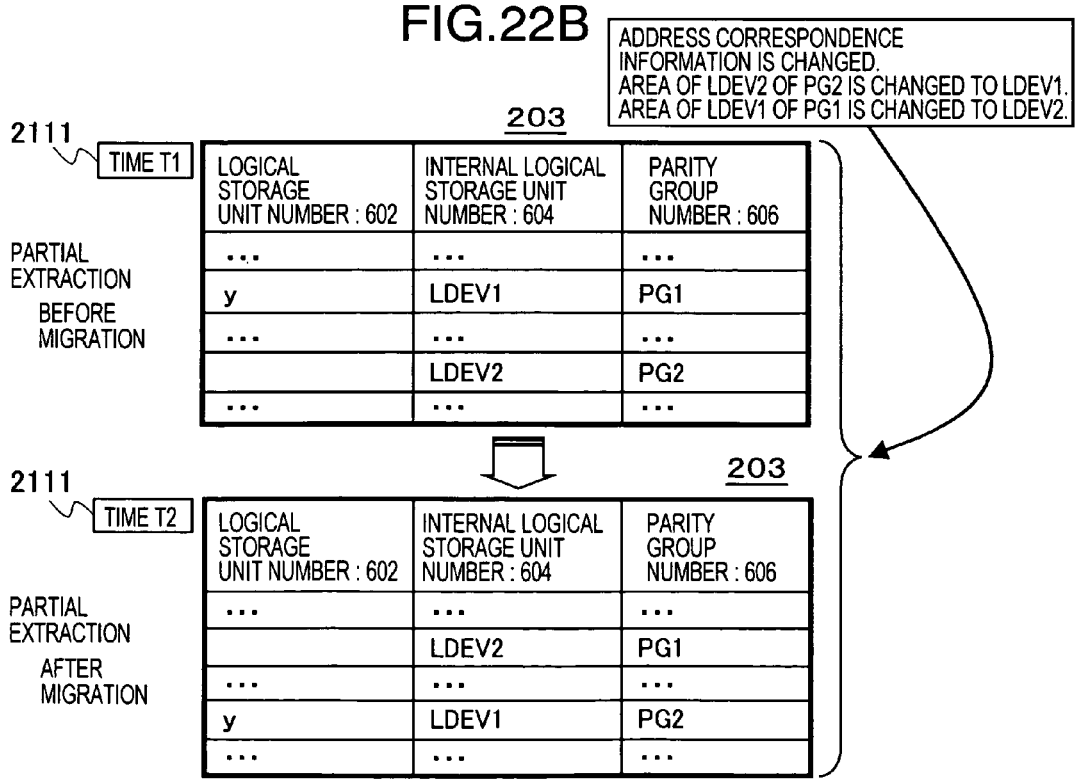
FIG. 22B is a diagram for explaining processing to be performed at the time of copying data from the first logical storage unit to the second logical storage unit of the first embodiment.

FIGS. 22A and 22B are diagrams for explaining processing in the case where data is copied from a first logical storage unit to a second logical storage unit.

Here, description will be given taking an example where a plan made by the configuration change planning processing unit 218 involves copying data in a first internal logical storage unit (LDEV1) 2104 to a second internal logical storage unit (LDEV2) 2105.

The command processing unit 202 refers to the logical-physical correspondence information 203 to make the cache hit/miss judgment processing unit 210 allocate a memory area of the disk cache 108 to a physical address corresponding to a logical address as an I/O processing object for the host computer 1.

In the case of a write processing request, the physical storage unit I/O processing unit 215 writes data in the allocated memory area into a physical storage unit 110. In the case of a read processing request, the physical storage unit I/O processing unit 215 reads data, which is to be stored in the allocated memory area, from a physical storage unit 110. As read data, the command processing unit 202 transfers the data stored in the allocated memory area to the host computer 1.

Here, it is assumed that the host computer 1 performs I/O processing to a logical storage unit 2101 (of the storage subsystem 20) that is identified by an I/O port address x and a logical storage unit number y.

Further, it is assumed that data of the first internal logical storage unit (LDEV1) 2104 and data of the second internal logical storage unit (LDEV2) 2105 are stored respectively in physical storage units 110 constituting a first parity group (PG1) 2108 and in physical storage units 110 constituting a second parity group (PG2) 2109. And the first parity group 2108 includes a third internal logical storage unit (LDEV3) 2106 in addition to the first internal logical storage unit 2104. Further, the second parity group 2109 includes a fourth internal logical storage unit (LDEV4) 2107 in addition to the second internal logical storage unit 2105.

However, it is assumed that the second internal logical storage unit (LDEV2) 2105 is in a reserved state, and thus guarded not to become an object of data input/output from the host computers 1. Further, the second internal logical storage unit (LDEV2) 2105 has the same emulation type as the first internal logical storage unit (LDEV1) 2104.

The configuration change plan execution processing unit 219 copies data in the first internal logical storage unit (LDEV1) 2104 to the second internal logical storage unit (LDEV2) 2105.

At that time, in the course of the copy processing, read/write processing requests from the host computers 1 to the first internal logical storage unit (LDEV1) 2104 are received. For example, when a write processing request is received, the command processing unit 202 judges whether data (of the first internal logical unit 2104) whose write update is instructed has been already copied to the second internal logical storage unit 2105. In the case where the data has not been copied to the copy destination, write is simply performed on the copy source. On the other hand, in the case where the data has been copied, then, updated data is copied to the copy destination each time.

When all copy processing from the first internal logical storage unit (LDEV1) 2104 as the copy source to the second internal logical storage unit (LDEV2) 2105 as the copy destination is completed at some time T1 (Step 2111), except for data to be written into a write area secured in the cache memory 108 by the command processing unit 202 (i.e., write data in the middle of processing) and data that exists on the disk cache 108 but has not been written to a physical storage unit 110, then, from that moment on, the command processing unit 202 queues command processing and reception of write data directed to the first internal logical storage unit 2104, in a buffer memory on the I/O adapter 102, and copies the write data in the middle of processing and the data on the cache memory 108 to the copy destination. Further, the configuration change plan execution processing unit 219 makes an exchange of corresponding address information of physical storage units in the logical-physical correspondence information 203 between the first internal logical storage unit 2104 as the copy source and the second internal logical storage unit 2105 as the copy destination.

At some time T2 after the time T1 (Step 2112), the command processing unit 202 performs processing of the command and write data in the queue, using the logical-physical correspondence information 203 that has been subjected to the exchange of the correspondence information, and returns a response to the host computer 1.

Thus, the host computer 1 that is to perform I/O processing to the storage subsystem 20 performs the I/O processing toward the logical storage unit 2101 identified always by the I/O port address x and the logical storage unit number y. As a result, even when a physical location of data is changed, the host computer 1 can continue I/O processing without knowing the change.

In the present embodiment, performance tuning is performed including the connected external storage subsystem 21. Accordingly, when the I/O processing load on the external storage subsystem 21 increases and the required performance can not be obtained, a configuration change plan including data migration from the external storage subsystem 21 to the internal storage subsystem 20 may be made.

In that case also, host transparent migration can be realized when a logical storage unit 8 of the external storage subsystem 21 as the migration source is taken as the first internal logical storage unit of the above description, a logical storage unit 8 of the storage subsystem 20 as the migration destination is taken as the second internal logical storage unit, and copy processing is performed and the logical-physical correspondence information 203 is rewritten similarly to the above description.

Figure 23:
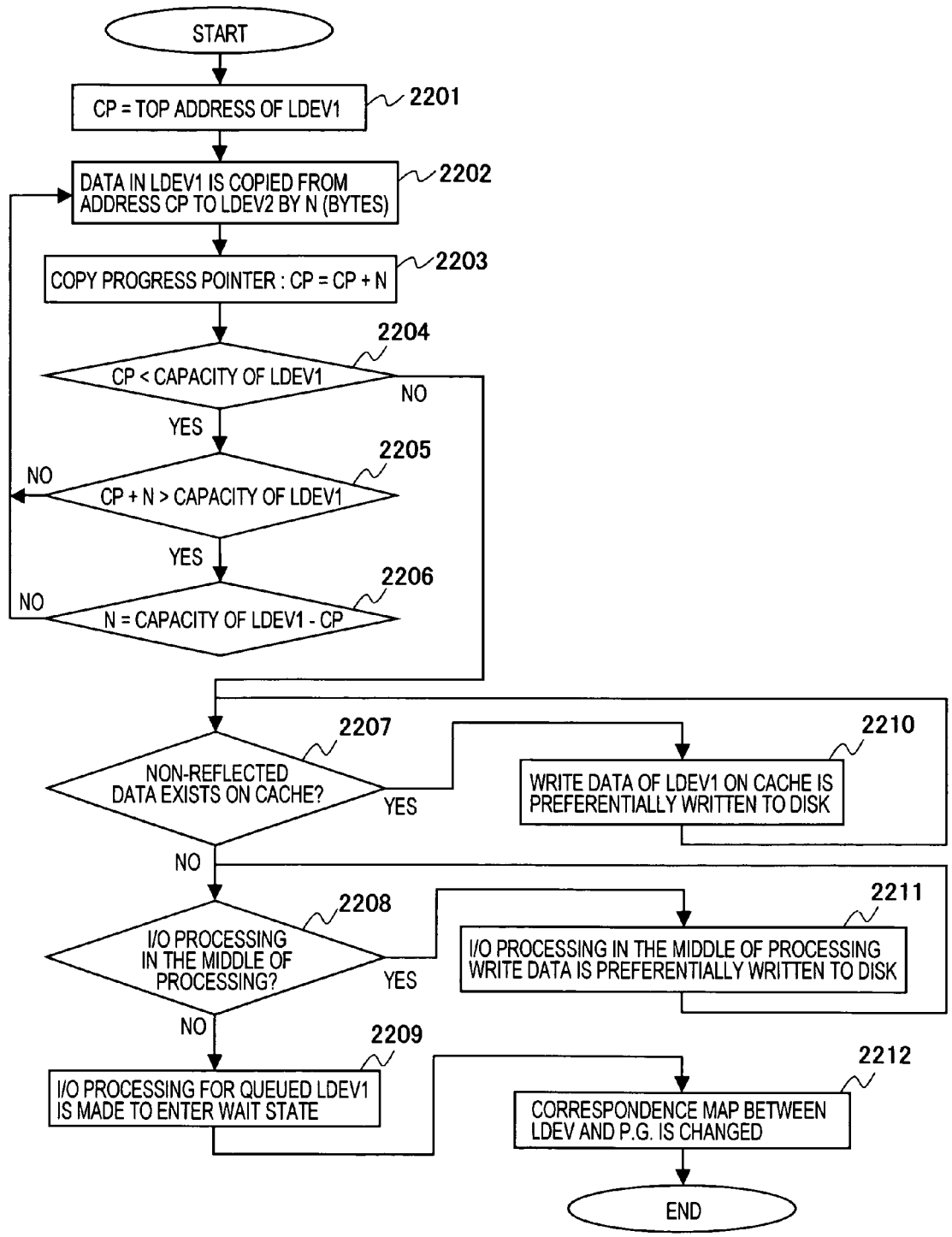
FIG. 23 shows a processing flow of a configuration change execution processing unit of the first embodiment.

FIG. 23 shows a flow of successive processing by the configuration change plan execution processing unit 219 at the time of the above-described host transparent migration.

When data is to be migrated from LDEV1 to LDEV2, a copy pointer (CP) is set to the top address of LDEV1 (Step 2201).

Next, data in LDEV1 is copied by N (bytes) from the address pointed by the CP (Step 2202). Then, the copy pointer CP is advanced by the amount of the copied data (i.e., N (bytes)) (Step 2203).

Then, the value of CP is compared with the capacity of LDEV1 (Step 2204). When the value of CP is less than the capacity of LDEV1, then, CP+N (i.e., the sum of CP and the data amount N (bytes) to be copied next from LDEV1 to LDEV2) is compared with the capacity of LDEV1 (Step 2205). When CP+N is less than the capacity of LDEV1, then, the value of the data amount N (Byte) to be copied next is set to ((the capacity of LDEV1)−CP) (Step 2206).

The flow from Step 2202 to Step 2206 is performed until the evaluation at Step 2204 becomes NO indicating that the amount of the copy carried out from LDEV1 to LDEV2 becomes the capacity of LDEV1. Then, it is examined whether there exists write data (to LDEV1) that is on the disk cache 108 but has not been reflected onto the physical storage unit 110 (Step 2207).

When there exists such data, then the data is written preferentially onto a PG1 disk on which LDEV1 exists (Step 2210).

After the write processing of Step 2210 is finished, the evaluation of Step 2207 is carried out again. Thus, the processing of Steps 2207 and 2210 is repeated until there is no write data (to LDEV1) that is on the disk cache 108 and has not been reflected onto the physical storage unit 110.

Next, it is judged whether the command processing unit 202 secures the disk cache 108 for LDEV1 and is in the middle of writing into the disk cache 108 (i.e., whether there is write processing in the middle of processing) (Step 2208). When there exists write processing in the middle of processing, the disk cache 108 is made to perform the write processing and the data is preferentially written onto the PG1 disk on which LDEV1 exists (Step 2211).

After the write processing is finished, the evaluation of Step 2208 is carried out again to judge whether there exists write processing in the middle of processing. When there is not write processing in the middle of processing, then, I/O processing to LDEV1 among the queued I/O processing is made to enter the wait state which waits for processing by the command processing unit 202 (Step 2209).

Thereafter, the address map between LDEV and P.G. is changed (Step 2212). Namely, the correspondence information in the logical-physical correspondence information 203 is exchanged.

Next, referring to the drawing, will be described processing in the case where new write data is processed separately from the copy processing of Steps 2202 through 2206 and in the course of that copy processing or before Step 2209.

Figure 24:
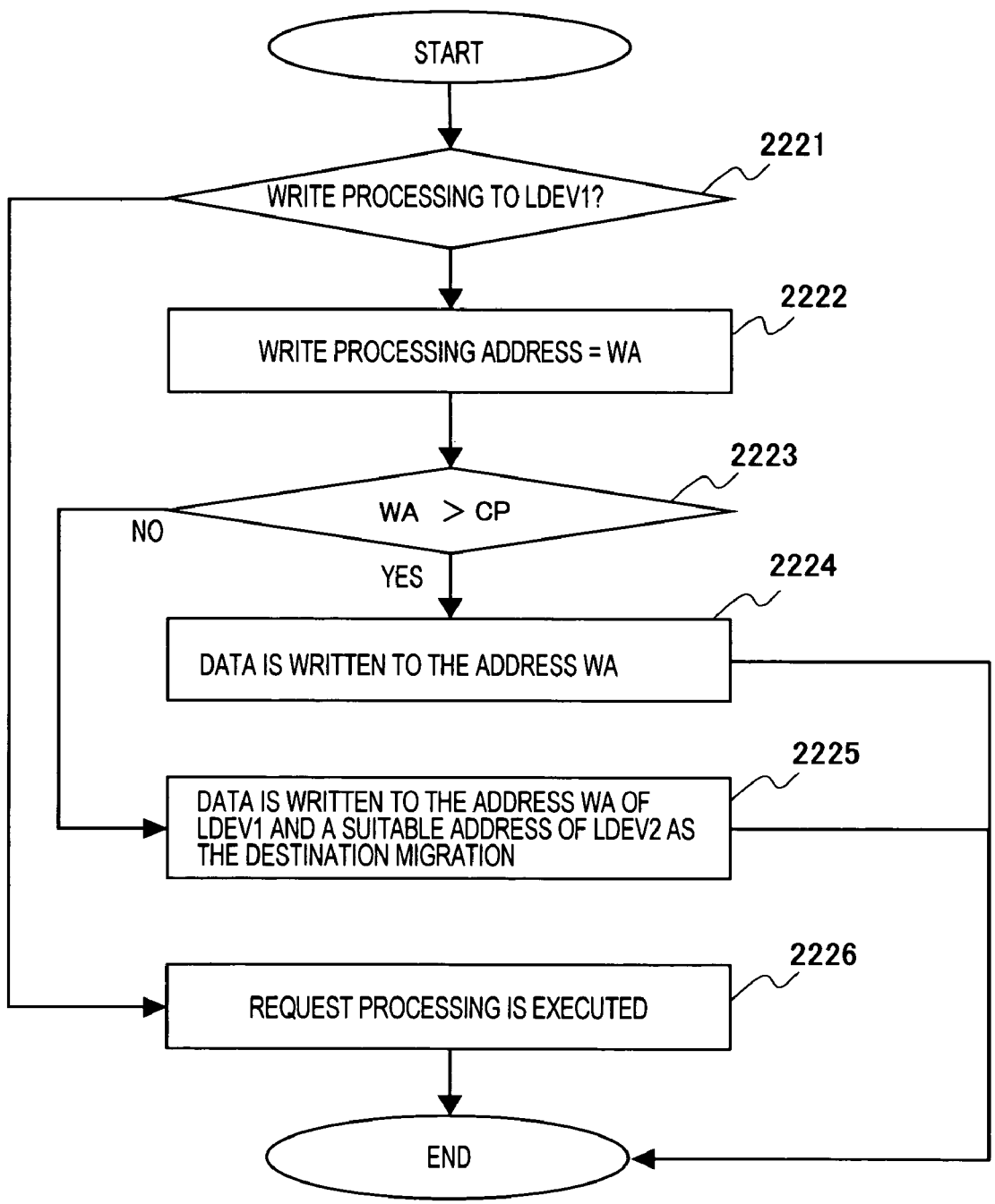
FIG. 24 shows a processing flow of the configuration change execution processing unit of the first embodiment.

FIG. 24 shows a processing flow in the case where new write data is processed.

When new write data is processed at the above-mentioned time, then, it is judged whether the data is write data to LDEV1 (Step 2221).

In the case of write data to LDEV1, then the write processing address is extracted (Step 2222), to evaluate the write address and the copy pointer (Step 2223).

When it is judged in Step 2223 that the write address is an address positioned forward from the copy pointer, the data is written into the address in question (Step 2224), and the processing is ended.

On the other hand, when it is judged in step 2223 that the write data is an address positioned backward from the copy pointer, then, the data is written into the address WA of LDEV1 and also into the corresponding address of LDEV2 as the migration destination (Step 2225), and the processing is ended.

Further, when it is judged in Step 2221 that the write data is not write data to LDEV1, the request in question is processed and the processing is ended.

As described above, according to the present embodiment, even with respect to a system connected with the external storage subsystem 21 that can not be accessed directly from the host computer 1, performance tuning including the external storage subsystem 21 can be performed.

[Data Migration between External Storage Subsystem 21 and a Second External Storage Subsystem 22]

Next, will be described data migration between the external storage subsystem 21 and a second external storage subsystem 22 each connected to the storage subsystem 20 through the second I/O network 9.

Here, the external storage subsystem 22 is connected to the storage subsystem 20 through the second I/O network 62. Further, similarly to other external storage subsystem 21, the external storage subsystem 22 is connected with a subsystem management apparatus 5 and with the network 7 through that subsystem management apparatus 5.

Figure 25:
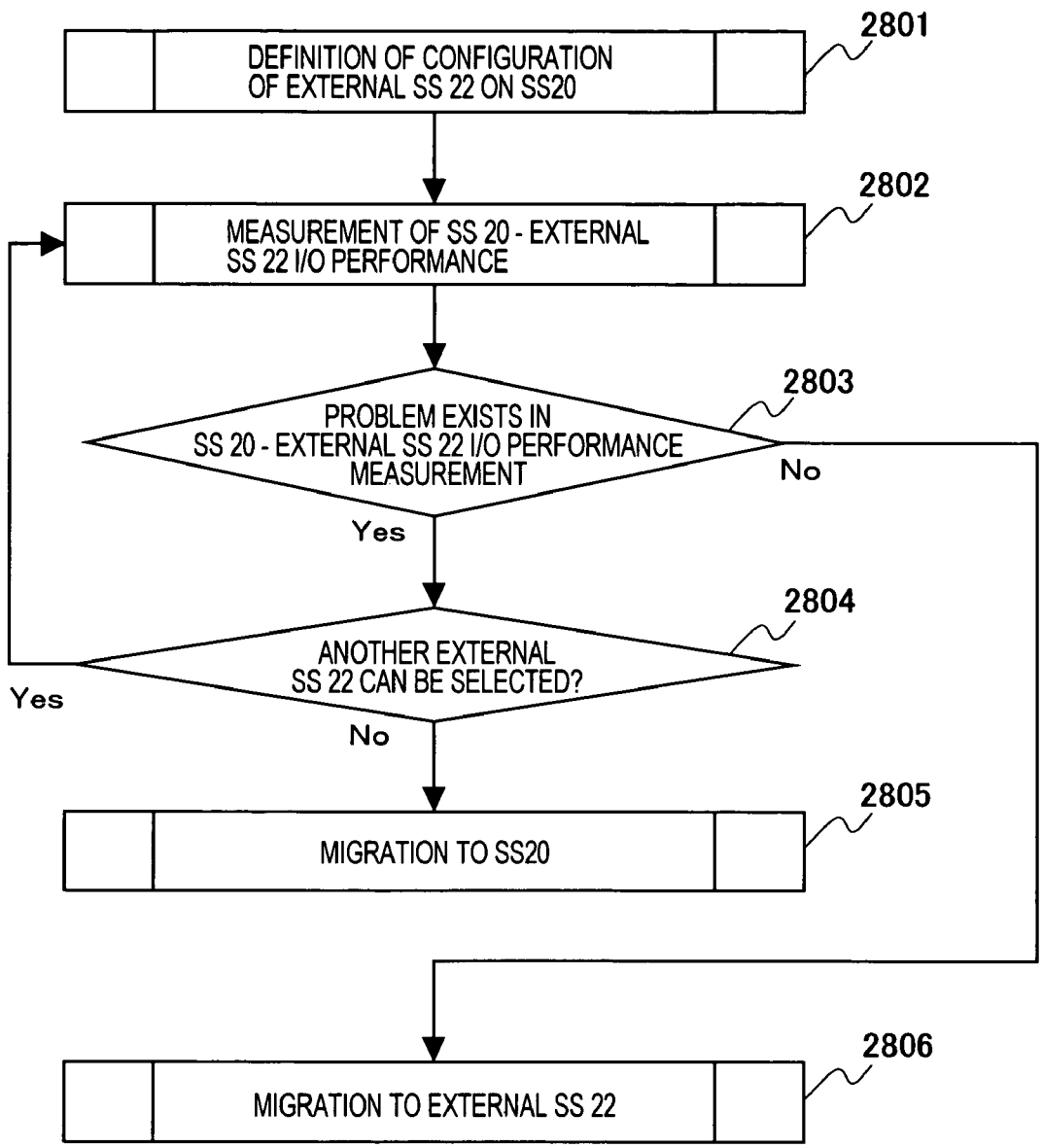
FIG. 25 is a diagram for explaining a procedure of migration between external storage subsystems of the first embodiment.

In the following, referring to FIG. 25, will be described a procedure of migration between the external storage subsystems.

Through the second I/O network 62, the configuration definition processing unit 217 defines the external storage subsystem 22 existing on the second I/O network 62. A method of this definition is different depending on a protocol used for I/O processing, although details are not described since the method does not relate to the invention directly. Then, logical storage units of the external storage subsystem 22 are registered as logical storage units of I/O processing objects into the logical-physical correspondence information 203.

Here, in the case where access control depending on identifiers of the host computers 1 has been already set for I/O ports of the external storage subsystem 22, then, such access restriction is removed. In detail, the access restriction is removed according to a user's instruction given through the subsystem management apparatus 5 connected to the external storage subsystem 22. Or, with respect to identifiers of ports used for performing I/O processing to the external storage subsystem 22 through the second I/O network, the I/O network processing unit 200 of the storage subsystem 20 sets those identifiers as access-permitted objects.

After the removal of the access restriction, the storage subsystem control unit 112 of the storage subsystem 20 defines the logical storage units of the external storage subsystem 22 as physical storage units of the storage subsystem 20, and then, defines logical storage units of the storage subsystem 20. Then, the configuration definition processing unit 217 updates/generates the logical-physical correspondence information 203 (Step 2801).

Next, using dummy data, I/O processing performance to the external storage subsystem 22 is measured (Step 2802).

When the I/O processing performance to the external storage subsystem 22 does not satisfy a predetermined expected value (Step 2803), then, the storage subsystem control unit 112 employs another external storage subsystem (Step 2804), or performs data migration to the physical storage units in the storage subsystem 20 (Step 2805).

When the I/O processing performance to the external storage subsystem 22 satisfies the predetermined expected value, or an expected value of I/O processing performance is not required, then, data migration to the external storage subsystem 22 is performed (Step 2806).

Data migration is performed according to a method similar to the data migration between the first logical storage unit of the storage subsystem 20 to which the logical storage units of the external storage subsystem 21 defined on the storage subsystem 20 are mapped as the physical storage units and the second logical storage unit of the storage subsystem 20 to which the logical storage units of the external storage subsystem 22 are mapped as the physical storage units. This has been shown already in FIG. 23, and is not described here again.

[Data Migration within External Storage Subsystem 21]

Figure 26:
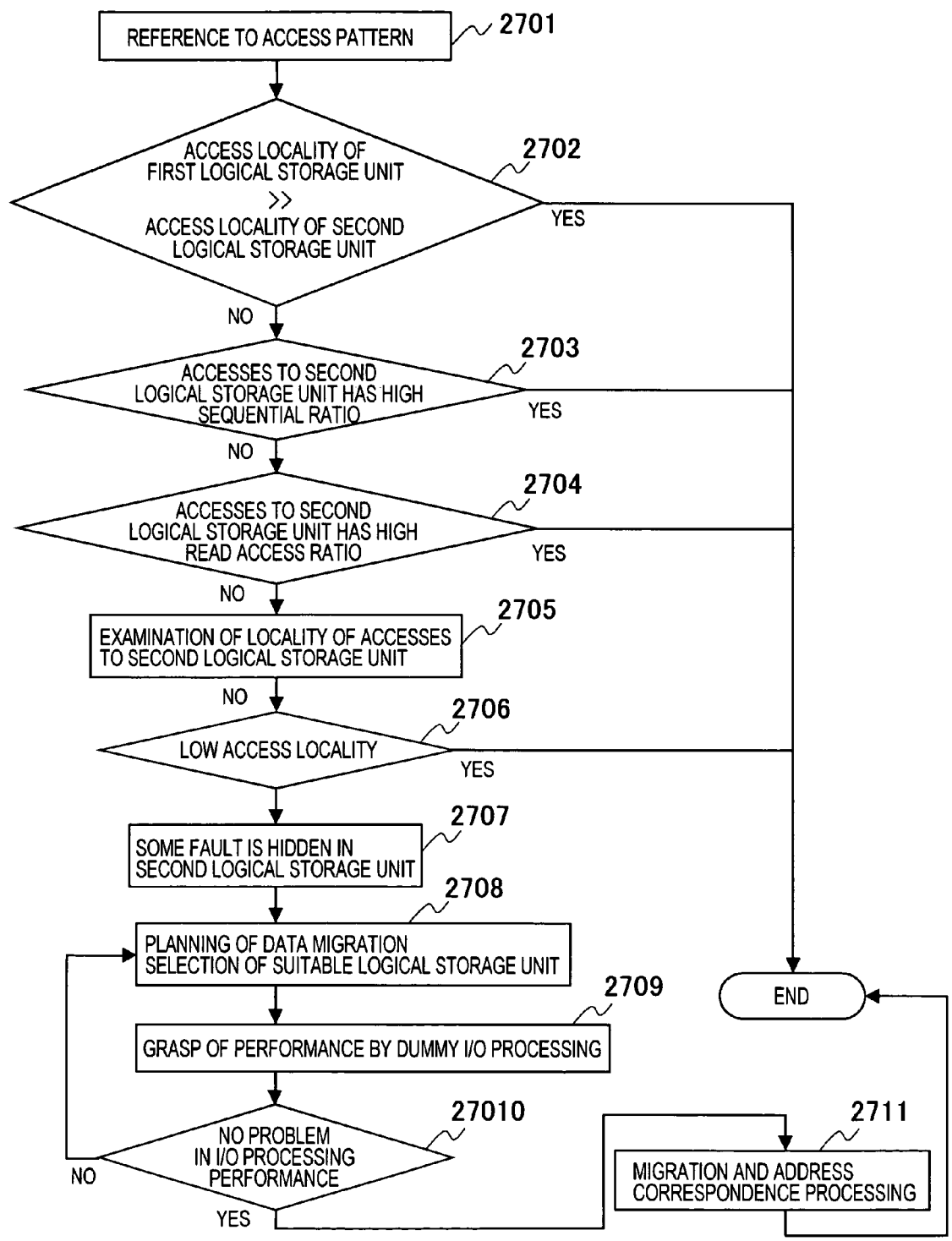
FIG. 26 shows a processing flow at the time of data migration within an external storage subsystem of the first embodiment.

Next, will be described data migration within the external storage subsystem 21. FIG. 26 shows a processing flow of the storage subsystem control unit 112 at the time of data migration within the external storage subsystem 21.

First and second logical storage units within the external storage subsystem 21 are I/O processing objects for the storage subsystem 20, and, as already described, the operating information of the first and second logical storage units is held in the storage subsystem 20, as I/O processing performance and its history seen from the storage subsystem 20.

When the response performance of the second logical storage unit of the external storage subsystem 21 deteriorates in comparison with the first logical storage unit after a certain point of time, it is considered that there is some performance problem. In such a case, the storage subsystem control unit 112 refers to the logical storage unit operating information 224 to acquire access patterns (the sequential ratios and the read-write ratios) in the storage subsystem 20 to the logical storage units of the external storage subsystem 21 (Step 2701).

Next, the storage subsystem control unit 112 grasps the bias of the I/O processing addresses to the first logical storage unit and to the second logical storage unit, based on overlap of I/O object addresses (Step 2702).

Here, when the access locality of I/O processing of the host computers 1 to the second logical storage unit is lower than the first logical storage unit, there is good possibility that I/O object data does not exist in the disc cache 108 in the external storage subsystem 21, and therefore it is judged that the response performance is low.

When the access ranges are not so different in their locality, then, the storage subsystem control unit 112 examines data length of I/O processing. Longer data length means a sequential access, and thus it is judged that cache control on the side of the external storage subsystem 21 is performed so that data does not remain on the cache. And, referring to the value of throughput, when a predetermined value is obtained, it is judged that there is no problem (Step 2703).

When data length is shorter, the read-write ratio is examined. When the read ratio in I/O processing to the second logical storage unit is higher than the read ratio in I/O processing to the first logical storage unit, then the storage subsystem control unit 112 judges that response performance is low since data is read not from the disk cache but from the physical storage unit. Thus, referring to the value of throughput, when a predetermined value is obtained, it is judged that there is no problem (Step 2704).

When the read ratio to the second logical storage unit is less than the read ratio to the first logical storage unit, then the storage subsystem control unit 112 judges that the access performance is not fully exhibited for the reason that there is interference of accesses to the physical storage unit in which the second logical storage unit is located, or that some fault is inherent in the second logical storage unit and access to the physical storage unit has to be retried inside the external storage subsystem 21, for example. Thus, the storage subsystem control unit 112 performs processing for data migration (Step 2707).

Referring to space area information held in advance, the storage subsystem control unit 112 extracts a space area in the external storage subsystem 21. For example, in the case where the external storage subsystem 21 is an old-type apparatus, and data in some logical storage units has been migrated to logical storage units of the storage subsystem 20, then, an empty logical storage unit whose data has been migrated to the logical storage units of the storage subsystem 20 is extracted as a migration destination candidate (Step 2708).

Next, using the above-described method, the storage subsystem control unit 112 performs I/O processing using dummy data to the logical storage unit as the migration destination, to measure the I/O performance (Step 2709).

As a result of the measurement of Step 2709, the storage subsystem control unit 112 selects a logical storage unit (referred to as a third logical storage unit) whose I/O performance satisfies a predetermined criterion (Step 2710), and migrates data of the second logical storage unit to the third logical storage unit (Step 2711).

Various migration methods may be employed. And, when the external storage subsystem 21 has a function of performing migration of the logical storage unit transparently to the host computers, similarly to the storage subsystem 20, then, that function is used. Further, when the external storage subsystem 21 does not have a function of performing migration of the logical storage unit transparently to the host computers, but has a function of generating mirror, then, the external storage subsystem 1 generates mirror between the second logical storage unit and the third logical storage unit, and changes the correspondence between the P.G. number 605 and the information (a port address and a logical storage unit number) 614 which identifies a logical storage unit of a general-purpose storage, in the logical-physical correspondence information 203 held in the first logical storage unit.

When no control is possible with respect to the external storage subsystem 21, the storage subsystem control unit 112 performs data read/write processing to the second and third logical storage units, and changes the logical-physical correspondence information 203 such that LDEV mapped onto P.G. providing the second logical storage unit is mapped onto P.G. providing the third logical storage unit (Step 2711).

As described above, in the present embodiment, the storage subsystem 20 that controls I/O of the host computers 1 to the external storage subsystem 21 provides the LU of the external storage subsystem 21 to the host computers 1, mapping the LU of the external storage subsystem 21 to the LU of the storage subsystem 20 in order to control I/O to the external storage subsystem 21, and holds the configuration information. Further, times required for I/O processing to the external storage subsystem 21 are measured, and the performance of the networks and the I/O processing performance of the external storage subsystem 21 are held as the attribute information. Based on these pieces of information, the performance tuning is carried out.

Thus, in the storage subsystem 20 connected with the external storage subsystem 21, the present embodiment realizes performance tuning including the external storage subsystem 21 considering load conditions of the storage subsystems including the external storage subsystem 21.

According to the present embodiment, in a storage subsystem that is connected with a plurality of external storage subsystems, and has a function of receiving I/O processing requests from host computers to those external storage subsystems to relay the I/O processing requests to the external storage subsystems, it is possible not only to carry out performance management of the resource of the storage subsystem itself but also to manage performance information of the storage subsystem including the connected external storage subsystems and to use the performance information to perform performance tuning transparent to the host computers.

[Introduction of Hierarchical Storage Management Function]

Next, will be described a method of determining data allocation using a hierarchical storage management function in the storage subsystem 20 when the external storage subsystem 21 is connected. The present processing is performed by a reallocation planning processing unit (not shown).

The reallocation planning processing unit acquires operating conditions between the external storage subsystem 21 and the host computers 1, from the host computers 1, the SAN management terminal 9, or the subsystem management apparatus 5 connected to the external storage subsystem 21.

In formation acquired as the operating conditions is a history of an I/O network band, an average number of I/O processing, the maximum number of I/O processing, an average data transfer amount, the maximum data transfer amount, a sequential ratio and a read-write ratio. It is favorable to acquire a history covering a longer period.

Based on I/O processing amount in the acquired information, the reallocation planning processing unit determines whether data of the LU of the external storage subsystem 21 should be migrated to the storage units in the storage subsystem 20, or the LU should be presented as LU of the storage subsystem 20 while keeping the data in the external storage subsystem 21 and connecting the external storage subsystem 21 to the storage subsystem 20, or I/O processing should be performed directly with the host computers 1 as before while keeping the data in the external storage subsystem 21. And, the recommended plan is presented to a user.

It is desired that the second I/O network 62 between the storage subsystem 20 and the external storage subsystem 21 is constructed to have wider band than or equal to the band of the I/O network between the host computers 1 and the external storage subsystem 21. However, even when it is not realized for some reason, for example, for the reason that the bands between the switches and the storage subsystem 20 are narrow, it is recommended to keep the data in the external storage subsystem 21 and connect the external storage subsystem 21 to the storage subsystem 20 to provide the LU of the external storage subsystem 21 as LU of the storage subsystem 20, in the case where it is judged that the I/O network can carry out processing, based on the history of the maximum number of I/O processing and the maximum data transfer amount.

When an instruction is received from the user through the subsystem management apparatus 5 or the like to the effect that the recommended plan is accepted, then the reallocation planning processing unit performs the data copy according to the recommended plan presented.

This completes the data allocation using the hierarchical storage management function in connecting the external storage subsystem 21 to the storage subsystem 20.

In the present embodiment, the storage subsystem 20 monitors I/O processing conditions of the external storage subsystem 21 and analyzes change in the performance based on its response and the like. However, a method of monitoring change in the performance of the external storage subsystem 21 is not limited to this.

For example, in the case where the storage subsystem control unit 112 of the storage subsystem 20 can acquire the I/O operating information and the configuration information of the external storage subsystem 21 through the second I/O network 62, the storage subsystem control unit 112 sends an acquisition request command to the external storage subsystem 21 to acquire the I/O operating information and the configuration information.

In that case, the correspondence information on the correspondence between the logical storage units 8 and the physical storage units 124, the logical storage unit operating information, the port operating information and the like of the external storage subsystem 21 are held as the logical-physical correspondence information 203, the logical storage unit operating information 224, the physical storage unit operating information 255 by the storage subsystem control unit 112, for each storage subsystem.

Based on the above-mentioned information, the configuration change planning processing unit 218 judges performance deterioration of the external storage subsystem 21, and makes a configuration change plan for performance tuning.

Second Embodiment

Next, as a second embodiment, will be described a technique of acquiring performance information of the external storage subsystem 21 by issuing an I/O request from the storage subsystem 20 to the external storage subsystem 21 through the second I/O network 62.

A system configuration of the present embodiment is fundamentally similar to the first embodiment. In addition to the configuration of the storage subsystem 20 of the first embodiment, the storage subsystem 20 of the present embodiment has a dummy data generating/sending function which generates and sending dummy data as an I/O request which analyzes the performance information. In the following, arrangements different from the first embodiment will be mainly described.

For example, by sending a series of data each having a specific data size to a certain address, I/O processing performance of the external storage subsystem 21 can be measured.

Now, will be described a procedure of using the dummy data generating/sending function which measures the I/O processing performance of the external storage subsystem 21.

Dummy data generated by the dummy data generating/sending function is one or more data each having a predetermined size, and after generation, sent in a format according to the protocol of the second I/O network 62.

Figure 27:
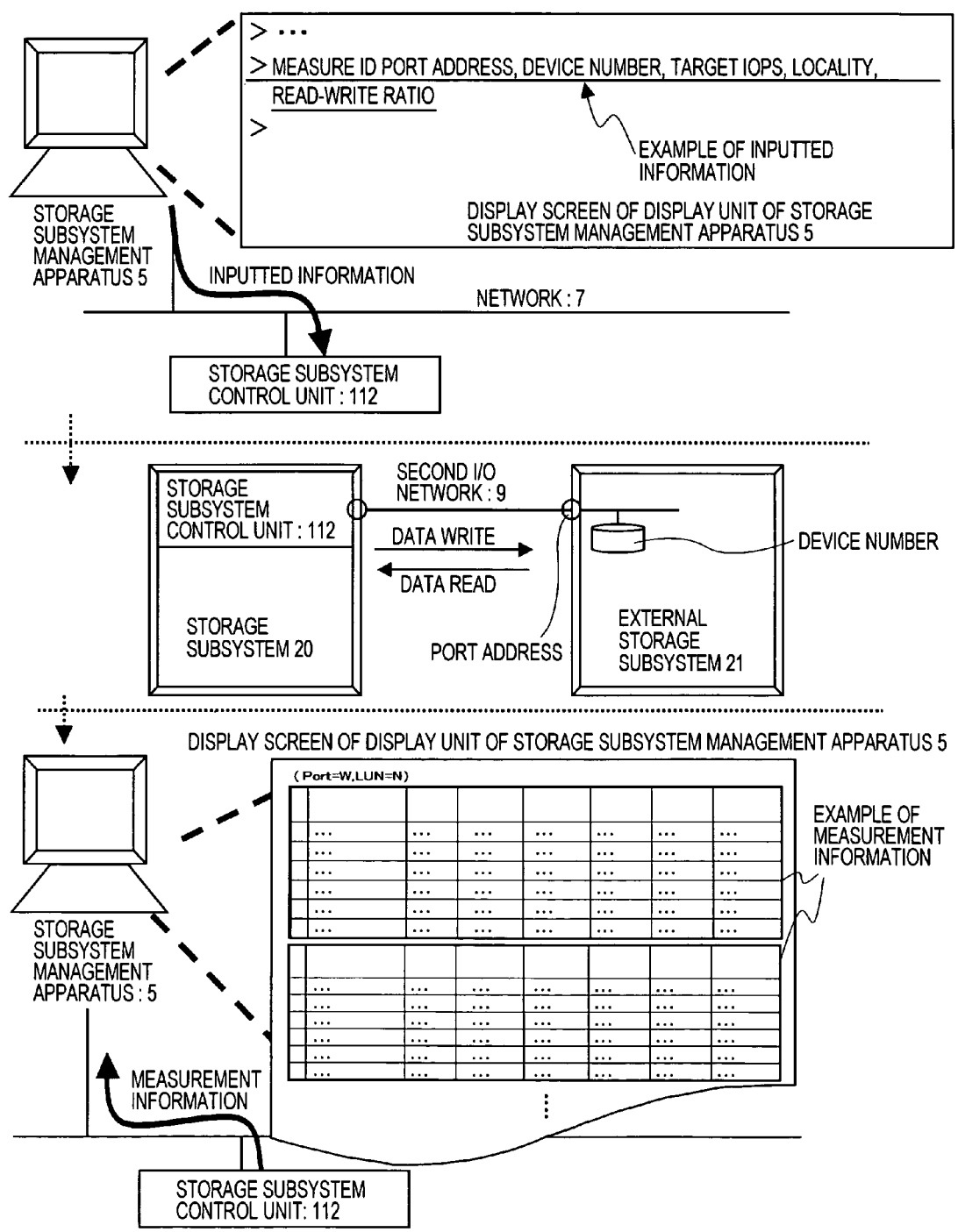
FIG. 27 is diagram for explaining processing of measuring I/O processing performance with respect to I/O from a storage subsystem to an external storage subsystem of a second embodiment.

FIG. 27 shows an image of the processing using the dummy data generating/sending function at the time of measuring the performance of I/O processing from the storage subsystem 20 to the external storage subsystem 21. Further, FIG. 28 shows an example of a performance measurement result 3000 obtained from dummy data sent by the dummy data generating/sending function.

According to input received from the administrator, the subsystem management apparatus 5 or the SAN management terminal 9 gives a measurement instruction to the dummy data generating/sending function, designating a I/O port address, a logical storage number, dummy data length, a target IOPS of the dummy data, bias of I/O object addresses of the mentioned logical storage unit, read processing or write processing, and the like of the external storage subsystem 21. Then, according to the measurement instruction, the dummy data generating/sending function generates dummy data and sends the dummy data to the designated I/O port of the external storage subsystem.

As shown in FIG. 28, the performance measurement result 3000 includes the target IOPS, locality, a read-write ratio, a measured IOPS, a measured MBPS, and response, for each size of sent dummy data.

The target IOPS is a target value for the number of I/O processing commands issued per second. In the case where the external storage subsystem 21 or the second I/O network 62 has the processing performance or the band sufficient which realizes the target value, the storage subsystem 20 can issue commands whose number almost satisfying the target value. By raising the target value step by step, it is possible to find the I/O processing performance between the storage subsystem 20 and the external storage subsystem 21.

Further, by changing the dummy data length, it is possible to find the I/O processing performance between the storage subsystem 20 and the external storage subsystem 21 with respect to random access and sequential access.

By designating the bias of I/O object addresses, it is possible to find difference between the cache hit performance and the cache miss performance as the I/O processing performance between the storage subsystem 20 and the external storage subsystem 20, since the probability that the external storage subsystem 21 hits the disk cache 108 becomes higher when the bias is larger.

Further, in the case where there is no difference in the processing performance when I/O processing is performed with respect to a certain small address range or when the bias is entirely removed, then, it is possible that there is a hidden fault such as no disk cache 108 or the disk cache 108 of very small capacity.

After the measurement, the storage subsystem control unit 112 sends a completion report to the external storage subsystem 21 that sent the measurement instruction. Receiving the completion report, the subsystem management apparatus 5 or the SAN management terminal 9 displays the completion report on the display unit, and awaits an instruction from the administrator. When an instruction of reading the measurement result is received, the subsystem management apparatus 5 or the SAN terminal 9 reads the measurement result information from the storage subsystem control unit 112 through the network 7, and displays the information on the display unit. The administrator who sees the display can know the I/O processing performance to the external storage subsystem 21 through the second I/O network 62.

The dummy data generating/sending function can be used not only during the operation, for the storage subsystem 20 to acquire the I/O processing performance of the external storage subsystem 21, but also at the time of designing an information processing system connected with the external storage subsystem 21. At the time of designing an information processing system, it is necessary to estimate I/O processing performance of the external storage subsystem 21.

When a new storage subsystem 20 is introduced, sometimes a part of data is left in the existing storage subsystem without migrating all the data from the storage subsystem used hitherto, in order to suppress introduction costs.

In such a case, an information processing system is designed taking the remaining storage subsystem as the external storage subsystem 21 of the above-described embodiment. However, in this case, this remaining storage subsystem is now accessed, as the external storage subsystem 21, from the host computer 1 through the storage subsystem 20 and the second I/O network 62. Accordingly, the past I/O processing performance on I/O from the host computer 1 can not be used as it is.

Thus, in the present embodiment, the I/O processing performance of the external storage subsystem 21 is estimated by sending dummy data from the storage subsystem 20 to the external storage subsystem 21.

For example, by sending a series of data each having a specific data size to a certain address, the I/O processing performance of the external storage subsystem 21 can be measured. As a result, the I/O processing performance with respect to the host computer 1 through the storage subsystem 20 can be estimated also.

Now, will be described a detailed procedure of estimating the performance of the external storage subsystem 21 by using the above-mentioned dummy data generating/sending function of the storage subsystem 20.

It is assumed that, before introducing a new storage subsystem 20, the I/O processing performance between the storage subsystem that becomes the external storage subsystem 21 and the host computer 1 is acquired in advance. First the storage subsystem control unit 112 of the storage subsystem 20 detects a logical storage unit that can be accessed from a port of the external storage subsystem 21 that in turn can be accessed through the second I/O network 62. Then, the dummy data generating/sending function sends dummy data to the detected logical storage unit according to the below-described procedure, to measure the I/O processing performance of the external storage subsystem 21 through the second I/O network 62.

When the I/O processing performance of the external storage subsystem 21 satisfies a desired performance, then, the storage subsystem control unit 112 defines logical storage units of the external storage subsystem 21 existing on the second I/O network 62, as logical storage units of the storage subsystem 20, in the logical-physical correspondence information 203.

Third Embodiment

[Performance Tuning according to Access Frequency of Data]

Next, as a third embodiment, will be described an embodiment in which performance tuning of a system including the external storage subsystem 21 is realized according to data access frequency. In the following, different arrangements of the present embodiment from the first embodiment will be mainly described.

Figure 29:
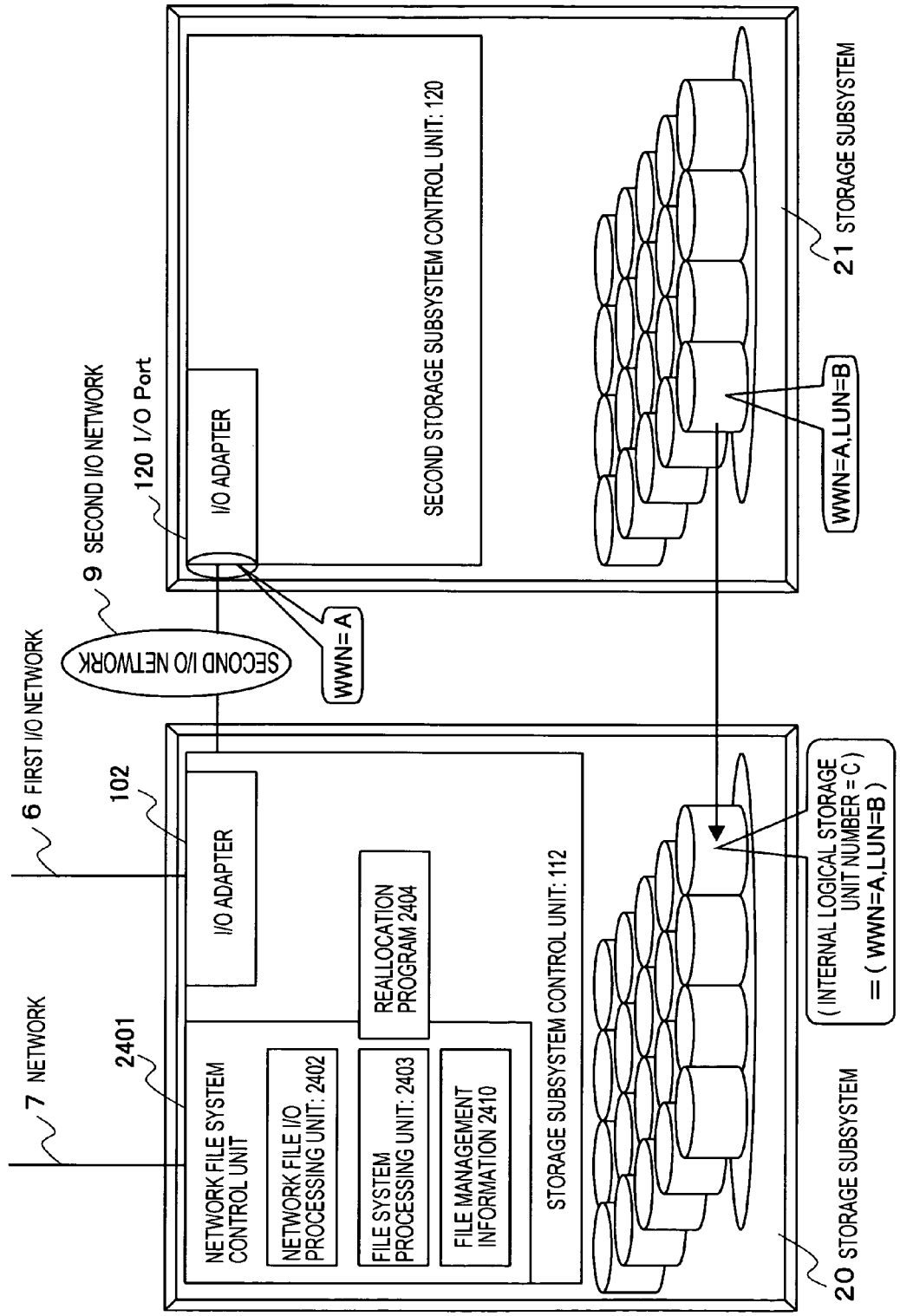
FIG. 29 is a functional block diagram showing a storage subsystem and an external storage subsystem of a third embodiment.

FIG. 29 shows functional configurations of the storage subsystem 20 and the external storage subsystem 21 in the case where the storage subsystem 20 is provided with I/F that functions as an NAS (Network Attached Storage).

An NAS is a storage device that is directly connected to a network and provides, for example, a file sharing service to a network client. Characteristically, an NAS can function as an independent file server that can share files through a network.

By introducing an NAS, a file server and a storage can be managed in one apparatus, reducing management objects. Thus, in comparison with a case where two apparatuses, a file server and a storage are managed separately, there is an advantage that a management cost can be suppressed to a low level.

The present embodiment has fundamentally the same functional configuration as the first embodiment. The components that are not described in the following are fundamentally same as ones in the first embodiment.

Further, the storage subsystem control unit 112 comprises a network file system control unit 2401 which realizes an NAS, and is connected, through the network 7, with host computers 1 and information processing system client computers to which the host computers 1 provide services. A client computer can access the storage subsystem 20 through an NAS provided by the network file system control unit 2401.

Further, the network file system control unit 2401 comprises: a network file I/O processing unit 2402 which controls ports and adapters; a file system processing unit 2403 which performs file processing; a reallocation processing unit 2404 which plans and executing file reallocation; and file management information 2410 storing file management information. This processing unit substitutes for the configuration change planning processing unit 218 and the configuration change plan execution processing unit 219 of the first embodiment.

Since the storage subsystem control unit 112 has the network file system control unit 2401 which realizes an NAS, it is possible to manage a file creation date, the newest access time and an access frequency for each file, as described below.

First, referring to the drawing, will be described management of files and storage unit addresses storing those files by the network file system control unit 2401.

Figure 30:
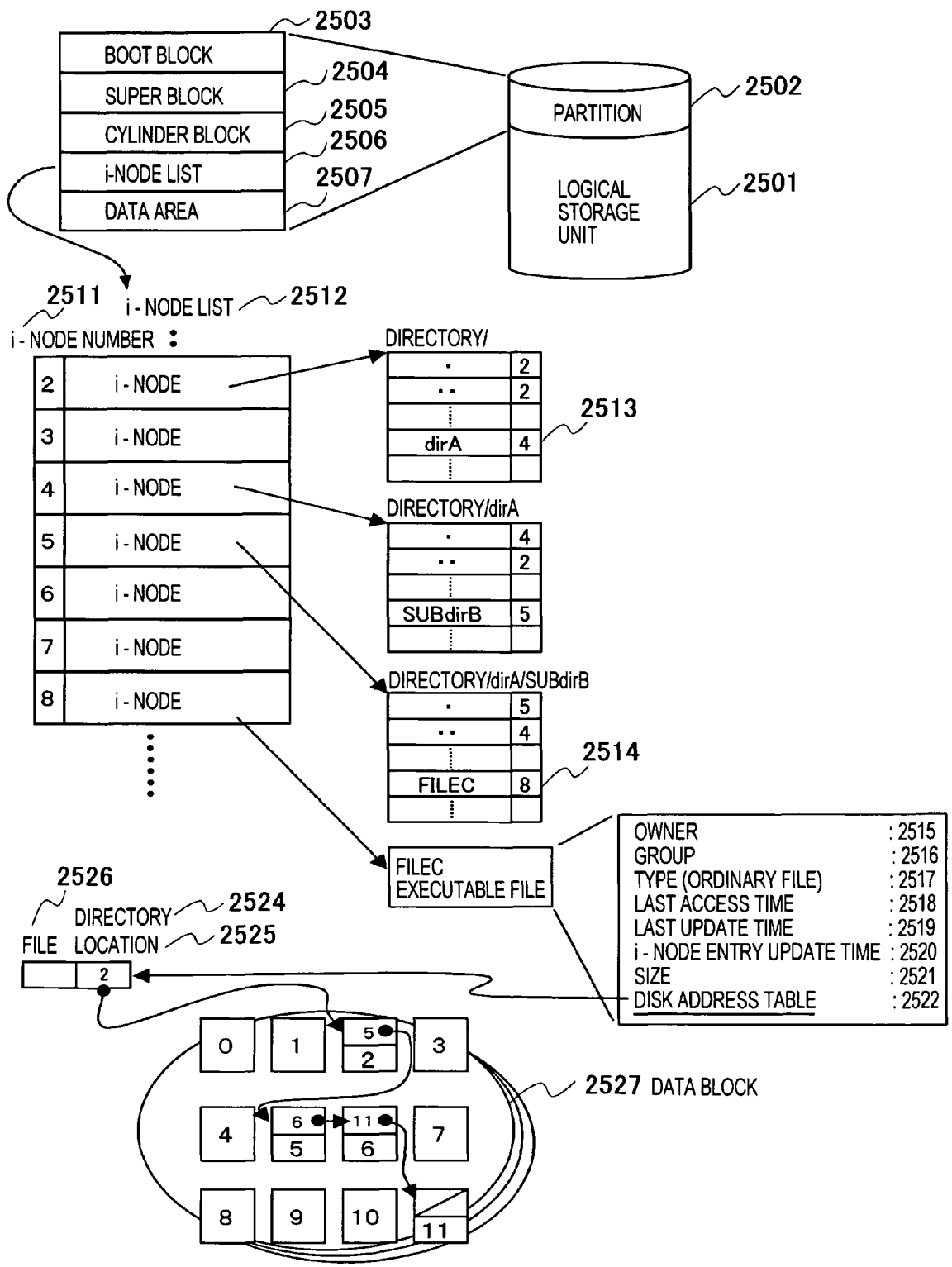
FIG. 30 is an image diagram showing file management by a network file system control unit of the third embodiment.

FIG. 30 shows an image of the file management by the network file system control unit 2401.

The network file system control unit 2401 is provided with logical storage units or internal logical storage units from the storage subsystem control unit 112, and manages those units as volumes.

As shown in FIG. 30, a file system in the present embodiment is arranged such that a logical storage unit 2501 is separated into some partitions 2502, to make file management easy and to localize effect of a fault.

In the partition 2502, the network file system control unit 2401 creates a boot block 2503, a super block 2504, a cylinder block 2505, an i-node list 2506, and a data area 2507.

The super block 2504 stores the management information of the partition 2502, and files existing in the super block 2504 are managed by i-nodes.

The i-nodes are held and managed as the i-node list 2512. Further, each i-node is designated by an i-node number 2511. A content of each i-node is directory information or file information.

In the case where an i-node is information on a directory, then as shown in the figure, the entries of the i-node contain directories and files existing in that directory. For example, it is seen that an entry of the root directory 2513 contains a directory dirA, and the i-node number of dirA is 4.

By hierarchical accessing, it is seen, for example, that a directory dirA/subdirB contains a file FileC and its i-node number is 8. The i-node of FileC, which is designated by the i-node number 8, contains an owner 2515 of that file, a group name 2516 of the owner, a file type 2517 (such as a text file, a binary file, or the like), a last access time 2518, a last update time 2519, an i-node entry update time 2520, a file size 2521, disk address information 2522, and the like.

The disk address information 2522 holds a directory 2524 storing the file 2526 and a location 2525 in that directory 2524. The disk address information 2522 further holds a disk and a block in which the file 2526 is located, and an address of a block of the next read data. The address of the block of the next read data is held in order that the file can be read even when the file is dispersedly located in a plurality of data blocks 2527.

The network file system control unit 2401 includes the file management information 2410. FIG. 31 shows an example of the file management information 2410.

As shown in the figure, the file management information 2410 holds a file name 2411, an index(a file ID) 2412, a file size 2413, a file type 2414, a creation time 2415, a last access time 2416, a last update time 2417, an access frequency 2418 in a certain period, file importance 2419 (if possible), and the like.

Using the file management information, the reallocation processing unit 2404 judges necessity of file migration, depending on the time elapsed from the creation date, and performs the performance tuning if necessary.

Figure 32:
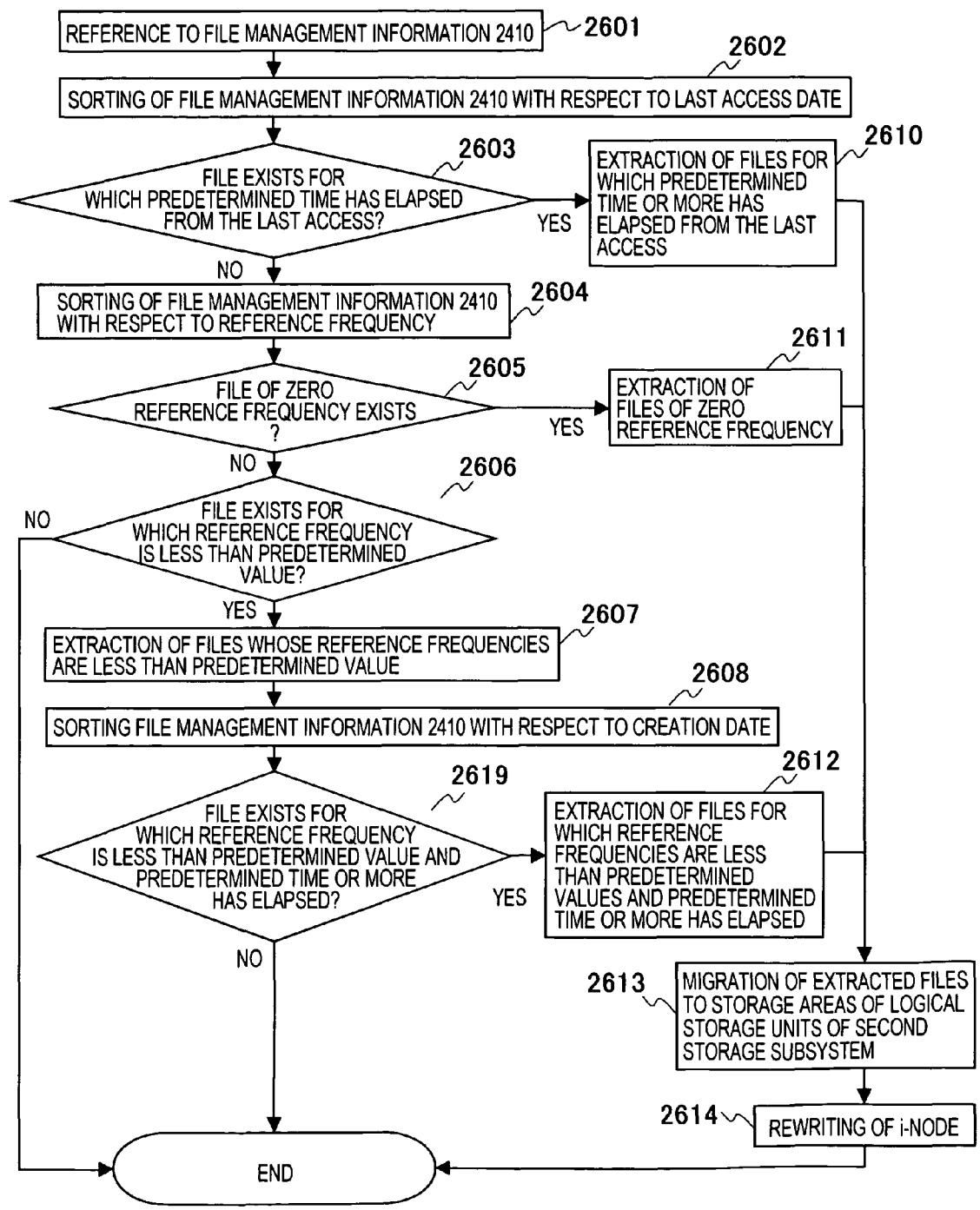
FIG. 32 shows a processing flow of a reallocation processing unit of the third embodiment.

Next, referring to the drawing, will be described a series of processes by the reallocation processing unit 2404 according to the present embodiment, which changes the configuration depending on the access frequency. FIG. 32 shows a processing flow by the reallocation processing unit 2404.

The reallocation processing unit 2404 refers to the file management information 2410 (Step 2601), sorts the files in the file management information 2410 with respect to the entry of the last file reference date 2416 (Step 2602), and judges whether there exist files for which more than a predetermined time has elapsed from the last reference dates of those files (Step 2603).

When it is judged in Step 2603 that there exist files for which more than the predetermined time has elapsed, then, the reallocation processing unit 2404 extracts those files (Step 2610) to manage them as migration object files.

When it is judged in Step 2603 that there is no file for which more than the predetermined time has elapsed, then, the reallocation processing unit 2404 sorts again the files in the file management information 2410 with respect to the entry of the reference frequency (Step 2604) to judge whether there exist files whose file reference frequencies are 0 (Step 2605).

When it is judged in Step 2605 that there exist files whose file reference frequencies are 0, then the reallocation processing unit 2404 extracts those files (Step 2611) to manage them as migration object files.

When it is judged in Step 2605 that there exists no file whose file reference frequency is 0, then the reallocation processing unit 2404 judges whether there exist files whose file reference frequencies are less than a predetermined value (Step 2606).

When it is judged in Step 2606 that there exist files whose file reference frequencies are less than the predetermined value, then the reallocation processing unit 2404 extracts those files (Step 2607), sorts the extracted files in the file management information 2410 with respect to the entry of the creation date (Step 2608) to judge whether there exist files for which more than a predetermined time has elapsed from the creation date (Step 2609).

When it is judged in Step 2609 that there exist files for which more than the predetermined time has elapsed, then the reallocation processing unit 2404 extracts those files (Step 2612) to manage as migration object files.

Thereafter, the reallocation processing unit 2404 migrates all the migration object files extracted to the logical storage units of the external storage subsystem 21 (Step 2613). After the migration, the reallocation processing unit 2404 rewrites the i-nodes (Step 2614) to end the processing.

Here, when there is no file satisfying the condition in Steps 2606 or 2809, then, the processing is ended.

Hereinabove, the procedure of changing the configuration depending on the access frequency has been described.

According to the present embodiment, it is possible to carry out performance tuning such that, for example, data areas of files for which there is no access more than one week or one month from their creation dates are migrated onto the logical storage units of the external storage subsystem 21, and data of frequently-accessed files is stored onto the physical storage units 110 of the storage subsystem 20.

Further, it is possible to carry out performance tuning such that the reference frequency 2418 is directly referred to for each file, and files whose values of the reference frequency 2418 are less than a predetermined value are migrated onto the logical storage units of the external storage subsystem 21, and when the reference frequency 2418 rises for some file, then, the storage location of that file is migrated to the physical storage units 110 of the storage subsystem 20.

The present embodiment is effective for a storage subsystem which stores data (such as web data) that has a higher reference frequency immediately after its creation but is scarcely referred to after some ten days.

In the first embodiment, a change plan made by the configuration change planning processing unit 218 according to an instruction of the manger 223 is present to a user, and executed by the configuration change plan execution processing unit 219 after receiving an instruction from the user. Also in the present embodiment, before execution of Step 2613 in the above-described procedure, a change plan may be presented to a user to obtain permission of the user.

Thus, according to the present embodiment, in carrying out performance tuning in a storage subsystem connected with an external storage subsystem, it is possible to locate files in the optimum way, based on the access frequency of each file. As a result, further, the performance of the storage subsystem as a whole can be increased.

Before carrying out performance tuning, its necessity is judged on the basis of the load in the first and second embodiments and the access frequency in the third embodiment. However, these do not limit the judgment criterion for performance tuning. For example, performance tuning may be carry out in such a way that symptoms of a fault in the storage subsystem itself are detected in advance, before migrating data.

For example, sometimes the regulations of a state require that a corporation should keep its account books, mails, clinical charts for patients, data in the development of a new medicine, and the like for a predetermined period. In addition, it should be possible to present such data within a predetermined time, in response to a demand. A system handling such data should satisfy these requests.

Now, will be considered the above-mentioned system where a storage subsystem performs I/O processing with the host computer 1 through the first I/O network 61 and I/O processing with the external storage subsystem 21 through the second I/O network 62 similarly to the first embodiment, and the external storage subsystem 21 is an old-type apparatus and the storage subsystem 20 is a new-type apparatus.

When data of ordinary works is stored in the storage subsystem 20, and account books, mails, clinical charts, data in new medicine development, and the like that should be kept according to regulations are stored in the external storage subsystem 21, then, it is possible that assets are used more efficiently than the case where all data in the old-type apparatus (i.e., the external storage subsystem 21) is migrated to the new-type apparatus and then the old-type apparatus is discarded. However, it is highly possible that the life of the old-type apparatus is completed more early than the new-type apparatus, since the old-type apparatus has been used for a longer period of time.

In that case, the storage subsystem 20 issues I/O processing requests to the external storage subsystem 21 at certain predetermined intervals, to measure the processing performance of the external storage subsystem 21. When, as a result of the measurement, symptoms of a fault hidden in the external storage subsystem 21 are detected, data is migrated to another storage subsystem than the external storage subsystem 21.

Here, "another storage subsystem" as the migration destination may be the storage subsystem 20 or a third storage subsystem that is neither the storage subsystem 20 nor the external storage subsystem 21.

When the storage subsystem as the migration destination is an older type similarly to the external storage subsystem 21 in comparison with the storage subsystem 20, or a storage subsystem whose introduction cost is cheaper, then, it is possible to suppress the cost of the storage unit that stores data having a lower access frequency.

What is claimed is:

1. A storage control device coupled to a computer and a first storage system, the first storage system including a plurality of storage units, one of which is assigned to a logical unit in the storage control device, the storage control device comprising:

a first port coupled to the computer;

a second port coupled to the first storage system; and a control unit, coupled to the first port and the second port, which provides the logical unit, converts a first access request for the logical unit received by the first port into a second access request for a first storage unit of the plurality of storage units based on a relationship information including a first relation between the logical unit and the first storage unit, sends the second access request to the first storage system via the second port, and calculates performance of the second access request in the storage control device, wherein the first storage unit of the plurality of storage units is selected by the storage control device based on the relationship information and wherein it is determined whether a conflict over the second port or the control unit exists, whereby the storage control device determines performance of the logical unit in the storage control device.

2. The storage control device according to claim 1, wherein the performance of the second access request sent from the second port includes information of response time of the second access request between the second port in the storage control device and the first storage system.

3. The storage control device according to claim 2, wherein the control unit issues a request to the first storage system via the second port so that the storage control device gets configuration information of the first storage unit in the first storage system.

4. The storage control device according to claim 3, further comprising a third port which is coupled to a second storage system, wherein the storage control device receives data stored into the first storage unit from the first storage system via the second port, and sends the data to a second storage unit in the second storage system via the third port if the response time of the second access request is greater than a threshold, wherein, if the response time is greater than the threshold, the control unit modifies the relationship information to change the first relation into a second relation between the logical unit and the second storage unit whereby the storage control device assigns the logical unit to the second storage unit in the second storage system instead of the first storage unit in the first storage system, the control unit converts the first access request to a third access request to the second storage unit in the second storage system based on the second relation in the relationship information and sends the third access request to the second storage system via the third port.

5. The storage control device according to claim 4, wherein the control unit creates a first I/O request that is unrelated to any access request from the computer to the first storage system, sends the first I/O request to the first storage unit in the first storage system via the second port, and calculates performance of the first I/O request sent from the second port of the storage control device so that the control unit recognizes the performance of the logical unit through monitoring the performance of the first storage unit in the first storage system.

6. The storage control device according to claim 5, wherein the control unit creates a second I/O request that is unrelated to any access request from the computer to the second storage system, sends the second I/O request to the second storage unit in the second storage system via the third port, and calculates performance of the second I/O request sent from the third port of the storage control device so that the control unit determines the performance of the second storage unit in the second storage system.

7. The storage control device according to claim 1, wherein the performance of the second access request sent from the second port includes information of throughput related to the second access request between the second port and the first storage system.

8. The storage control device according to claim 7, wherein the control unit issues a request from the computer to the first storage system via the second port so that the control unit gets configuration information of the first storage unit of the plurality of storage units in the first storage system.

9. The storage control device according to claim 8, further comprising a third port which is coupled to a second storage system,
wherein the control unit receives data stored into the first storage unit from the first storage system via the second port, and sends the data to a second storage unit in the second storage system via the third port if the throughput related to the second access request is less than a threshold,
wherein, if the throughput is less than the threshold, the control unit modifies the relationship information to change the first relation into a second relation between the logical unit and the second storage unit whereby the storage control device assigns the logical unit to the second storage unit in the second storage system instead of the first storage unit in the first storage system, the control unit converts the first access request to a third access request to the second storage unit in the second storage system based on the second relation in the relationship information, and sends the third access request to the second storage system via the third port.

10. The storage control device according to claim 9, wherein the control unit creates a first I/O request that is unrelated to any access request from the computer to the first storage system, sends the first I/O request to the first storage unit in the first storage system via the second port, and calculates performance of the first I/O request sent from the second port in the storage control device so that the control unit recognizes the performance of the logical unit through monitoring the performance of the first storage unit in the first storage system.

11. The storage control device according to claim 10, wherein the control unit creates a second I/O request that is unrelated to any access request from the computer to the second storage system, sends the second I/O request to the second storage unit in the second storage system via the third port, and calculates performance of the second I/O request sent from the third port in the storage control device so that the control unit determines the performance of the second storage unit in the second storage system.

12. The storage control device according to claim 1, wherein the performance information of the second access request sent from the second port includes information of number of I/O requests of the second access request between the second port and the first storage system.

13. The storage control device according to claim 12, further comprising a third port which is coupled to a second storage system,
wherein the control unit receives data stored into the first storage unit in the first storage system via the second port, and sends the data to a second storage unit in the second storage system via the third port if the number of I/O requests is less than a threshold,
wherein, if the number of I/O requests is less than the threshold, the control unit modifies the relationship information to change the first relation into a second relation between the logical unit and the second storage unit whereby the storage control device assigns the logical unit to the second storage unit in the second storage system instead of the first storage unit in the first storage system, the control unit converts the first access request to a third access request to the second storage unit in the second storage system based on the second relation in the relationship information and sends the third access request to the second storage system via the third port.

14. The storage control device according to claim 13, wherein the control unit creates a first I/O request that is unrelated to any access request from the computer to the first storage system, sends the first I/O request to the first storage unit in the first storage system via the second port, and calculates performance of the first I/O request sent from the second port of the storage control device so that the control unit recognizes the performance of the logical device through monitoring the performance of the first storage unit in the first storage system.

15. The storage control device according to claim 14, wherein the control unit creates a second I/O request that is unrelated to any access request from the computer to the second storage system, sends the second I/O request to the second storage unit in the second storage system via the third port, and calculates performance of the second I/O request sent from the third port of the storage control device so that the control unit determines the performance of the second storage unit in the second storage system.

16. The storage control device according to claim 1, wherein a plurality of second ports are provided and wherein the storage control device determines whether to increase or decrease the number of the second ports.

* * * * *